US008035260B2

United States Patent
Fullerton et al.

(10) Patent No.: US 8,035,260 B2
(45) Date of Patent: Oct. 11, 2011

(54) STEPPING MOTOR WITH A CODED POLE PATTERN

(75) Inventors: Larry W. Fullerton, New Hope, AL (US); Mark Roberts, Huntsville, AL (US); James Lee Richards, Fayetteville, TN (US)

(73) Assignee: Cedar Ridge Research LLC, Huntsville, AL (US)

( * ) Notice: Subject to any disclaimer, the term of this patent is extended or adjusted under 35 U.S.C. 154(b) by 0 days.

(21) Appl. No.: 12/896,723

(22) Filed: Oct. 1, 2010

(65) Prior Publication Data

US 2011/0018484 A1    Jan. 27, 2011

Related U.S. Application Data

(63) Continuation-in-part of application No. 12/478,911, filed on Jun. 5, 2009, now Pat. No. 7,843,295, which is a continuation-in-part of application No. 12/476,952, filed on Jun. 2, 2009, which is a continuation-in-part of application No. 12/322,561, filed on Feb. 4, 2009, which is a continuation-in-part of application No. 12/358,423, filed on Jan. 23, 2009, now Pat. No. 7,868,721, which is a continuation-in-part of application No. 12/123,718, filed on May 20, 2008, now Pat. No. 7,800,471.

(60) Provisional application No. 61/247,931, filed on Oct. 1, 2009, provisional application No. 61/123,019, filed on Apr. 4, 2008.

(51) Int. Cl.
*H02K 37/00* (2006.01)

(52) U.S. Cl. ............... 310/49.01; 310/49.51; 310/49.55; 310/156.01; 310/156.43; 335/306

(58) Field of Classification Search .................. 335/285, 335/302–306; 310/49.01, 49.51, 49.53–49.55, 310/156.01, 156.43
See application file for complete search history.

(56) References Cited

U.S. PATENT DOCUMENTS

| 381,968 A | 5/1888 | Tesla |
| 493,858 A | 3/1893 | Edison |

(Continued)

FOREIGN PATENT DOCUMENTS

WO    WO2007/081830 A2    7/2007

OTHER PUBLICATIONS

Wikipedia, "Barker Code", Web article, last modified Aug. 2, 2008.

(Continued)

*Primary Examiner* — Ramon Barrera
(74) *Attorney, Agent, or Firm* — James Richards

(57) ABSTRACT

The present invention relates to a stepping motor with a magnet pole pattern having a predetermined pattern around the circumference of the stepping motor. In one embodiment, the pattern relates to a code having a unique single maximum autocorrelation peak over the period of the code. Example codes include Barker codes, PN codes, Kasami codes, Golomb ruler codes, and other codes. In one embodiment, the rotor and stator have a matching pole pattern. In one embodiment, the drive is arranged to align the poles in an inline configuration, alternatively, the drive may be arranged to align the poles in a diagonal configuration. In a further embodiment, one or more sets of poles are provided on the stator, each set being offset rotationally by a partial pole spacing.

22 Claims, 30 Drawing Sheets

U.S. PATENT DOCUMENTS

| | | | |
|---|---|---|---|
| 996,933 A | 7/1911 | Lindquist | |
| 1,236,234 A | 8/1917 | Troje | |
| 2,389,298 A | 11/1945 | Ellis | |
| 2,570,625 A | 10/1951 | Zimmerman et al. | |
| 2,722,617 A | 11/1955 | Cluwen et al. | |
| 2,932,545 A | 4/1960 | Foley | |
| 3,102,314 A | 9/1963 | Alderfer | |
| 3,208,296 A | 9/1965 | Baermann | |
| 3,238,399 A * | 3/1966 | Brandwijk et al. | 310/46 |
| 3,288,511 A | 11/1966 | Tavano | |
| 3,468,576 A | 9/1969 | Beyer et al. | |
| 3,474,366 A | 10/1969 | Barney | |
| 3,802,034 A | 4/1974 | Bookless | |
| 4,079,558 A | 3/1978 | Gorham | |
| 4,222,489 A | 9/1980 | Hutter | |
| 4,453,294 A | 6/1984 | Morita | |
| 4,547,756 A | 10/1985 | Miller et al. | |
| 4,629,131 A | 12/1986 | Podell | |
| 4,941,236 A | 7/1990 | Sherman | |
| 5,050,276 A | 9/1991 | Pemberton | |
| 5,367,891 A | 11/1994 | Furuyama | |
| 5,383,049 A | 1/1995 | Carr | 359/283 |
| 5,631,093 A | 5/1997 | Perry et al. | |
| 5,631,618 A | 5/1997 | Trumper et al. | |
| 6,072,251 A | 6/2000 | Markle | 310/12 |
| 6,170,131 B1 | 1/2001 | Shin | |
| 6,275,778 B1 | 8/2001 | Shimada et al. | 702/41 |
| 6,457,179 B1 | 10/2002 | Prendergast | |
| 6,607,304 B1 | 8/2003 | Lake et al. | |
| 6,720,698 B2 | 4/2004 | Galbraith | 310/166 |
| 6,847,134 B2 | 1/2005 | Frissen et al. | |
| 6,862,748 B2 | 3/2005 | Prendergast | |
| 6,927,657 B1 | 8/2005 | Wu | |
| 6,971,147 B2 | 12/2005 | Halstead | |
| 7,066,778 B2 | 6/2006 | Kretzschmar | |
| 7,362,018 B1 | 4/2008 | Kulogo et al. | 310/68 B |
| 7,444,683 B2 | 11/2008 | Prendergast et al. | |
| 2004/0003487 A1 | 1/2004 | Reiter | |
| 2005/0231046 A1 * | 10/2005 | Aoshima | 310/49 R |
| 2006/0066428 A1 | 3/2006 | McCarthy et al. | |
| 2006/0189259 A1 | 8/2006 | Park et al. | |
| 2006/0290451 A1 | 12/2006 | Prendergast et al. | |
| 2008/0186683 A1 | 8/2008 | Ligtenberg et al. | |
| 2008/0272868 A1 | 11/2008 | Prendergast et al. | |
| 2008/0282517 A1 | 11/2008 | Claro | |

OTHER PUBLICATIONS

Wikipedia, "Kasami Code", Web article, last modified Jun. 11, 2008.
Wikipedia, "Linear feedback shift register", Web article, last modified Nov. 11, 2008.
Wikipedia, "Golomb Ruler", Web article, last modified Nov. 4, 2008.
Wikipedia, "Costas Array", Web article, last modified Oct. 7, 2008.
Wikipedia, "Walsh Code", Web article, last modified Sep. 17, 2008.
Wikipedia, "Gold Code", Web article, last modified Jul. 27, 2008.
Schmersal, USA., web document: http://www.schmersalusa.com/safety_controllers/drawings/aes.pdf.
Farnell, Inc., web document: http://www.farnell.com/datasheets/36449.pdf.
Schmersal, USA., web document: http://www.schmersalusa.com/catalog_pdfs/BNS_B20.pdf.
Schmersal, USA., web document: http://www.schmersalusa.com/machine_guarding/coded_magnet/drawings/bns333.pdf.

* cited by examiner

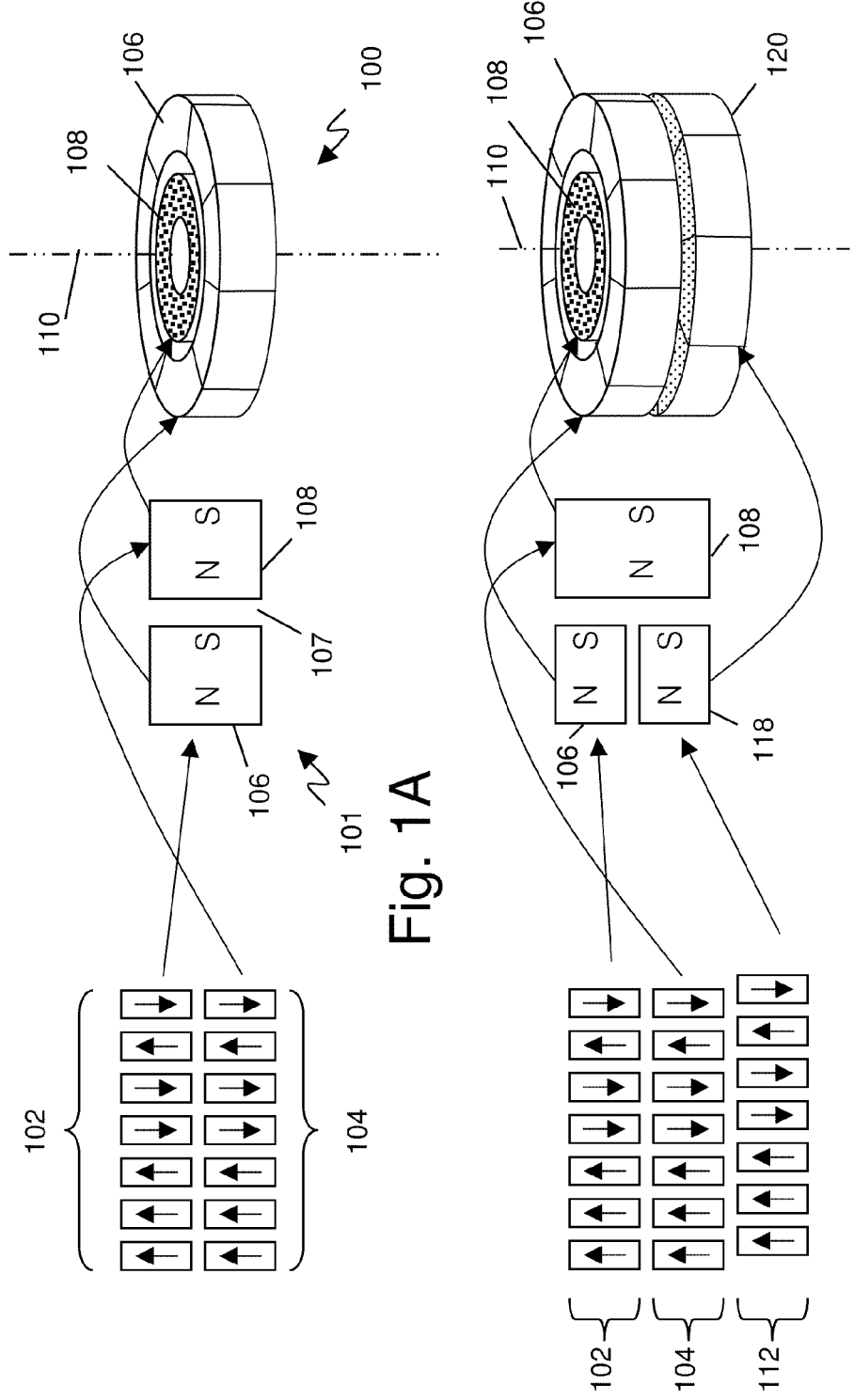

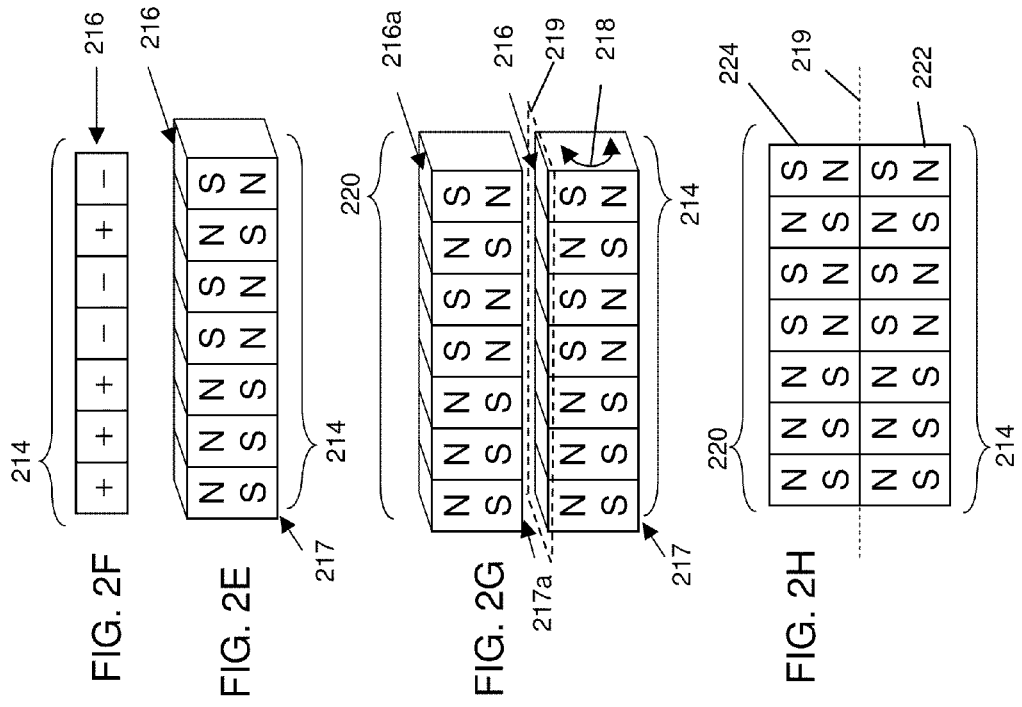

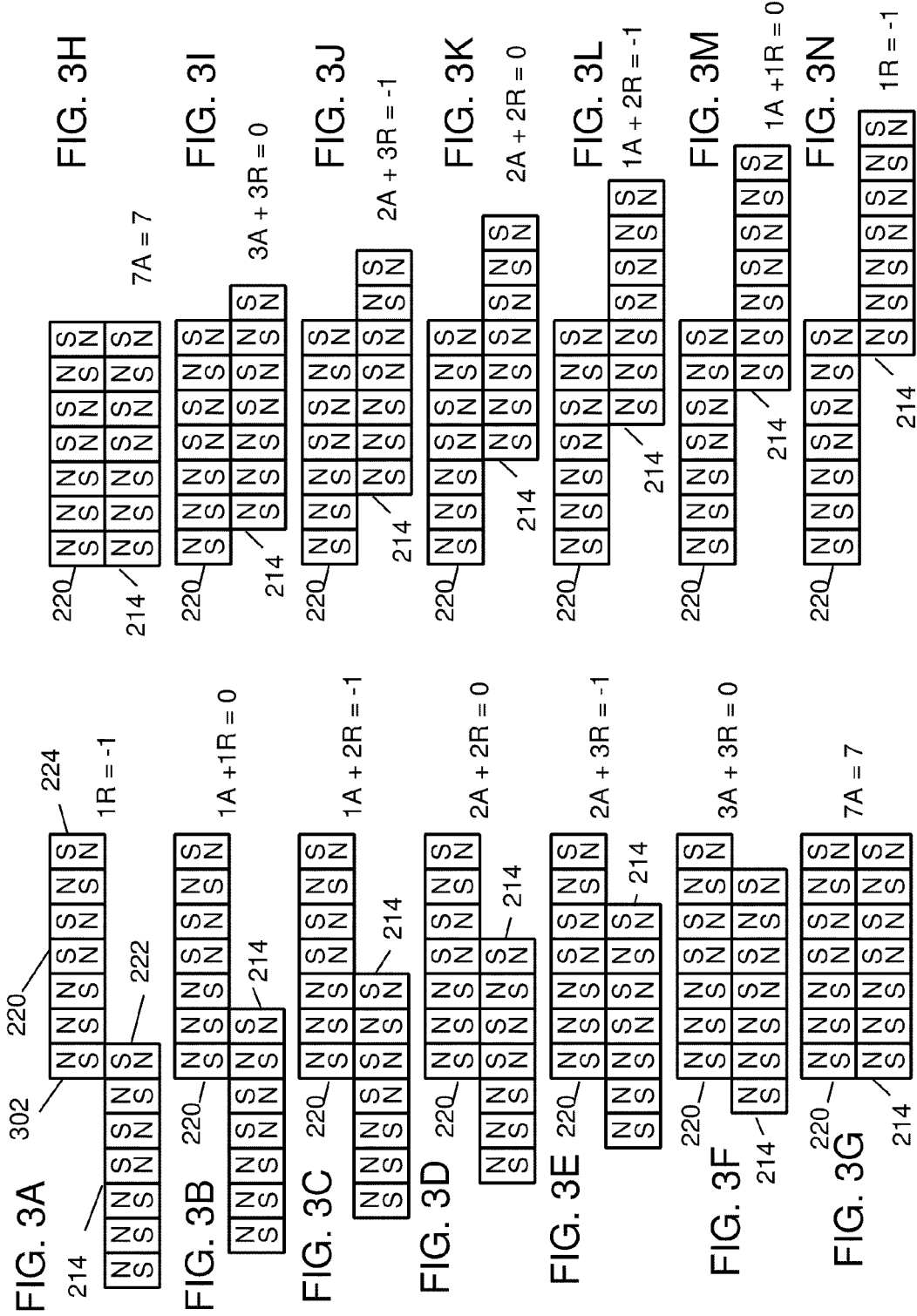

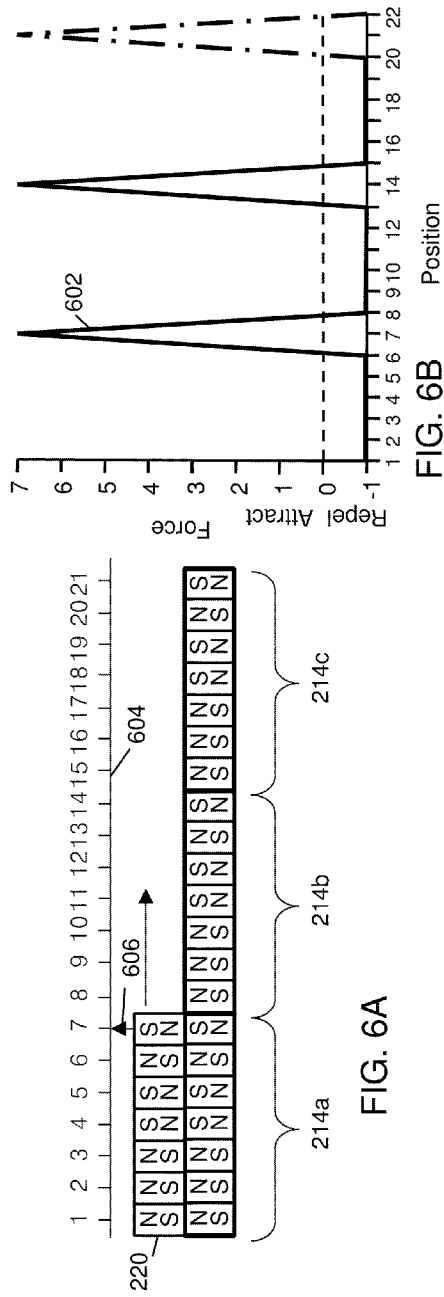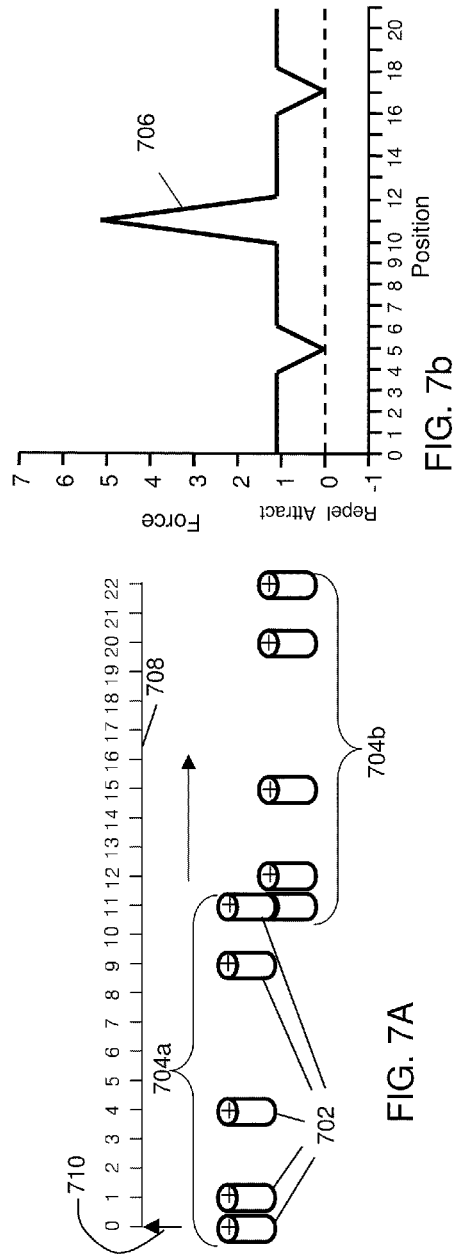

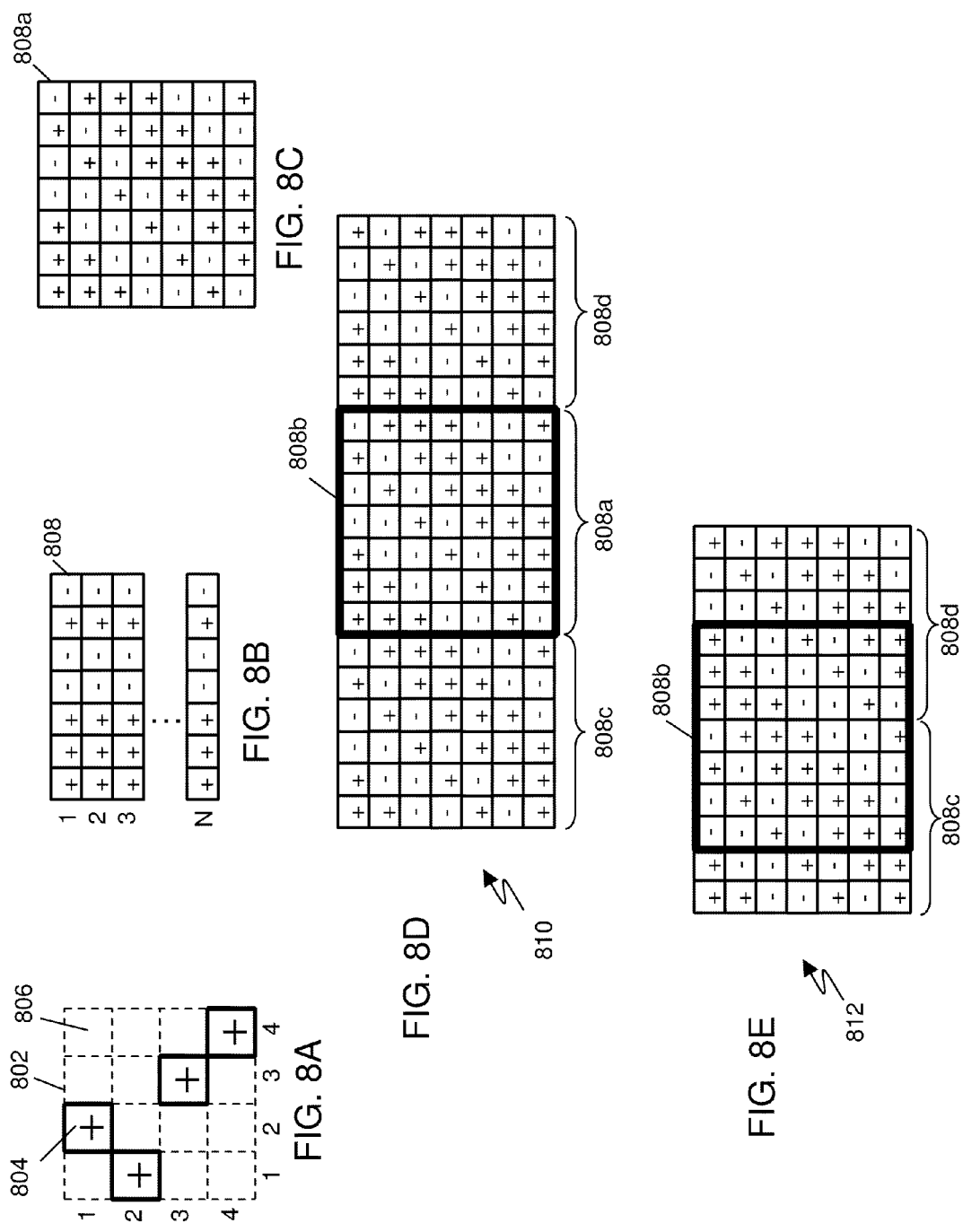

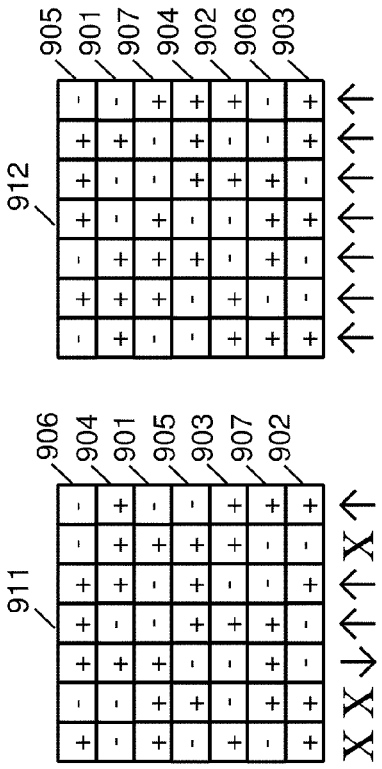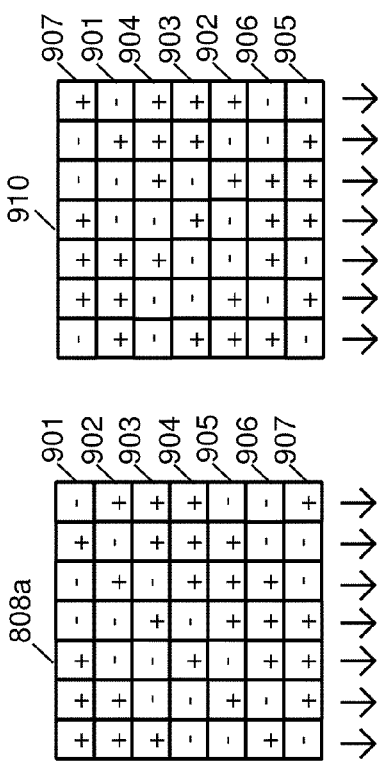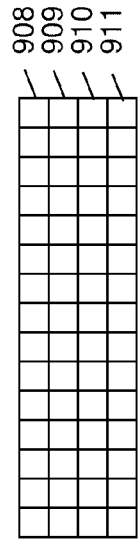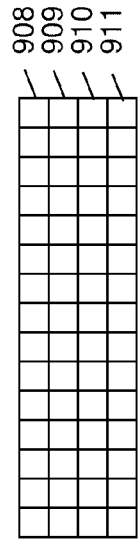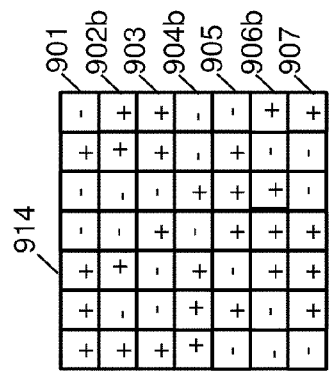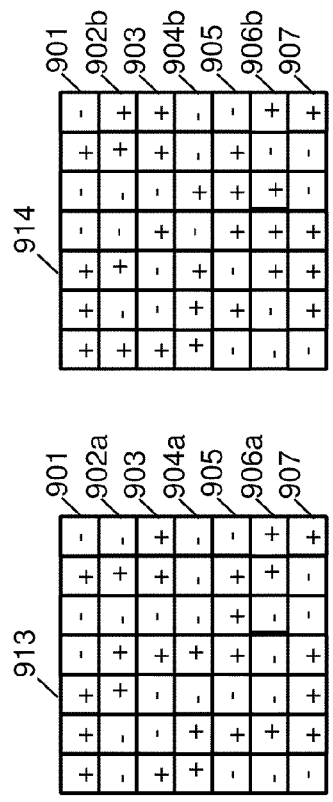

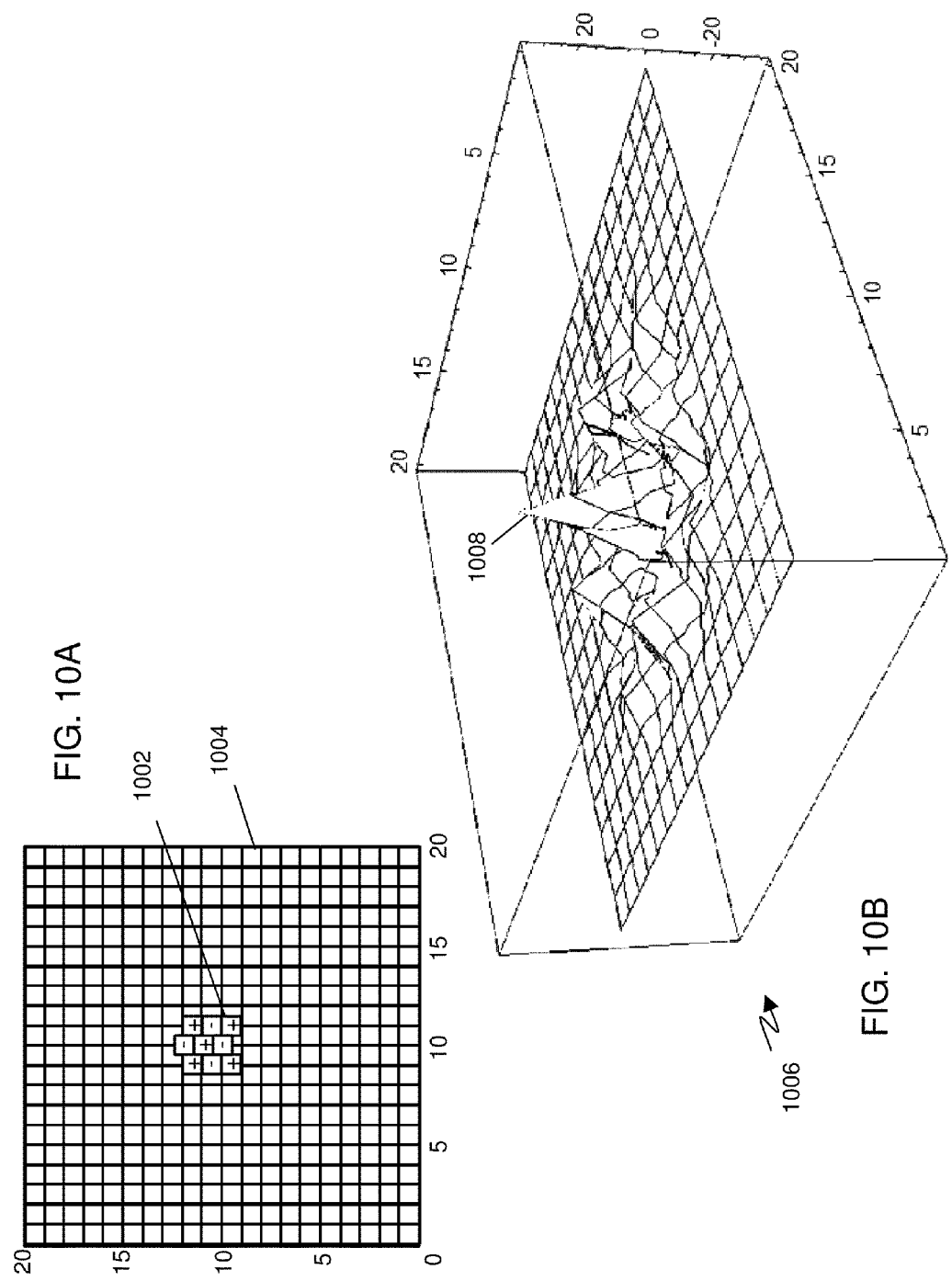

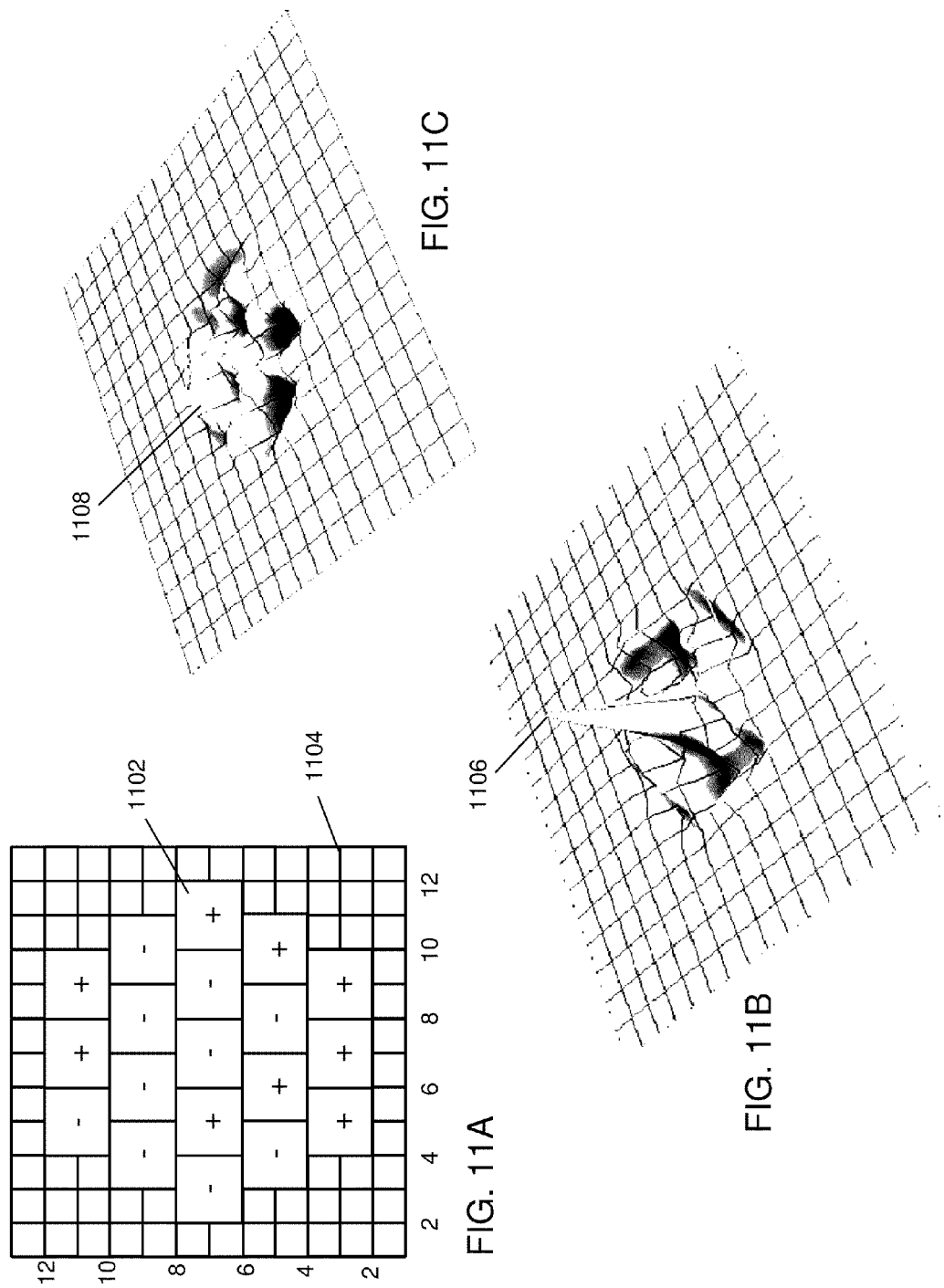

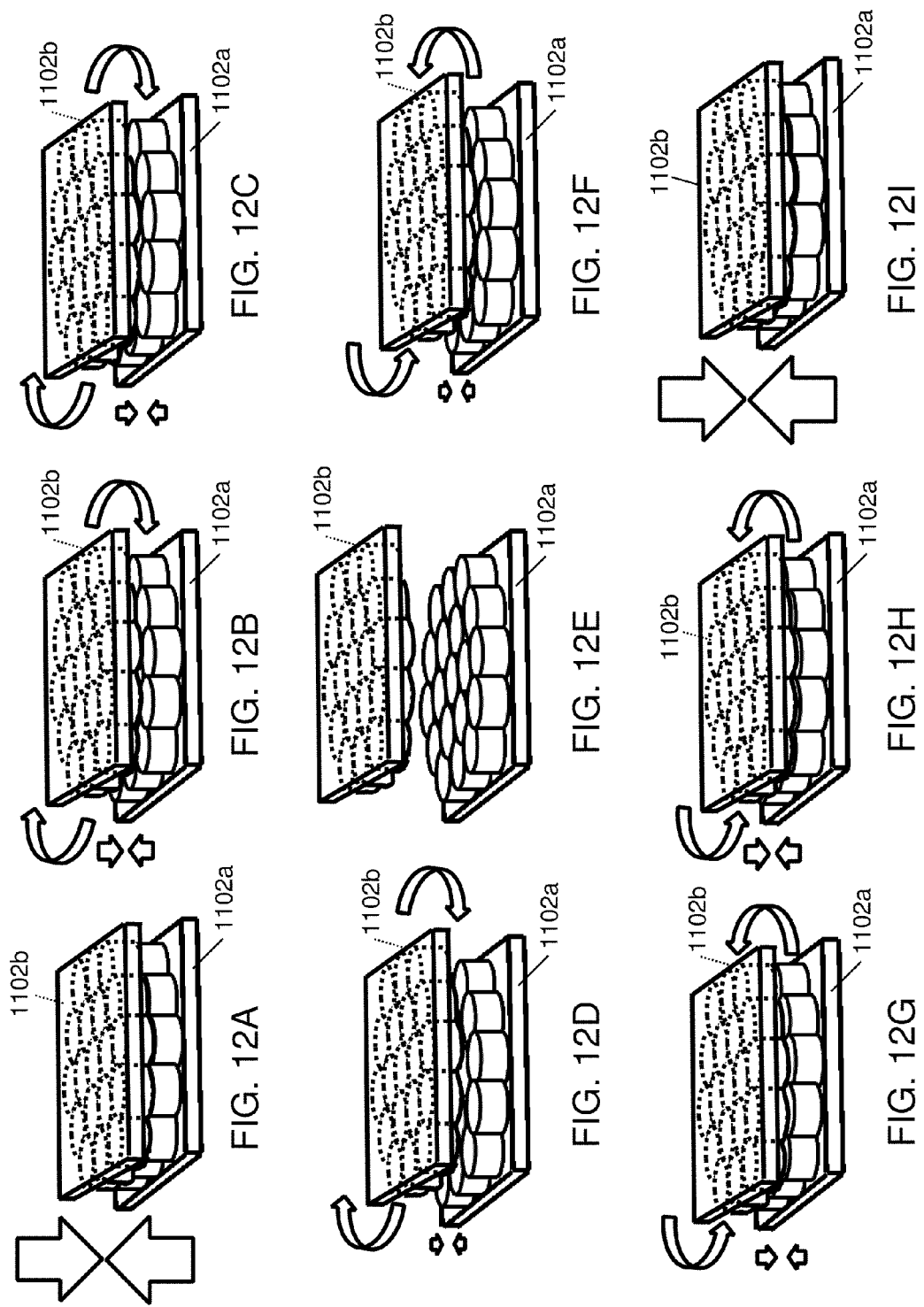

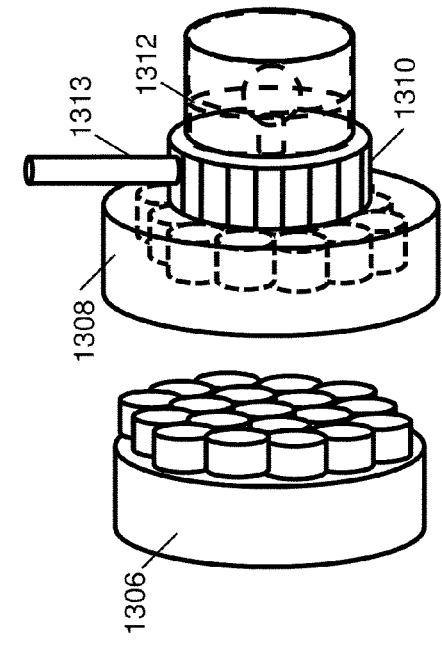
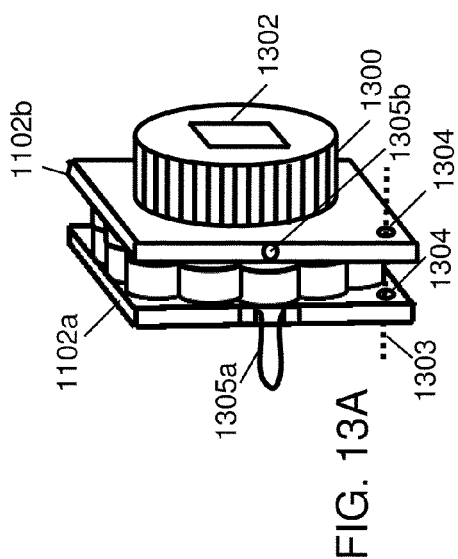
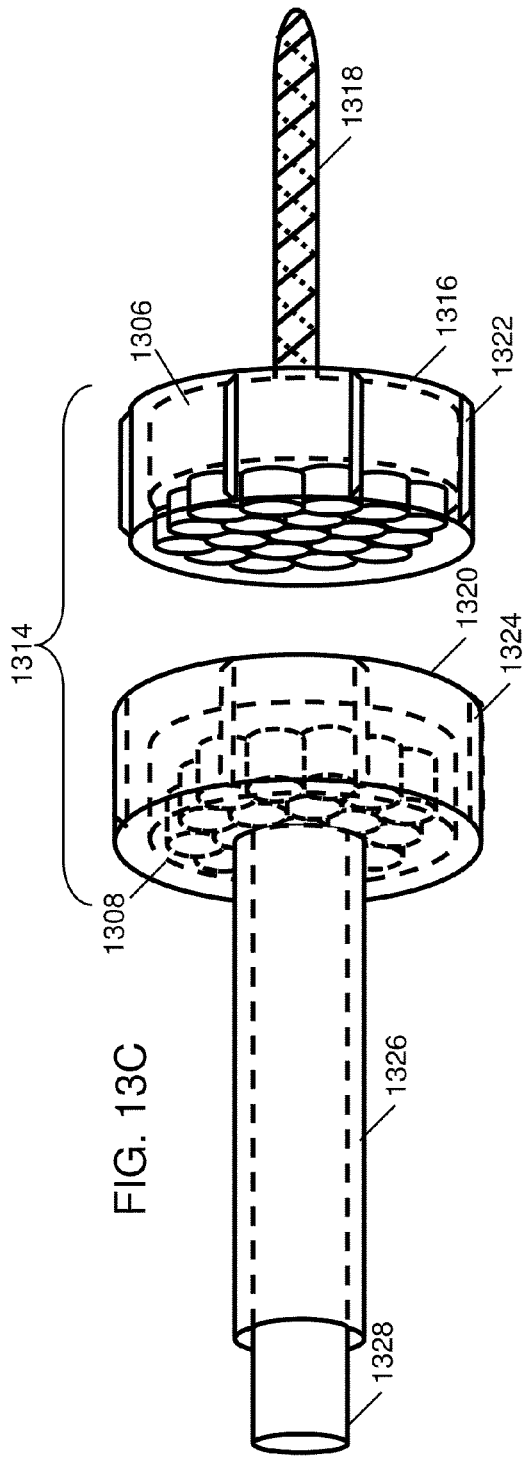
FIG. 13B
FIG. 13A
FIG. 13C

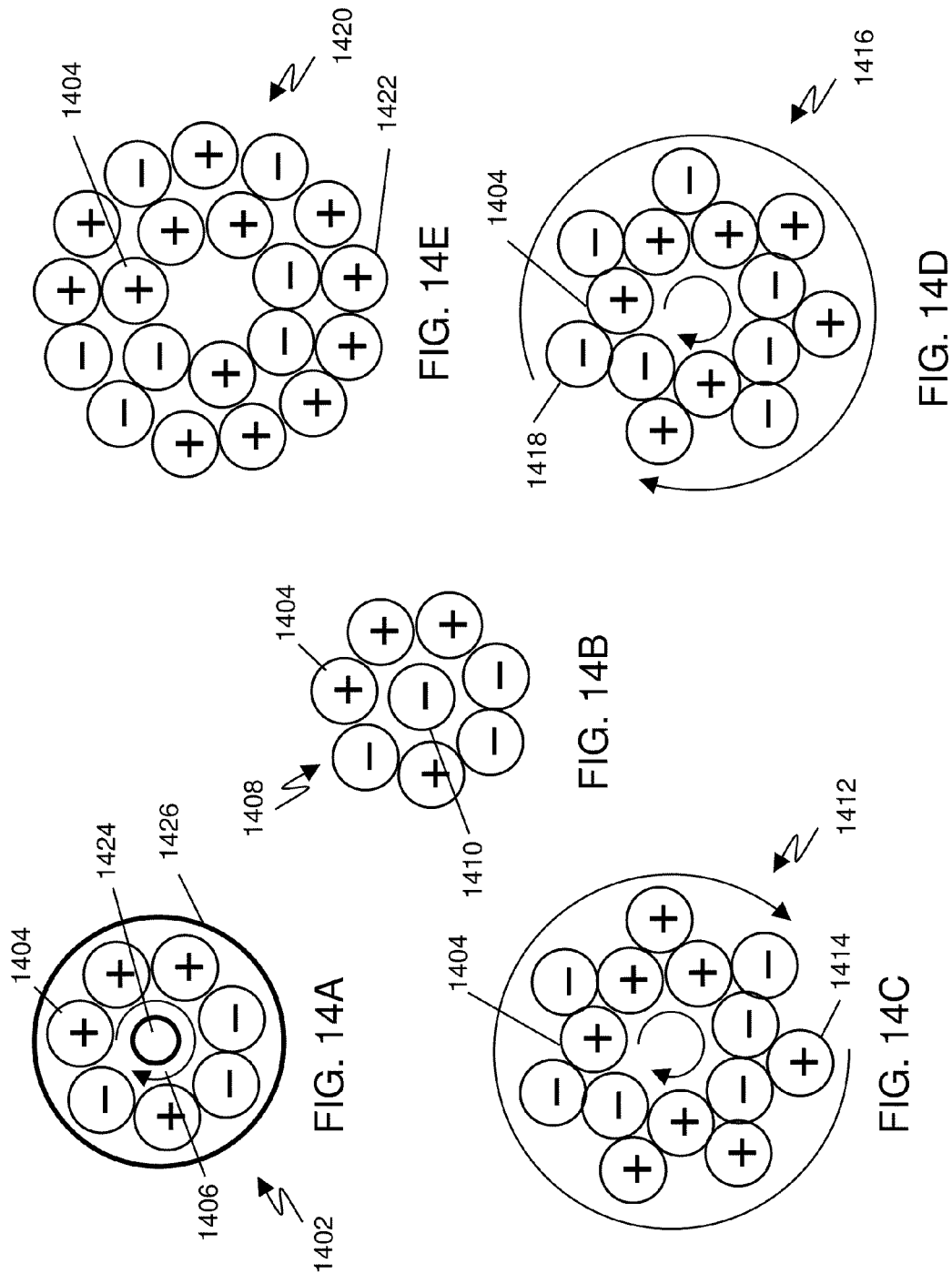

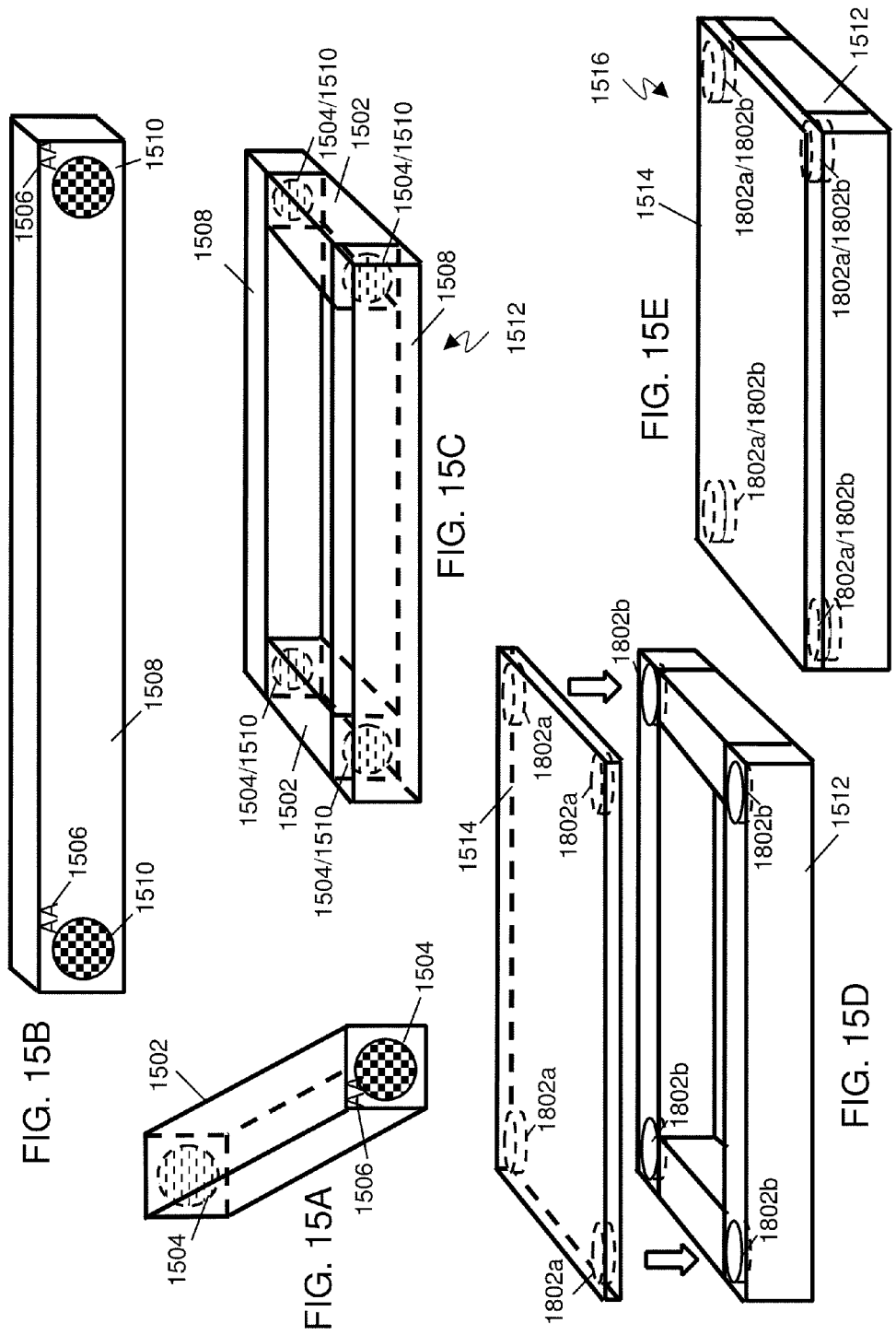

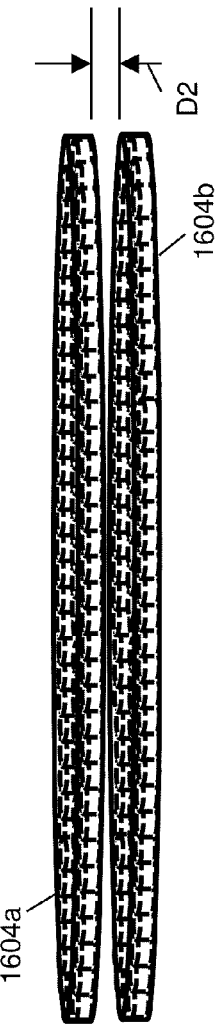
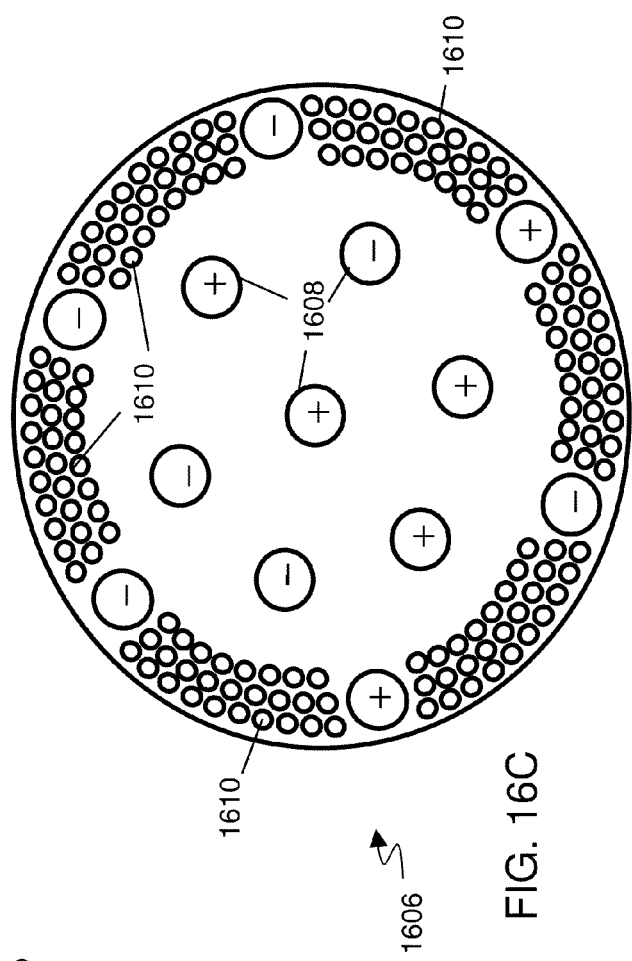
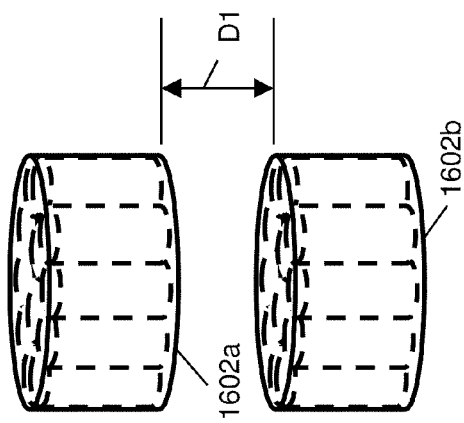
FIG. 16B
FIG. 16C
FIG. 16A

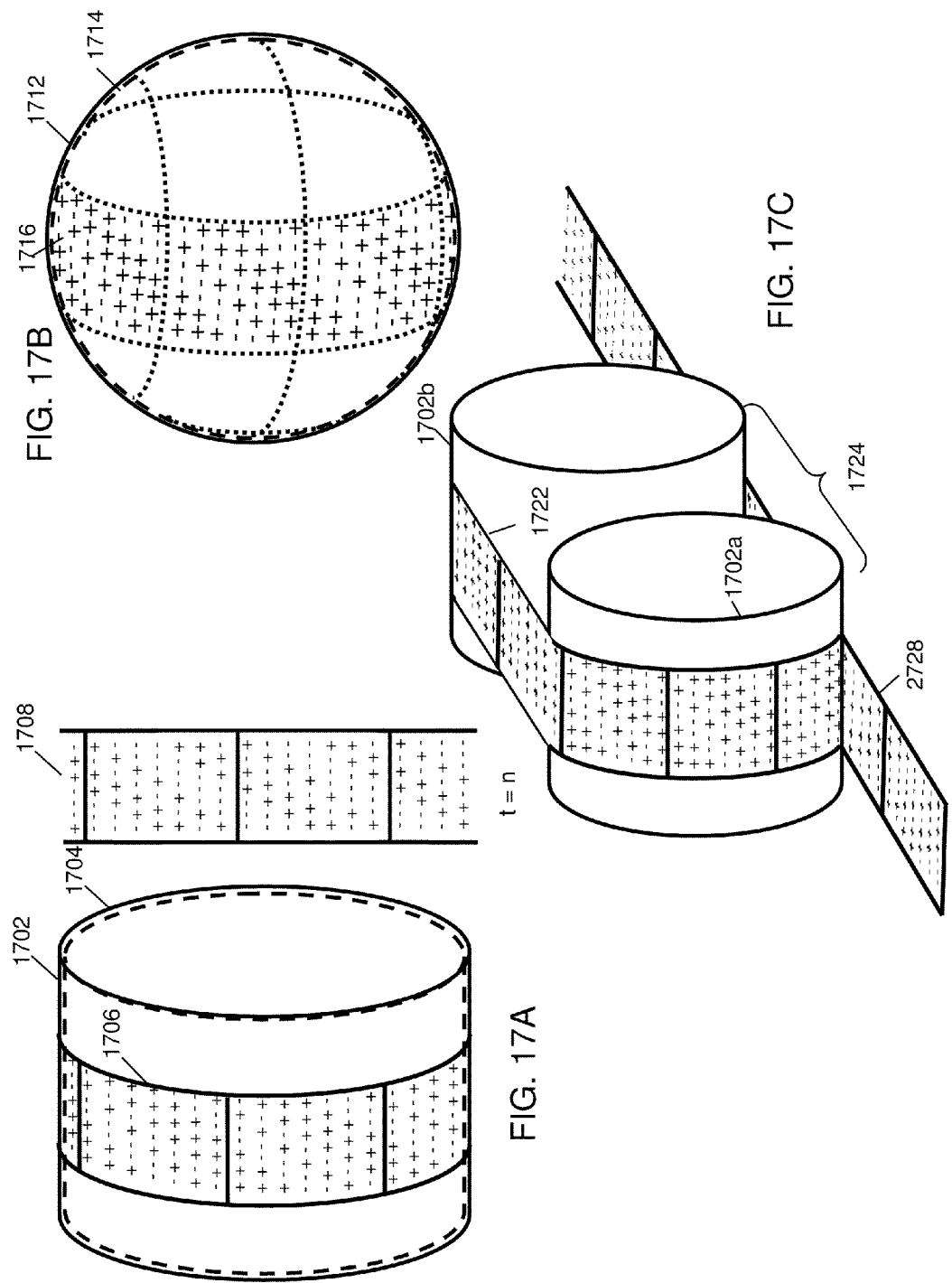

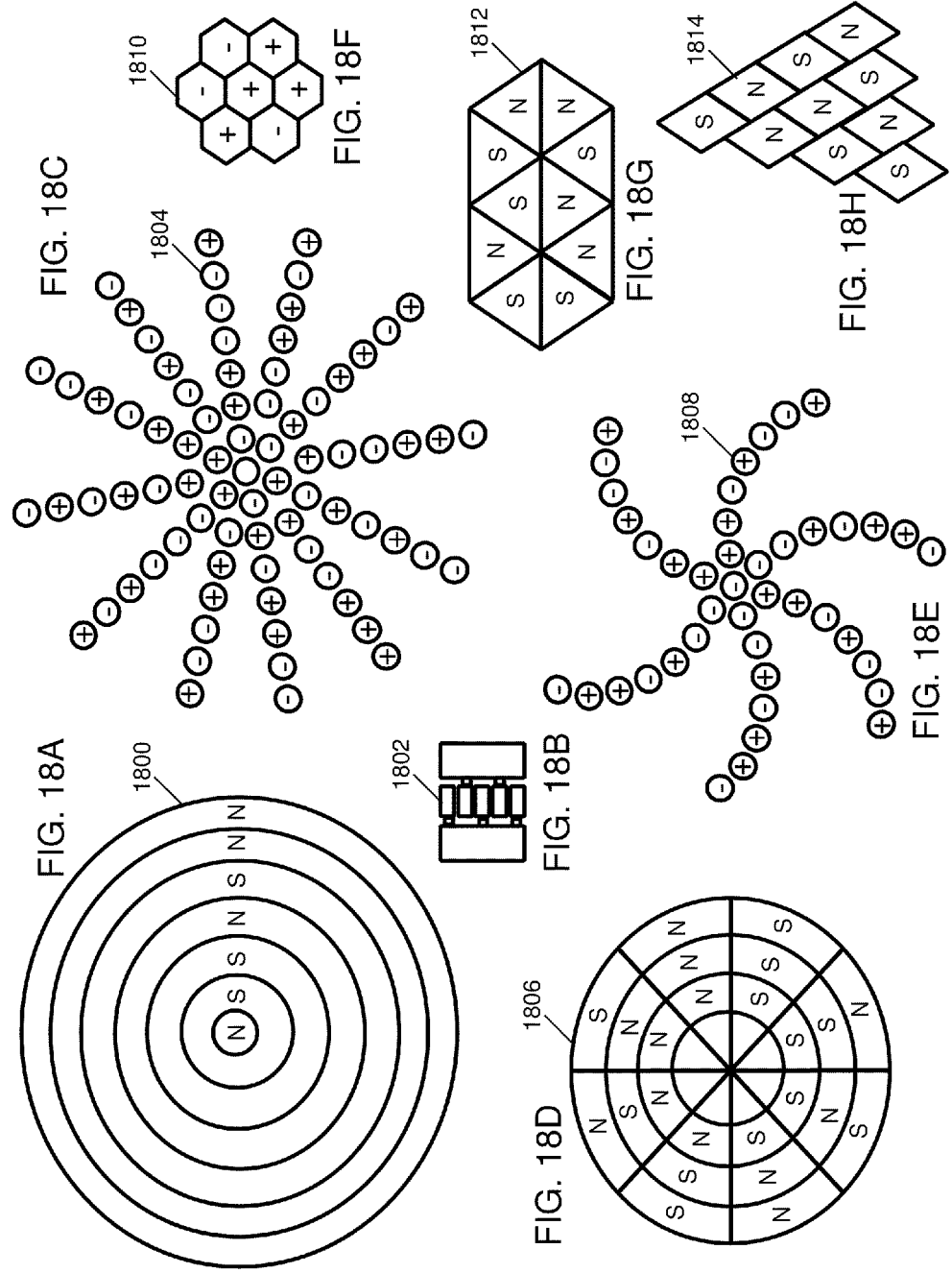

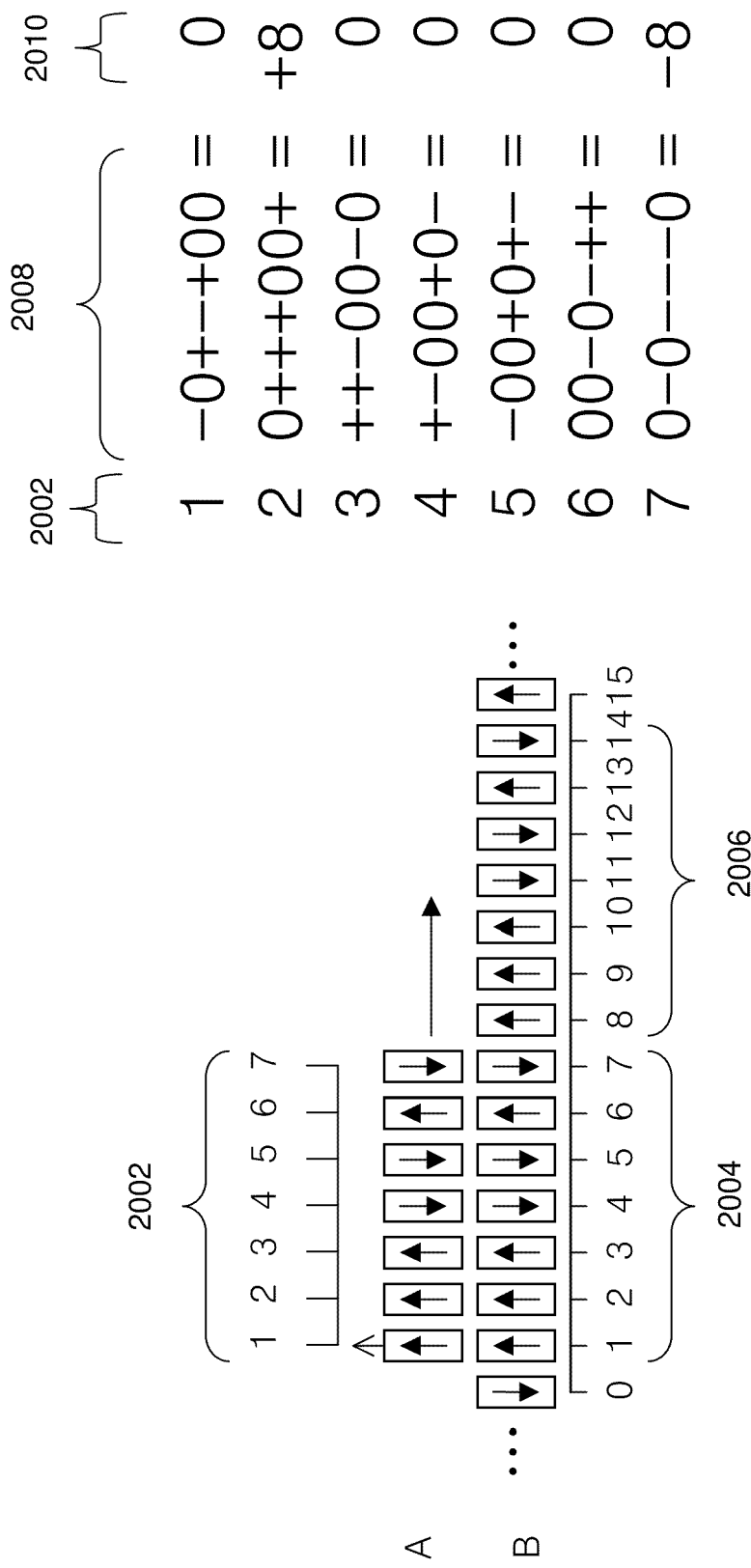

1000
2401

1100

1110

1111

1001

100-1

10-10

1221

1, –1

1246

STEPPING MOTOR WITH A CODED POLE PATTERN

RELATED APPLICATIONS

This Non-provisional Application claims the benefit under 35 USC 119(e) of prior provisional application 61/247,931 titled "Stepping Motor With Coded Pole Pattern" filed Oct. 1, 2009 by Fullerton et al; this Non-provisional application is a continuation-in-part of non-provisional application Ser. No. 12/478,911, titled "Magnetically Attachable and Detachable Panel System," filed Jun. 5, 2009 by Fullerton et al., now published as US2009/0250574-A1, which is a continuation in part of non-provisional application Ser. No. 12/476,952 filed Jun. 2, 2009, by Fullerton et al., titled "A Field Emission System and Method", which is a continuation-in-part of Non-provisional application Ser. No. 12/322,561, filed Feb. 4, 2009 by Fullerton et al., titled "System and Method for Producing an Electric Pulse", which is a continuation-in-part application of Non-provisional application Ser. No. 12/358,423, filed Jan. 23, 2009 by Fullerton et al., titled "A Field Emission System and Method", which is a continuation-in-part application of Non-provisional application Ser. No. 12/123,718, filed May 20, 2008 by Fullerton et al., titled "A Field Emission System and Method", which claims the benefit under 35 USC 119(e) of U.S. Provisional Application Ser. No. 61/123,019, filed Apr. 4, 2008 by Fullerton, titled "A Field Emission System and Method." The US Patent Applications and US Patent Publications listed above are incorporated herein by reference in their entirety.

Further background may be found in U.S. Pat. No. 7,755,462 issued Jul. 13, 2010, titled: "Ring magnet structure having a coded magnet pattern," filed Jun. 5, 2009 by Fullerton et al. and U.S. Pat. No. 7,750,781, issued Jul. 6, 2010, filed Jun. 5, 2009 by Fullerton et al.

The US patent documents and publications listed above are incorporated herein by reference in their entirety.

FIELD OF THE INVENTION

The present invention pertains generally to the field of magnetic motors, more particularly to stepping motors.

BACKGROUND

Typical stepping motors have a magnetic pole pattern that repeats multiple times around the circumference of the rotor or stator. The repeating pattern gives rise to significant ambiguity in the position of the rotor for any given drive signal configuration. The ambiguity is typically solved by synchronization with mechanical stops or electronic position sensors.

Thus there is a need for stepping motors with positive position determination without requiring synchronization with mechanical stops or electronic position sensors.

BRIEF DESCRIPTION OF THE INVENTION

The present invention relates to a stepping motor with a magnet pole pattern having a non-repetitive pattern around the circumference of the stepping motor. In one embodiment, the pattern relates to a code having a unique single maximum autocorrelation peak over the period of the code. Example codes include Barker codes, PN codes, Kasami codes, Golomb ruler codes, Maximal Length Linear Feedback Shift Register codes, and other codes.

In one embodiment, the code has an autocorrelation function having a single maximum peak per code modulo and a plurality of off maximum peak values wherein said off maximum peak values are less than some fraction, for example, one half, of the maximum peak.

In one embodiment, the code may preferably be greater than a predetermined length, for example four. Ranges indicated herein are intended to include any subrange.

In one embodiment, the rotor and stator have a matching pole pattern.

In one embodiment, the drive is arranged to align the poles in an inline configuration, alternatively, the drive may be arranged to align the poles in a diagonal configuration.

In a further embodiment, a first set of poles and a second set of poles are provided on the stator such that the first set and the second set have the same pattern, each pole pattern having a fixed pole to pole spacing, the first set and the second set being offset rotationally by partial pole spacing, preferably a half pole spacing. Additional sets of poles may be provided, each separated by a partial pole spacing, alternatively referred to as a partial pole shift in phase.

In a further embodiment, the poles of the stator have the same sequence as the poles of the rotor, but are offset by an incremental amount per pole to generate a vernier pole pattern.

In a further embodiment, two levels of poles may be provided. Hierarchical pole sets may be provided according to a first code. Each pole set may comprise a set of poles according to a second code.

In one embodiment, the stepping motor has a single stable lock-in angle per revolution. In another embodiment, more than one code modulo may be used around the rotor and thus there may be more than one stable lock-in point per revolution.

In a further embodiment, a composite drive is provided to the stator of the stepping motor. The composite drive may be the summation of multiple shifted copies of the rotor code pattern.

The invention further includes associated methods for making and using a stepping motor with a coded pole pattern.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 1A and FIG. 1B depict an exemplary stepping motor with coded magnet structures in accordance with the present invention.

FIG. 2A-FIG. 2H illustrate various magnet concepts and structures utilized by the present invention.

FIG. 3A-FIG. 3N illustrate a sequence of relative shift positions for a Barker 7 magnet structure and a complementary Barker 7 magnet structure.

FIG. 6A and FIG. 6B show a cyclic implementation of a Barker 7 code.

FIG. 7A and FIG. 7B show two magnet structures coded using a Golomb ruler code.

FIG. 8A-FIG. 8E show various exemplary two dimensional code structures in accordance with the present invention.

FIG. 9A-FIG. 9F illustrate additional two dimensional codes derived from the single dimension Barker 7 code.

FIG. 9G illustrates a further alternative using four codes of low mutual cross correlation.

FIG. 10A and FIG. 10B depict a magnetic field emission structure comprising nine magnets in three parallel columns of three magnets each with the center column shifted by one half position.

FIG. 11A-FIG. 11C depict an exemplary code intended to produce a magnetic field emission structure having a first stronger lock when aligned with its mirror image magnetic field emission structure and a second weaker lock when rotated 90° relative to its mirror image magnetic field emission structure.

FIGS. 12A-12I depict the exemplary magnetic field emission structure and its mirror image magnetic field emission structure.

FIG. 13A-FIG. 13D depict various exemplary mechanisms that can be used with field emission structures and exemplary tools utilizing field emission structures in accordance with the present invention.

FIG. 14A-FIG. 14E illustrate exemplary ring magnet structures based on linear codes.

FIG. 15A-FIG. 15E depict the components and assembly of an exemplary covered structural assembly.

FIG. 16A and FIG. 16B illustrate relative force and distance characteristics of large magnets as compared with small magnets.

FIG. 16C depicts an exemplary magnetic field emission structure made up of a sparse array of large magnetic sources combined with a large number of smaller magnetic sources.

FIG. 17A-FIG. 17C illustrate several exemplary cylinder and sphere arrangements, some arrangements including coupling with linear track structures.

FIG. 18A through FIG. 18H provide a few more examples of how magnetic field sources can be arranged to achieve desirable spatial force function characteristics.

FIG. 20A and FIG. 20B illustrate a model of the torque generated by the stepping motor of FIG. 1 at full step aligned positions.

DETAILED DESCRIPTION OF THE INVENTION

Figure 4B:
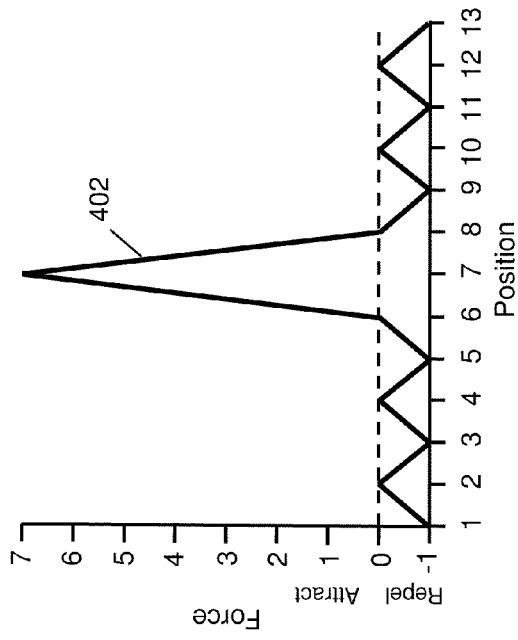
FIG. 4A and FIG. 4B illustrate the normal force between variably coded magnet structures for sliding offsets shown in FIGS. 3A-3N.

FIG. 1A depicts an exemplary single phase stepping motor in accordance with the present invention. Referring to FIG. 1A, FIG. 1A shows a stepping motor 100 having a rotor 108 and stator 106. The rotor and stator each have seven magnets radially magnetized with poles facing one another across the rotor/stator gap. A vertical cross section 101 shows the relative pole orientation of the stator 106 and rotor 108 across the rotor/stator gap 107. FIG. 1A shows a stator (outer ring) magnetic pole field pattern 102 and a rotor (inner ring) magnetic field pattern 104. The patterns are shown linearly for simplicity, but actually represent the rotational sequence of magnets in the motor 100. Typically, the rotor is permanently magnetized and the stator comprises electromagnets that may be driven to generate torque or motion, as desired, in the rotor. The stator field pattern is shown using the same code as the rotor and in the same position as the rotor, thus, holding the rotor in a stable position. By shifting the stator pattern left or right, torque will be generated tending to move the rotor to the left or right, respectively. The rotor has a rotational axis 110 shown vertically. The rotor may be operatively coupled to a shaft (not shown). The exemplary pattern 102 shown is for a Barker length 7 code. The inner ring typically comprises permanent magnets and the outer ring typically comprises electromagnets. Other arrangements are possible including reversal of rotor/stator and electromagnetic and permanent magnet fields. Both may be electromagnetic fields. One or both may be electro/permanent magnets. The rotor is shown as being configured as a cylinder with longitudinal magnets polarized in a radial direction. Alternatively, the rotor may be a disk forming a plane perpendicular to the rotational axis with radial magnets polarized parallel to the rotor axis (through the thickness of the disk). In further alternatives, the rotor may be a ring (without a shaft). In one embodiment, the ring may drive a lead screw to provide linear motion. Other arrangements are possible as are known by those in the art of stepping motors.

The Barker length 7 code is used repeatedly as an example in this disclosure. Alternatively Barker codes of other lengths may be used. Also various alternative codes may be used including PN codes, Kasami codes, Gold codes, Golomb ruler codes and other codes. In one embodiment, a desirable code property is a single maximum autocorrelation function.

Stepping motors based on codes having a single maximum autocorrelation function will have a single stable lock in point, i.e., the rotor and stator will have one particular relative angle where the rotor is held in place. Other angles will either generate a torque to move toward the stable point or will have nearly zero torque and thus will not lock-in to any particular point. These torque profiles will be described later in this disclosure.

In one embodiment, a code with a desirable cyclic autocorrelation function is used to establish the pole configuration for a single revolution of the stepping motor such that the beginning and end of the code are adjacent, utilizing one cycle of the code for one cycle (360 degree circle of rotation) of the stepping motor. In an alternative embodiment, more than one cycle of the code may be used for one 360 degree rotation of the stepping motor.

FIG. 1B depicts an exemplary two phase stepping motor in accordance with the present invention.

FIG. 1B shows the rotor 108 and two stators 106, 120. The two stators have the same code magnet pattern 102, 112, which matches the pattern of the rotor 104. The two stators are offset by one half magnet pole spacing width. In operation, the two stators may be driven alternately to advance the rotor in a given direction. In one embodiment, a first rotor is driven with the code pattern. The first rotor may then be turned off and simultaneously, the second rotor is driven with the code pattern to advance the rotor by one half pole distance. Then the second may be turned off while simultaneously driving the first with a code pattern advanced by one pole distance from the initial position. The process may then be repeated to advance to a desired position.

Alternatively, the two stators may be driven in an overlapping manner. The two stators are driven simultaneously with code patterns offset by one half pole position. The rotor aligns midway between the two. To advance in a given direction, the stator that lags in the desired direction is changed to shift the pattern by one pole spacing in the desired direction. The other stator remains in the same position. The rotor then advances by one half pole spacing in the desired direction. The next move is made by the second stator advancing by one pole position.

Coded Magnet Structures

Numerous codes of different lengths and geometries are available to suit a wide range of applications. A general discussion on codes and geometries for coded magnet structures will now be described with reference to several drawings.

Coded magnet structures were first fully disclosed in U.S. Provisional Patent Application 61/123,019, titled "A Field Emission System and Method", filed Apr. 4, 2008. Coded magnet structures are alternatively referred to as field emission structures, coded field emissions, correlated magnets, and coded magnets. The fields from coded magnet structures may be referred to as coded field emissions, correlated field emissions, coded magnetic fields, or correlated magnetic fields. Forces from interacting coded magnet structures may be referred to as a spatial force function or force function resulting from correlated fields.

A coded magnet structure is typically a set of magnets positioned along an interface boundary with the north-south orientation of each individual magnet field at the interface boundary selected to be positive (north-south) or negative (south-north) according to a predefined pattern, alternatively referred to as a code. Alternatively, the spacing between magnets may be defined by the pattern. The pattern typically appears random or pseudorandom; however, the pattern may be carefully designed or selected to have certain properties desired for a given application. These properties include, but are not limited to precise alignment, maximum response at alignment, minimal response out of alignment, the ability to use different codes that prevent alignment between the different codes, but allow alignment for the same code. These properties can be applied to yield a multitude of benefits including but not limited to precise positioning, strong holding force, easy release, unambiguous assembly of multiple parts and/or multiple positions, rolling contact or contact free power transfer (magnetic gears), new types of motors, and magnetic suspension. Note that coded magnet structures may include contiguous magnet material with a spatial and/or polarity pattern of magnetization along the material. Basic coded magnet structures will now be introduced with reference to the Figures.

FIG. 2A depicts an exemplary bar magnet showing the South and North poles and associated magnetic field vectors. Referring to FIG. 2A, a magnet 200 has a South pole 201 and a North pole 202. Also depicted are magnetic field vectors 203 that represent the direction and magnitude of the magnet's moment. North and South poles are also referred to herein as positive (+) and negative (−) poles, respectively. In accordance with the invention, magnets can be permanent magnets, impermanent magnets, electromagnets, involve hard or soft material, and can be superconductive. In some applications, magnets can be replaced by electrets. Magnets can be most any size from very large to very small to include nanometer scale structures. In the case of non-superconducting materials there is a smallest size limit of one domain. When a material is made superconductive, however, the magnetic field that is within it can be as complex as desired and there is no practical lower size limit until you get to atomic scale. Magnets may also be created at atomic scale as electric and magnetic fields produced by molecular size structures may be tailored to have correlated properties, e.g. nanomaterials and macromolecules. At the nanometer scale, one or more single domains can be used for coding where each single domain has a code and the quantization of the magnetic field would be the domain.

FIG. 2B and FIG. 2C illustrate the familiar magnetic principle that unlike poles attract and like poles repel. FIG. 2B shows two magnets, magnet 204 and magnet 206a, arranged to have unlike poles in proximity to one another, the north pole of magnet 204 is near the south pole of magnet 206a, thus the magnetic fields attract and the magnets are drawn together as shown by the arrows. FIG. 2C shows magnet 204 with magnet 206b arranged with the north poles in proximity. The resulting force repels the magnets as shown by the arrows. Coded magnet structures utilize multiple magnets like those shown in FIG. 2B and FIG. 2C. A magnet structure typically includes a parallel array of a number of magnets oriented N-S interspersed with magnets oriented opposite, or S-N. The magnet structure is typically paired with another magnet structure of corresponding magnets. The magnets in the corresponding magnet structure may be selected so that when the two magnet structures are aligned, each magnet of the first structure is attracted to a corresponding magnet of the second structure. Alternatively the magnets may be selected to repel so that when the two magnet structures are aligned, each magnet of the first structure is repelled by a corresponding magnet of the second structure. When the magnet structures are not aligned, the non-aligned forces combine according to the code properties of the particular magnet arrangement. Various codes and their properties as applied to magnet arrangement are further discussed in this disclosure.

FIG. 2D illustrates a linear magnet structure of seven magnets uniformly oriented in the same direction. The seven magnets bonded together in a magnet structure 212 behave essentially as a single magnet. A magnet structure typically refers to a set of magnets rigidly bonded together as if glued or potted to act mechanically as a single piece, although some flexible bonding arrangements are disclosed. The magnets of the magnet structure 212 depicted in FIG. 2D require bonding since without such bonding they would naturally orient themselves such that every magnet would be oriented opposite the orientation of the magnet(s) on either side of it. Such naturally aligned magnets are not coded magnet structures, where at least one magnet is oriented in a manner that requires a bonding or holding mechanism to maintain its orientation. Each of the seven magnets of FIG. 2D and other illustrations of this disclosure may also be referred to as component magnets of the magnet structure, magnetic field sources, magnetic field emission sources, or field emission sources.

FIG. 2E illustrates the linear structure of FIG. 2D with the magnets in an exemplary arrangement to form a variably coded structure 214 so that some of the magnets have the north pole up and some have the south pole up in accordance with the present invention. Due to the placement of side by side magnets of the same polarity, the magnets will require a holding force. As such, FIG. 2C depicts a uniformly coded magnet structure 212 while FIG. 2D depicts a variably coded magnet structure 214, where each of the two coded magnet structures requires a bonding or holding mechanism to maintain the orientation of its magnets. As used herein, a variable code may be a code with both positive and negative polarities, alternatively as will be discussed later, a variable code may be a code with different spacings between adjacent magnets.

FIG. 2F shows the top face of the magnet structure of FIG. 2E. Taking the top face as the reference face 216 of the structure and designating "+" for the north pole and "−" for the south pole, the sequence of magnets may be designated "+++−−+−", as shown. Alternatively, the sequence may be written: "+1, +1, +1, −1, −1, +1, −1", where "+1" indicates the direction and strength of the magnet as a direction of north and a strength of one unit magnet. For much of the exemplary discussion in this disclosure, the actual strength of the magnet is arbitrary. Much of the discussion relates to using several magnets of equal strength in complex arrangements. Thus, "one magnet" is the arbitrary magnetic strength of a single magnet. Additional coded magnet structure arrangements for unequal strength or unequal physical size magnets may also be developed in accordance with the teachings herein. The surface of the top face 216 may be referred to as an interface surface since it can be brought into proximity with a corresponding interface surface of a second magnet structure in the operation of the invention to achieve the benefits of the magnet arrangements. Under one arrangement, the surface of the bottom face 217 may also be referred to as a second interface surface 217 since it can be brought into proximity with a corresponding interface surface of another magnet structure (e.g., a third coded magnet structure) in the operation of the invention to achieve the benefits of the magnet arrangements. FIG. 2G illustrates the exemplary magnet structure of FIG. 2E in proximity and in alignment with a complementary magnet structure in accordance with the present invention. Referring to FIG. 2G, magnet structure 214 has the sequence "+, +, +, −, −, +, −" on interface surface 216. Complementary magnet structure 220 has the magnetic arrangement sequence: "−, −, −, +, +, −, +" as viewed on the underside surface 217 interfacing with magnet structure 214. Thus, the sequence is "complementary" as each corresponding opposite magnet across the interface plane 216 forms an attraction pair with the magnet of structure 214. A complementary magnet structure may also refer to a magnet structure where each magnet forms a repelling pair with the corresponding opposite magnet across the interface plane 214. The interface surface 216 is conformal to an interface plane 219 dividing the components of structure 214 and complementary structure 220 and across which 219 the structures 214 and 220 interact. The interface plane 219 may alternatively be referred to as an interface boundary, because the "plane" may take various curved or complex shapes including but not limited to the surface of a cylinder, cone, sphere, or stepped flats when applied to various different magnet structures.

Typically in this disclosure, complementary surfaces of magnet structures are brought into proximity and alignment to produce an attractive force as the exemplary embodiment. However, the like surfaces of magnet structures can be brought into proximity and alignment to produce a repelling force, which can be accomplished by rotating one of the magnet structures 180° (as indicated by arrow 218) so that two like faces 217, 217a (or 216, 216a) are brought into proximity. Complementary structures are also referred to as being the mirror image of each other. As described herein, relative alignments between surfaces of magnet structures can be used to produce various combinations of attraction and repelling forces.

Generally speaking, a given magnet structure is used with a complementary magnet structure to achieve the desired properties. Typically, complementary structures have the same magnetic field magnitude profile across an interface boundary and may have the same or opposite polarity. Special purpose complementary structures, however, may have differing profiles. Complementary magnet structures may also be referred to as having a mirror pattern of each other across an interface boundary, keeping in mind that the magnets of the structures may have opposite polarities or the same polarities causing them to attract or repel each other when aligned, respectively.

FIG. 2H shows an alternate notation illustrating the magnet structures 214 and 216 in alignment. The notation of FIG. 2H illustrates the flat side of each magnet with the N-S indication of polarity. Each structure 214, 220 is a physically bonded unit, i.e., all magnets of a structure move right or left, up or down together. The two structures are shown in sliding contact at the interface boundary 219 (alternatively referred to as the interface plane 219). (Contact is interesting because forces are at maximum when in contact, but contact is not necessary.) Contact generally refers to the condition where the two magnet structures are in contact, whether the magnets themselves are in contact or not. Proximity generally means that the two magnet structures are close to one another within a distance corresponding to a lateral code element spacing, i.e., magnet to magnet spacing, preferably within half of the code element spacing. The two structures 214, 220 are free to move relative to each other and to exert response forces resulting from the interacting magnetic fields. Alignment of a base structure 214 with a complementary structure 220 means that each complementary magnet of the complementary structure is directly across the interface boundary 219 from the corresponding magnet of the base structure 214. Alignment may also refer to alignment of individual magnets, referring then to the alignment of the center of the magnetic field with the center of the magnetic field of the magnet across the interface surface for maximum attraction or repelling force. For example, magnet 222 at the right end of the base structure 214 is aligned with the complementary magnet 224 at the right end of the complementary structure 220. Magnet 224 is across the interface boundary 219 from magnet 222. The designation of base structure and complementary structure is typically a convenience for discussion purposes and the terms can be reversed since the two structures are each complementary structures to each other. Magnets are substantially aligned when the magnet axis centers are within a half width of one of the magnets. Magnet structures are substantially aligned when the component magnets are substantially aligned. Alternatively, substantial alignment may mean that the magnets or structures are within half of the peak force function from best alignment. Alignment is assumed to include and ignore normal mechanical and other construction tolerances in practice. Depending on context, especially when discussing magnet structures of differing codes, alignment may refer to a mechanical alignment of the overall structure and/or individual magnets even though the magnetic fields may not match in a complementary manner and thus the alignment may not generate a strong attracting or repelling force.

Magnet structures may be depicted in this disclosure as containing magnets that entirely fill the space from one position to the next in the coded structure; however, any or all magnet positions may be occupied by magnets of lesser width.

The polarity sequence pattern of exemplary magnet structure 214 corresponds to the polarity sequence of a 7 length Barker code. The sequence of the complementary structure 220 corresponds to the reverse polarity of a Barker 7 code. Barker codes have optimal autocorrelation properties for particular applications, which can result in distinctly useful magnetic attraction (or repelling) properties for magnet structures when applied in accordance with the present invention. In particular, one property is to produce a maximum, or peak, attractive or repelling force when the structures are aligned with greatly reduced force when misaligned, for example, by one or more magnet widths. This property can be understood with reference to FIG. 3A-FIG. 3N.

FIG. 3A-FIG. 3N illustrate a sequence of relative shift positions for a Barker 7 magnet structure and a complementary Barker 7 magnet structure. Referring to FIG. 3A, note first that magnet structures 220 and 214 are no longer aligned (alternatively referred to as misaligned) in contrast with FIG. 2H and complementary magnets 222 and 224 are no longer aligned, also in contrast to FIG. 2H. Instead, magnet 222 is in alignment with corresponding magnet 302 directly across the interface boundary. Referring generally to FIG. 3A-FIG. 3N, a Barker length 7 code (1, 1, 1, −1, −1, 1, −1) is used to determine the polarities and the positions of magnets making up a first magnetic field emission structure 220. Each magnet has the same or substantially the same magnetic field strength (or amplitude), which for the sake of this example is provided a unit of 1 (where A=Attract, R=Repel, A=−R, A=1, R=−1). A second magnetic field emission structure that is identical to the first is shown in 13 different alignments in FIG. 3A through FIG. 3N relative to the first magnetic field emission structure FIG. 3A. (Note that magnet structure 220 is identical to magnet structure 214 in terms of magnet field directions; however the interfacing poles are of opposite polarity.) For each relative alignment, the number of magnets that repel plus the number of magnets that attract is calculated, where each alignment has a total spatial force in accordance with a spatial force function based upon the correlation function and magnetic field strengths of the magnets. In other words, the total magnetic force between the first and second magnet structures is determined as the sum from left to right along the structure of the individual forces, at each magnet position, of each magnet or magnet pair interacting with its directly opposite corresponding magnet in the opposite magnet structure. Where only one magnet exists, the corresponding magnet is zero, and the force is zero. Where two magnets exist, the force is R for equal poles or A for opposite poles. Thus, for FIG. 3A, the first six positions to the left have no interaction. The one position in the center shows two "S" poles in contact for a repelling force of 1. The next six positions to the right have no interaction, for a total force of 1R=−1, a repelling force of magnitude 1. The spatial correlation of the magnets for the various alignments is similar to radio frequency (RF) signal correlation in time, since the force is the sum of the products of the magnet strengths of the opposing magnet pairs over the lateral width of the structure. (Typically, correlation and autocorrelation may be normalized for a maximum peak of 1. This disclosure, however, uses a non-normalized formulation.) Thus, $$f = \sum_{n=1,N} p_n q_n$$

where, f is the total magnetic force between the two structures, n is the position along the structure up to maximum position N, and $p_n$ are the strengths and polarities of the lower magnets at each position n.

$q_n$ are the strengths and polarities of the upper magnets at each position n.

An alternative equation separate strength and polarity variables, as follows:

$$f = \sum_{n=1,N} l_n p_n u_n q_n$$

where, f is the total magnetic force between the two structures, n is the position along the structure up to maximum position N, $l_n$ are the strengths of the lower magnets at each position n, $p_n$ are the polarities (1 or −1) of the lower magnets at each position n, $u_n$ are the strengths of the upper magnets at each position n, and $q_n$ are the polarities (1 or −1) of the upper magnets at each position n, The above force calculations can be performed for each shift of the two structures to plot a force vs. position function for the two structures. The force vs. position function may alternatively be called a spatial force function.

The total magnetic force is computed for each of the figures, FIG. 3A-FIG. 3N and is shown with each figure. With the specific Barker code used, it can be observed from the figures that the spatial force varies from −1 to 7, where the peak occurs when the two magnetic field emission structures are aligned such that their respective codes are aligned, FIG. 3G and FIG. 3H (FIG. 3G and FIG. 3H show the same alignment, which is repeated for continuity between the two columns of figures). The off peak spatial force, referred to as a side lobe force, varies from 0 to −1. As such, the spatial force function causes the magnetic field emission structures to generally repel each other unless they are aligned such that each of their magnets is correlated with a complementary magnet (i.e., a magnet's South pole aligns with another magnet's North pole, or vice versa). In other words, the two magnetic field emission structures substantially correlate when they are aligned such that they substantially mirror each other.

Figure 4A:
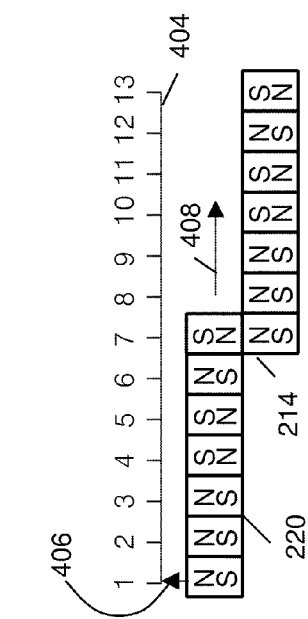

FIG. 4A and FIG. 4B illustrate the normal force between variably coded magnet structures for sliding offsets shown in FIGS. 3A-3N. FIG. 4A depicts the sliding action shown in FIGS. 3A-3N in a single diagram. In FIG. 4A magnet structure 214 is stationary while magnet structure 220 is moved across the top of magnet structure 214 in direction 408 according to scale 404. Magnet structure 220 is shown at position 1 according to indicating pointer 406, which moves with the left magnet of structure 220. As magnet structure 220 is moved from left to right, the total attraction and repelling forces are determined and plotted in the graph of FIG. 4B.

FIG. 4B shows a graph of the normal (perpendicular) magnetic forces between the two magnet structures as a function of position of the magnet structure 220 relative to magnet structure 214. The plot of FIG. 4B summarizes the results of FIGS. 3A-3N. The total normal force 402 acting on all magnets alternates between a value of −1, and 0, indicating a repelling force equal to a single magnet pair acting across the interface boundary or neutral force, to a force of +7 indicating the force of all seven magnet pairs acting in attraction. Note that a movement of one magnet width from position 7 to position 6 changes the force from 7 to 0. One more step to position 5 results in net repelling force of −1. In contrast, note the performance of uniformly coded 7 length magnet structures as shown in FIGS. 5A and 5B.

Figure 5B:
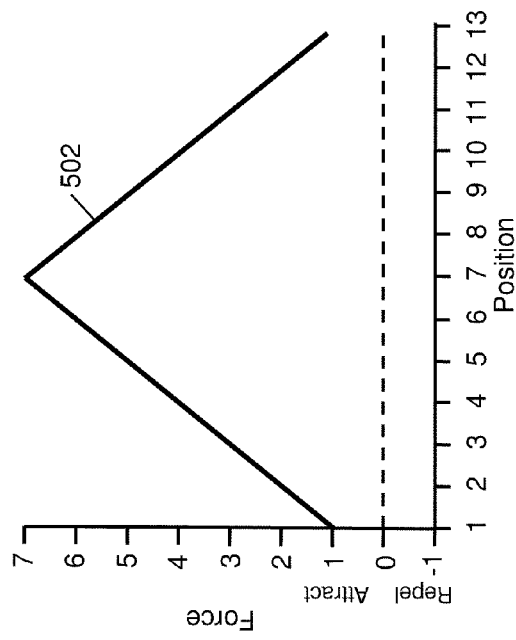
FIG. 5A and FIG. 5B show the normal force produced by a pair of 7 length uniformly coded magnet structures each coded to emulate a single magnet.
Figure 5A:
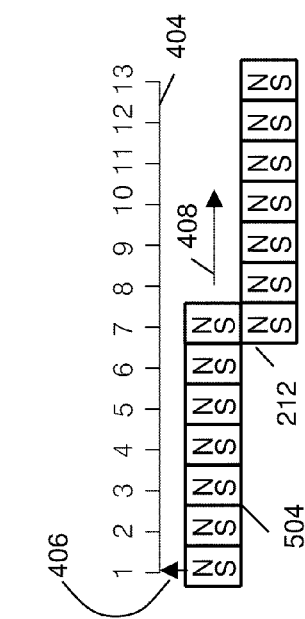

FIG. 5A and FIG. 5B show the normal force produced by a pair of 7 length uniformly coded magnet structures. FIG. 5A depicts the sliding action of the uniformly coded magnet pairs in the manner of FIG. 4A showing the base structure, complementary structure, scale, pointer, and sliding direction. FIG. 5B shows the net normal force 502 as a function of position of structure 504. Note that the force begins at 1 and increments by one for each incremental position to a maximum of 7 and then decreases again. The value does not reach zero or go negative for the overlapping range shown.

Thus, one can appreciate by comparing the performance of FIG. 4B with FIG. 5B that the coded magnet structure pair 214 and 220 may have a much more precise lock-in performance at the alignment position than the uniformly coded structure pair 212 and 504. For example, a disturbance that overcomes half the magnetic force would deviate FIG. 4B by only a half magnet position, whereas, the same disturbance would deflect the structure of FIG. 5B by half of the width of the whole magnet structure. In addition, note the coded magnet structure of FIG. 4B indicates misalignments (positions 1-6 and 8-13) by zero attraction or even repelling forces; whereas the uniformly coded structure of FIG. 5B always attracts. It should be noted that both the variably coded and uniformly coded magnet structures require a holding force since at least one magnet of the structures oriented unnaturally.

The attraction functions of FIG. 4B, FIG. 5B and others in this disclosure are idealized, but illustrate the main principle and primary performance. The curves show the performance assuming equal magnet size, shape, and strength and equal distance between corresponding magnets. For simplicity, the plots only show discrete integer positions and interpolate linearly. Actual force values may vary from the graph due to various factors such as diagonal coupling of adjacent magnets, magnet shape, spacing between magnets, properties of magnetic materials, etc. The curves also assume equal attract and repel forces for equal distances. Such forces may vary considerably and may not be equal depending on magnet material and field strengths. High coercive force materials typically perform well in this regard.

Comparing the variably coded structure of FIG. 4A with the uniformly coded structure of FIG. 5A, one may note that the normal force characteristic as a function of position FIG. 4B for the variably coded magnet structure has a single maximum peak substantially equal in strength to the function (FIG. 5B) for the uniformly coded structure; however the width of the peak for the variably coded magnet structure is less than the width of the peak of the uniformly coded magnet structure, often less than half. The width of the peak may be measured at any convenient level, for example half of the peak strength. The width of the peak in FIG. 4B can be seen to be substantially equal to the width of a peak for a single magnet. Substantially in the context of this paragraph means in view of the considerations of the previous paragraph.

As mentioned earlier, this invention may be used with any magnet, whether permanent, electromagnet, or even with electric fields, however, for embodiments employing permanent magnets, the magnetic materials of interest may include, but are not limited to: Neodymium-Iron-Boron and related materials, Samarium Cobalt, Alnico, and Ceramic ferrites. Neodymium Iron Boron may refer to the entire range of rare earth iron boron materials. One important subset is based on the chemical formula $R_2Fe_{14}B$, where R is Nd, Ce, or Pr. The magnet material may include mixtures of the different rare earth elements. Numerous methods of manufacture are known, each yielding different magnetic properties. Samarium Cobalt, Alnico and ceramic ferrites have been known longer and can also yield magnets suitable for use with the present invention. New materials and variations of the present materials are expected to be developed that may also be used with the present invention.

Codes for use in constructing coded magnet structures may include a number of codes known to mathematics and often applied to subjects such as communication theory, radar and other technologies. A few codes are illustrated and exemplified herein, but many others may be equally applicable. Several codes exemplified herein include Barker codes, Kasami Codes, LFSR sequences, Walsh codes, Golomb ruler codes, and Costas arrays. Information on these codes is, at this time abundantly available on the World Wide Web and in the technical literature. Articles from the site Wikipedia® have been printed and incorporated herein by reference. Thus the articles "Barker Codes" Wikipedia, 2 Aug. 2008, "Linear Feedback Shift Register", Wikipedia, 11 Nov. 2008, "Kasami Code", Wikipedka, 11 Jun. 2008, "Walsh code", Wikipedia, 17 Sep. 2008, "Golomb Ruler", 4 Nov. 2008, and "Costas Array", Wikipedia 7 Oct. 2008 are incorporated herein by reference in their entirety.

The examples so far in FIG. 3A-FIG. 3N, FIG. 4A, and FIG. 4B have used the Barker 7 code to illustrate the principles of the invention. Barker codes have been found to exist in lengths up to 13. Table 1 shows Barker codes up to length 13. Additional Barker codes may be generated by cyclic shifts (register rotations) or negative polarity (multiply by −1) transformations of the codes of Table 1. The technical literature includes Barker-like codes of even greater length. Barker codes offer a peak force equal to the length and a maximum misaligned force of 1 or −1. Thus, the ratio of peak to maximum misaligned force is length/1 or −length/1.

TABLE 1

| | Barker Codes | |
|---|---|---|
| Length | Codes | |
| 2 | +1 −1 | +1 +1 |
| 3 | +1 +1 −1 | |
| 4 | +1 −1 +1 +1 | +1 −1 −1 −1 |
| 5 | +1 +1 +1 −1 +1 | |
| 7 | +1 +1 +1 −1 −1 +1 −1 | |
| 11 | +1 +1 +1 −1 −1 −1 +1 −1 −1 +1 −1 | |
| 13 | +1 +1 +1 +1 +1 −1 −1 +1 +1 −1 +1 −1 +1 | |

Numerous other codes are known in the literature for low autocorrelation when misaligned and may be used for magnet structure definition as illustrated with the Barker 7 code. Such codes include, but are not limited to maximal length PN sequences, Kasami codes, Golomb ruler codes and others. Codes with low non-aligned autocorrelation offer the precision lock at the alignment point as shown in FIG. 4B.

Pseudo Noise (PN) and noise sequences also offer codes with low non-aligned autocorrelation. Most generally a noise sequence or pseudo-noise sequence is a sequence of 1 and −1 values that is generated by a true random process, such as a noise diode or other natural source, or is numerically generated in a deterministic (non random) process that has statistical properties much like natural random processes. Thus, many true random and pseudo random process may generate suitable codes for use with the present invention. Random processes, however will likely have random variations in the sidelobe amplitude i.e., non aligned force as a function of distance from alignment; whereas, Barker codes and others may have a constant amplitude when used as cyclic codes (FIG. 6B). One such family is maximal length PN codes generated by linear feedback shift registers (LFSR). LFSR codes offer a family of very long codes with a constant low level non-aligned cyclic autocorrelation. The codes come in lengths of powers of two minus one and several different codes of the same length are generally available for the longer lengths. LFSR codes offer codes in much longer lengths than are available with Barker codes. Table 2 summarizes the properties for a few of the shorter lengths. Extensive data on LFSR codes is available in the literature.

TABLE 2

LFSR Sequences

| Number of Stages | Length of sequences | Number of Sequences | Example feedback |
|---|---|---|---|
| 2 | 3 | 1 | 1, 2 |
| 3 | 7 | 2 | 2, 3 |
| 4 | 15 | 2 | 3, 4 |
| 5 | 31 | 6 | 3, 5 |
| 6 | 63 | 6 | 5, 6 |
| 7 | 127 | 18 | 6, 7 |
| 8 | 255 | 16 | 4, 5, 6, 8 |
| 9 | 511 | 48 | 5, 9 |
| 10 | 1023 | 60 | 7, 10 |

The literature for LFSR sequences and related sequences such as Gold and Kasami often uses a 0, 1 notation and related mathematics. The two states 0, 1 may be mapped to the two states −1, +1 for use with magnet polarities. An exemplary LFSR sequence for a length 4 shift register starting at 1,1,1,1 results in the feedback sequence: 000100110101111, which may be mapped to: −1, −1, −1, +1, −1, −1, +1, +1, −1, +1, −1, +1, +1, +1, +1. Alternatively, the opposite polarities may be used or a cyclic shift may be used.

Code families also exist that offer a set of codes that may act as a unique identifier or key, requiring a matching part to operate the device. Kasami codes and other codes can achieve keyed operation by offering a set of codes with low cross correlation in addition to low autocorrelation. Low cross correlation for any non-aligned offset means that one code of the set will not match and thus not lock with a structure built according to the another code in the set. For example, two structures A and A*, based on code A and the complementary code A*, will slide and lock at the precision lock point. Two structures B and B* from the set of low cross correlation codes will also slide and lock together at the precision alignment point. However, code A will slide with low attraction at any point but will not lock with code B* because of the low cross correlation properties of the code. Thus, the code can act like a key that will only achieve lock when matched with a like (complementary) pattern.

Kasami sequences are binary sequences of length $2^N$ where N is an even integer. Kasami sequences have low cross-correlation values approaching the Welch lower bound for all time shifts and may be used as cyclic codes. There are two classes of Kasami sequences—the small set and the large set.

The process of generating a Kasami sequence starts by generating a maximum length sequence $a_n$, where $n=1.2^N-1$. Maximum length sequences are cyclic sequences so $a_n$ is repeated periodically for n larger than $2^N-1$. Next, we generate another sequence $b_n$ by generating a decimated sequence of $a_n$ at a period of $q=2^{N/2}+1$, i.e., by taking every $q^{th}$ bit of $a_n$. We generate $b_n$ by repeating the decimated sequence q times to form a sequence of length $2^N-1$. We then cyclically shift $b_n$ and add to $a_n$ for the remaining $2^N-2$ non repeatable shifts. The Kasami set of codes comprises $a_n$, $a_n+b_n$, and the cyclically shifted $a_n+(\text{shift } b_n)$ sequences. This set has $2^{N/2}$ different sequences. A first coded structure may be based on any one of the different sequences and a complementary structure may be the equal polarity or negative polarity of the first coded structure, depending on whether repelling or attracting force is desired. Neither the first coded structure nor the complementary structure will find strong attraction with any of the other codes in the $2^{N/2}$ different sequences. An exemplary 15 length Kasami small set of four sequences is given in Table 3 below. The 0,1 notation may be transformed to −1,+1 as described above. Cyclic shifts and opposite polarity codes may be used as well.

TABLE 3

Exemplary Kasami small set sequences.
Sequence

| K1 | 0 | 0 | 0 | 1 | 0 | 0 | 1 | 1 | 0 | 1 | 0 | 1 | 1 | 1 | 1 |
| K2 | 0 | 1 | 1 | 1 | 1 | 1 | 0 | 1 | 1 | 1 | 0 | 1 | 0 | 0 | 0 |
| K3 | 1 | 1 | 0 | 0 | 1 | 0 | 0 | 0 | 0 | 0 | 1 | 1 | 0 | 0 | 1 |
| K4 | 1 | 0 | 1 | 0 | 0 | 1 | 0 | 1 | 1 | 0 | 0 | 0 | 0 | 0 | 0 |

Other codes, such as Walsh codes and Hadamard codes, offer sets of codes with perfectly zero cross correlation across the set of codes when aligned, but possibly high correlation performance when misaligned. Such codes can provide the unique key function when combined with mechanical constraints that insure alignment. Exemplary Walsh codes are as follows:

Denote W(k, n) as Walsh code k in n-length Walsh matrix. It means the k-th row of Hadamard matrix H(m), where n=2m, m an integer. Here k could be 0, 1, . . . , n−1. A few Walsh codes are shown in Table 4.

TABLE 4

Walsh Codes

| Walsh Code | Code |
|---|---|
| W(0, 1) | 1 |
| W(0, 2) | 1, 1 |
| W(1, 2) | 1, −1 |
| W(0, 4) | 1, 1, 1, 1 |
| W(1, 4) | 1, −1, 1, −1 |
| W(2, 4) | 1, 1, −1, −1 |
| W(3, 4) | 1, −1, −1, 1 |
| W(0, 8) | 1, 1, 1, 1, 1, 1, 1, 1 |
| W(1, 8) | 1, −1, 1, −1, 1, −1, 1, −1 |
| W(2, 8) | 1, 1, −1, −1, 1, 1, −1, −1 |
| W(3, 8) | 1, −1, −1, 1, 1, −1, −1, 1 |
| W(4, 8) | 1, 1, 1, 1, −1, −1, −1, −1 |
| W(5, 8) | 1, −1, 1, −1, −1, 1, −1, 1 |
| W(6, 8) | 1, 1, −1, −1, −1, −1, 1, 1 |
| W(7, 8) | 1, −1, −1, 1, −1, 1, 1, −1 |

In use, Walsh codes of the same length would be used as a set of codes that have zero interaction with one another, i.e., Walsh code W(0,8) will not attract or repel any of the other codes of length 8 when aligned. Alignment should be assured by mechanical constraints because off alignment attraction can be great.

Codes may be employed as cyclic codes or non-cyclic codes. Cyclic codes are codes that may repetitively follow another code, typically immediately following with the next step after the end of the last code. Such codes may also be referred to as wrapping or wraparound codes. Non-cyclic codes are typically used singly or possibly used repetitively but in isolation from adjacent codes. The Barker 7 code example of FIG. 4A and FIG. 4B is a non-cyclic use of the code; whereas the example of FIG. 6A and FIG. 6B is a cyclic use of the same code.

FIG. 6A and FIG. 6B show a cyclic implementation of a Barker 7 code. Referring to FIG. 6A, the base magnet structure comprise three repeated Barker 7 coded magnet structures 214a, 214b, and 214c, where additional Barker 7 coded magnet structures not shown precede and follow the three repeated Barker 7 coded magnet structure 214a, 214b, and 214c. Each Barker code portion 214a, 214b, or 214c, as well as 220 may be termed a code modulo. The span across a single modulo 214a is a modulo span for the magnet structure. Pointer 606 indicates the position of structure 220 with reference to scale 604. The complementary magnet structure 220 slides along the base magnet structure, and the net force is recorded for each position. As shown, complementary magnet structure 220 is located at relative alignment position 7, which corresponds to the first peak force spike in FIG. 6B.

FIG. 6B shows the normal magnetic force 602 as a function of position for FIG. 6A. Note that the total force shows a peak of 7 each time the sliding magnet structure 220 aligns with the underlying Barker 7 pattern in a similar manner as previously described for FIG. 4B. Note however in FIG. 6B, the misaligned positions (positions 1-6 for example) show a constant −1 indicating a repelling force of one magnet pair. In contrast, FIG. 4B alternates between zero and −1 in the misaligned region, where the alternating values are the result of their being relative positions of non-cyclic structures where magnets do not have a corresponding magnet with which to pair up In magnet structures, cyclic codes may be placed in repeating patterns to form longer patterns or may cycle back to the beginning of the code as in a circle or racetrack pattern. As such, cyclic codes are useful on cylindrically or spherically shaped objects.

It may be observed in the embodiment of FIG. 6A that the base magnet structure 214a-214c may be of differing length than the complementary structure 220. Also that the base magnetic structure 214a-214c may comprise repeating segments 214a wherein each repeating segment comprises a non-repeating sequence of magnet polarities. It may be further appreciated that the complementary structure may also comprise repeating segments of sequences of non repeating magnet polarities.

FIG. 7A and FIG. 7B show two magnet structures 704a, 704b coded using a Golomb ruler code. A Golomb ruler is a set of marks on a ruler such that no two marks are the same distance from any other two marks. Two identical Golomb rulers may be slid by one another with only one mark at a time aligning with the other ruler except at the sliding point where all marks align. Referring to FIG. 7A, magnets 702 of structure 704a are placed at positions 0, 1, 4, 9 and 11, where all magnets are oriented in the same polarity direction. Pointer 710 indicates the position of cluster 704a against scale 708. The stationary base structure 704b uses the same relative magnet positioning pattern shifted to begin at position 11.

FIG. 7B shows the normal (perpendicular) magnetic force 706 as a function of the sliding position between the two structures 704a and 704b of FIG. 7A. Note that only one magnet pair lines up between the two structures for any sliding position except at position 5 and 17, where no magnet pairs line up, and at position 11, where all five magnet pairs line up. Because all magnets are in the same direction, the misaligned force value is 1, indicating attraction. Alternatively, some of the magnet polarities may be reversed according to a second code or pattern (with a complementary pattern on the complementary magnet structure) causing the misaligned force to alternate between 1 and −1, but not to exceed a magnitude of 1. The aligned force would remain at 5 if both magnet structures have the same polarity pattern. It may also be appreciated that a magnet substructure spaced according to a Golomb ruler code may be paired with a passive (unmagnetized) ferromagnetic substructure of the same Golomb ruler pattern and the combined structure would have essentially the same force function as if both substructures were magnets. For example, if the top magnet structure of FIG. 7A were a sequence of magnets and the bottom structure were a sequence of soft iron bars, a maximum attraction value of 5 would occur at alignment, the offset attraction would be a maximum of 1, and the system forces would be described by the graph as shown in FIG. 7B. Table 5 shows a number of exemplary Golomb ruler codes. Golomb rulers of higher orders up to 24 can be found in the literature.

TABLE 5

Golomb Ruler Codes

| order | length | marks |
|-------|--------|-------|
| 1 | 0 | 0 |
| 2 | 1 | 0 1 |
| 3 | 3 | 0 1 3 |
| 4 | 6 | 0 1 4 6 |
| 5 | 11 | 0 1 4 9 11 |
|   |   | 0 2 7 8 11 |
| 6 | 17 | 0 1 4 10 12 17 |
|   |   | 0 1 4 10 15 17 |
|   |   | 0 1 8 11 13 17 |
|   |   | 0 1 8 12 14 17 |
| 7 | 25 | 0 1 4 10 18 23 25 |
|   |   | 0 1 7 11 20 23 25 |
|   |   | 0 1 11 16 19 23 25 |
|   |   | 0 2 3 10 16 21 25 |
|   |   | 0 2 7 13 21 22 25 |

Golomb ruler codes offer a force ratio according to the order of the code, e.g., for the order 5 code of FIG. 7A, the aligned force to the highest misaligned force is 5:1. Where the magnets are of differing polarities, the ratio may be positive or negative, depending on the shift value.

Two Dimensional Magnet Structures

The one dimensional magnet structures described so far serve to illustrate the basic concepts, however, it is often desirable to distribute magnets over a two dimensional area rather than in a single line. Several approaches are available. In one approach, known two dimensional codes may be used. In another approach, two dimensional codes may be generated from one dimensional codes. In still another approach, two dimensional codes may be found by numerical methods.

FIG. 8A-FIG. 8E show various exemplary two dimensional code structures in accordance with the present invention. The magnet structures of FIG. 2A through FIG. 7A are shown and described with respect to relative movement in a single dimension, i.e., along the interface boundary in the direction of the code. Some applications utilize such magnet structures by mechanically constraining the relative motion to the single degree of freedom being along the interface boundary in the direction of the code. Other applications allow movement perpendicular to the direction of the code along the interface boundary, or both along and perpendicular to the direction of the code, offering two degrees of freedom. Still other applications may allow rotation and may be mechanically constrained to only rotate around a specified axis, thus having a single degree of freedom (with respect to movement along the interface boundary.) Other applications may allow two lateral degrees of freedom with rotation adding a third degree of freedom. Most applications also operate in the spacing dimension to attract or repel, hold or release. The spacing dimension is usually not a dimension of interest with respect to the code; however, some applications may pay particular attention to the spacing dimension as another degree of freedom, potentially adding tilt rotations for six degrees of freedom. For applications allowing two lateral degrees of freedom special codes may be used that place multiple magnets in two dimensions along the interface boundary.

Costas arrays are one example of a known two dimensional code. Costas Arrays may be considered the two dimensional analog of the one dimensional Golomb rulers. Lists of known Costas arrays are available in the literature. In addition, Welch-Costas arrays may be generated using the Welch technique. Alternatively, Costas arrays may be generated using the Lempel-Golomb technique.

FIG. 8A shows an exemplary Costas array. Referring to FIG. 8A, the grid 802 shows coordinate positions. The "+" 804 indicates a location containing a magnet, blank 806 in a grid location indicates no magnet. Each column contains a single magnet, thus the array of FIG. 8A may be specified as {2,1,3,4}, specifying the row number in each successive column that contains a magnet. Additional known arrays up to order 5 (five magnets in a 5×5 grid) are as follows, where N is the order:

N=1
{1}
N=2
{1,2} {2,1}
N=3
{1,3,2} {2,1,3} {2,3,1} {3,1,2}
N=4
{1,2,4,3} {1,3,4,2} {1,4,2,3} {2,1,3,4} {2,3,1,4} {2,4,3,1} {3,1,2,4} {3,2,4,1} {3,4,2,1} {4,1,3,2} {4,2,1,3} {4,3,1,2}
N=5
{1,3,4,2,5} {1,4,2,3,5} {1,4,3,5,2} {1,4,5,3,2} {1,5,3,2,4} {1,5,4,2,3} {2,1,4,5,3} {2,1,5,3,4} {2,3,1,5,4} {2,3,5,1,4} {2,3,5,4,1} {2,4,1,5,3} {2,4,3,1,5} {2,5,1,3,4} {2,5,3,4,1} {2,5,4,1,3} {3,1,2,5,4} {3,1,4,5,2} {3,1,5,2,4} {3,2,4,5,1} {3,4,2,1,5} {3,5,1,4,2} {3,5,2,1,4} {3,5,4,1,2} {4,1,2,5,3} {4,1,3,2,5} {4,1,5,3,2} {4,2,3,5,1} {4,2,5,1,3} {4,3,1,2,5} {4,3,1,5,2} {4,3,5,1,2} {4,5,1,3,2} {4,5,2,1,3} {5,1,2,4,3} {5,1,3,4,2} {5,2,1,3,4} {5,2,3,1,4} {5,2,4,3,1} {5,3,2,4,1}

Additional Costas arrays may be formed by flipping the array (reversing the order) vertically for a first additional array and by flipping horizontally for a second additional array and by transposing (exchanging row and column numbers) for a third additional array. Costas array magnet structures may be further modified by reversing or not reversing the polarity of each successive magnet according to a second code or pattern as previously described with respect to Golomb ruler codes.

FIG. 8B illustrates the generation of a two dimensional magnet structure by replicating a one dimensional code pattern. Referring to FIG. 8B, each row is a linear magnet sequence arranged according to the Barker 7 code. N rows are stacked in parallel to form a 7×N array 808. The 7×N array 808 shown will have Barker 7 code properties (FIG. 4B) when sliding left to right and simple magnet properties (FIG. 5B) when sliding up and down (when paired with a complementary structure). Both left and right movement and up and down movement as shown on the page in a plan view as shown in FIG. 8B or as depicted in other figures may also be referred to as lateral movement.

FIG. 8C illustrates a 7×7 magnet structure with successively rotated Barker 7 codes in each successive row. Referring to FIG. 8C, the 7×7 magnet structure 808a is formed by varying the code pattern from row to row. The top row is the Barker 7 pattern 214. The next row is the Barker pattern shifted left with the value that is shifted out of the left most position shifted into the right most position. This operation is often termed rotation with respect to digital shift register operations. Thus the magnet pattern for each successive row is a rotate 1 position left version of the row immediately above. It may be appreciated that the horizontal performance of the structure of FIG. 8C remains similar to the Barker 7 pattern; whereas; the vertical pattern is no longer the simple uniformly coded pattern of FIG. 8B. In fact, the vertical pattern now comprises various rotations of the Barker 7 pattern.

FIG. 8D illustrates an exemplary slide-lock pattern based on FIG. 8C. Referring to FIG. 8D, a 19×7 two-way (right and left) slide lock code 810 is produced by starting with a copy of the 7×7 code 808a and then by adding the leftmost 6 columns (808c) of the 7×7 code 808a to the right of the code 808a and the rightmost 6 columns (808d) of the 7×7 code 808a to the left of the code 808a. As such, as the mirror image 808b of structure 808a slides from side-to-side, all 49 magnets of 808b are in contact with the base structure 810 producing the force curve of FIG. 6B from positions 1 to 13, with the magnitude scale multiplied by seven due to the seven parallel rows of magnets. Thus, when structure 808b is aligned with the portion 808a of structure 810 corresponding to 808b's mirror image, the two structures will lock with an attractive force of 49, while when the structure 808b is slid left or right to any other position, the two structures 808b, 810 will produce a repel force of −7. If structure 808b were to be replaced with a second structure having the same coding as portion 808a of the structure 810, then when aligned the two structures will repel with a force of −49, while when the second structure 808a is slid left or right to any other position, the two structures 808b, 810 will produce an attractive force of 7.

FIG. 8E illustrates an exemplary hover code. Referring to FIG. 8E the hover code 806 is produced by placing two code modulos of 808a side-by-side and then removing the first and last columns of the resulting structure, i.e., the right most six columns of 808a (808c) are placed to the left of the left most six columns of a second copy of 808a, (808d). As such, a mirror image 808b can be moved across the resulting magnetic field emission structure 812 from one end to the other end and at all times achieve a spatial force function of −7, indicating a repelling force, potentially allowing the structure 808b to hover over the base 812.

FIG. 9A-FIG. 9F illustrate additional two dimensional codes derived from the single dimension Barker 7 code. Referring to FIG. 9A, The code 808a of FIG. 8C is shown with each row identified by a reference number in sequence 901-907. Also note that each column is a rotation of a Barker 7 code running downward as indicated by the respective down arrows along the bottom of the figure. FIG. 9B illustrates a first variation 910 generated by reordering the rows of FIG. 9A. Observe that the columns are also rotations of Barker 7 codes running in the downward direction, just as in FIG. 9A, but shifted. FIG. 9C illustrates a second variation 911 generated by reordering the rows of FIG. 9A. In FIG. 9C, not all columns form Barker 7 codes (indicated by X). One column is a Barker 7 code running downward, indicated by the down arrow. Three columns are a Barker 7 codes running upward, indicated by the up arrows. FIG. 9D illustrates a third variation 912 generated by reordering the rows of FIG. 9A. In FIG. 9D, all columns form Barker 7 codes running upward, as indicated by the up arrows.

FIG. 9E illustrates a fourth alternative 913 where three of the rows of 808a are multiplied by −1, i.e., reversed in polarity. Row 902A, 904A and 906a are reversed in polarity from rows 902, 904, and 906 respectively. Note that the code of 808a has 28 "+" magnets and 21 "−" magnets; whereas, alternative 913 has 25 "+" magnets and 24 "−" magnets—a nearly equal number. Thus, the far field magnetic field from structure 913 will nearly cancel to zero, which can be valuable in some applications. FIG. 9F illustrates a fifth alternative 914 where three of the rows are reversed in direction. Rows 902b, 904b and 906b are reversed from 902, 904, and 906 respectively.

FIG. 9G illustrates a further alternative using four codes of low mutual cross correlation. Generally, two dimensional codes may be generated by combining multiple single dimensional codes. In particular, the single dimensional codes may be selected from sets of codes with known low mutual cross correlation. Gold codes and Kasami codes are two examples of such codes, however, other code sets may also be used. Referring to FIG. 9G four rows 908-911 of 15 length Kasami codes are used in the example. Because the rows have low cross correlation and low autocorrelation, shifts either laterally or up and down (as viewed on the page) or both will result in low magnetic force.

Additional magnet structures having low magnetic force with a first magnet structure generated from a set of low cross correlation codes may be generated by reversing the polarity of the magnets or by using different subsets of the set of available codes. For example, rows 908 and 909 may form a first magnet structure and rows 910 and 911 may form a second magnet structure. The complementary magnet structure of the first magnet structure will have low force reaction to the second magnet structure, and conversely, the complementary magnet structure of the second magnet structure will have a low force reaction to the first magnet structure. Alternatively, if lateral or up and down movement is restricted, an additional low interaction magnet structure may be generated by shifting (rotating) the codes or changing the order of the rows. Movement may be restricted by such mechanical features as alignment pins, channels, stops, container walls or other mechanical limits.

More generally FIG. 9A-FIG. 9G illustrate that two dimensional codes may be generated from one dimensional codes by assembling successive rows of one dimensional codes and that multiple different two dimensional codes may be generated by varying each successive row by operations including but not limited to changing the order, shifting the position, reversing the direction, and/or reversing the polarity.

FIG. 10A and FIG. 10B depict a magnetic field emission structure 1002 comprising nine magnets in three parallel columns of three magnets each, with the center column shifted by one half position. Referring to FIG. 10A the magnetic field emission structure 1002 is a magnet structure of nine magnets showing the end of each magnet with the polarity marked on each magnet. The positions of the magnets are shown against a coordinate grid 1004. The center column of magnets forms a linear sequence of three magnets each centered on integer grid positions. Two additional columns of magnets are placed on each side of the center column and on adjacent integer column positions, but the row coordinates are offset by one half of a grid position. More particularly, the structure comprises nine magnets at relative coordinates of +1(0,0), −1(0, 1), +1(0,2), −1(1,0.5), +1(1,1.5), −1(1,2.5), +1(2,0), −1(2,1), +1(2,2), where within the notation s(x,y), "s" indicates the magnet strength and polarity and "(x,y)" indicates x and y coordinates of the center of the magnet relative to a reference position (0,0). The magnet structure, according to the above definition is then placed such that magnet +1(0,0) is placed at location (9,9.5) in the coordinate frame 1004 of FIG. 10A.

When paired with a complementary structure, and the force is observed for various rotations of the two structures around the center coordinate at (10, 11), the structure 1002 has a peak spatial force when (substantially) aligned and has relatively minor side lobe strength at any rotation off alignment.

FIG. 10B depicts the spatial force function 1006 of the magnetic field emission structure 1002 with respect to lateral translations of the complementary magnetic field emission structure. The graph 1006 of FIG. 10B shows the force for lateral translations of the two structures with no rotation. The peak force 1008 occurs when substantially aligned.

FIG. 11A-FIG. 11C depict an exemplary code 1102 intended to produce a magnetic field emission structure having a first stronger lock when aligned with its mirror image magnetic field emission structure and a second weaker lock when rotated 90° relative to its mirror image magnetic field emission structure. FIG. 11A shows magnet structure 1102 is against a coordinate grid 1104. The magnet structure 1102 of FIG. 11A comprises magnets at positions: −1(3,7), −1(4,5), −1(4,7), +1(5,3), +1(5,7), −1(5,11), +1(6,5), −1(6,9), +1(7,3), −1(7,7), +1(7,11), −1(8,5), −1(8,9), +1(9,3), −1(9,7), +1(9, 11), +1(10,5), −1(10,9)+1(11,7). Additional field emission structures may be derived by reversing the direction of the x coordinate or by reversing the direction of the y coordinate or by transposing the x and y coordinates.

FIG. 11B depicts spatial force function 1106 of a magnetic field emission structure 1102 interacting with its mirror image (complementary) magnetic field emission structure. The peak occurs when substantially aligned.

FIG. 11C depicts the spatial force function 1108 of magnetic field emission structure 1102 interacting with its mirror magnetic field emission structure after being rotated 90°. FIG. 11C shows the force function for lateral translations without further rotation. The peak occurs when substantially aligned but one structure rotated 90°.

FIGS. 12A-12I depict the exemplary magnetic field emission structure 1102a and its mirror image magnetic field emission structure 1102b and the resulting spatial forces produced in accordance with their various alignments as they are twisted relative to each other, i.e., rotated around an axis perpendicular to the interface plane and through the center of the structures 1102a and 1102b. In FIG. 12A, the magnetic field emission structure 1102a and the mirror image magnetic field emission structure 1102b are aligned producing a peak spatial force. In FIG. 12B, the mirror image magnetic field emission structure 1102b is rotated clockwise slightly relative to the magnetic field emission structure 1102a and the attractive force reduces significantly. In FIG. 12C, the mirror image magnetic field emission structure 1102b is further rotated and the attractive force continues to decrease. In FIG. 12D, the mirror image magnetic field emission structure 1102b is still further rotated until the attractive force becomes very small, such that the two magnetic field emission structures are easily separated as shown in FIG. 12E. Given the two magnetic field emission structures held somewhat apart as in FIG. 12F, the structures can be moved closer and rotated towards alignment producing a small spatial force as in FIG. 12F. The spatial force increases as the two structures become more and more aligned in FIGS. 12G and 12H and a peak spatial force is achieved when aligned as in FIG. 12I. It should be noted that the direction of rotation was arbitrarily chosen and may be varied depending on the code employed. Additionally, the mirror image magnetic field emission structure 1102b is the mirror of magnetic field emission structure 1102a resulting in an attractive peak spatial force. The mirror image magnetic field emission structure 1102b could alternatively be coded such that when aligned with the magnetic field emission structure 1102a the peak spatial force would be a repelling force in which case the directions of the arrows used to indicate amplitude of the spatial force corresponding to the different alignments would be reversed such that the arrows faced away from each other.

Computer Search for Codes

Additional codes including polarity codes, ruler or spacing codes or combinations of ruler and polarity codes of one or two dimensions may be found by computer search. The computer search may be performed by randomly or pseudorandomly or otherwise generating candidate patterns, testing the properties of the patterns, and then selecting patterns that meet desired performance criteria. Exemplary performance criteria include, but are not limited to, peak force, maximum misaligned force, width of peak force function as measured at various offset displacements from the peak and as determined as a force ratio from the peak force, polarity of misaligned force, compactness of structure, performance of codes with sets of codes, or other criteria. The criteria may be applied differently for different degrees of freedom.

Additional codes may be found by allowing magnets to have different strengths, such as multiple strengths (e.g., 2, 3, 7, 12) or fractional strengths (e.g. ½, 1.7, 3.3).

In accordance with one embodiment, a desirable coded magnet structure generally has a non-regular pattern of magnet polarities and/or spacings. The non-regular pattern may include at least one adjacent pair of magnets with reversed polarities, e.g., +, −, or −, +, and at least one adjacent pair of magnets with the same polarities, e.g., +,+ or −, −. Quite often code performance can be improved by having one or more additional adjacent magnet pairs with differing polarities or one or more additional adjacent magnet pairs with the same polarities. Alternatively, or in combination, the coded magnet structure may include magnets having at least two different spacings between adjacent magnets and may include additional different spacings between adjacent magnets. In some embodiments, the magnet structure may comprise regular or non-regular repeating subsets of non-regular patterns.

Exemplary Uses For Magnet Structures

Figure 13D:
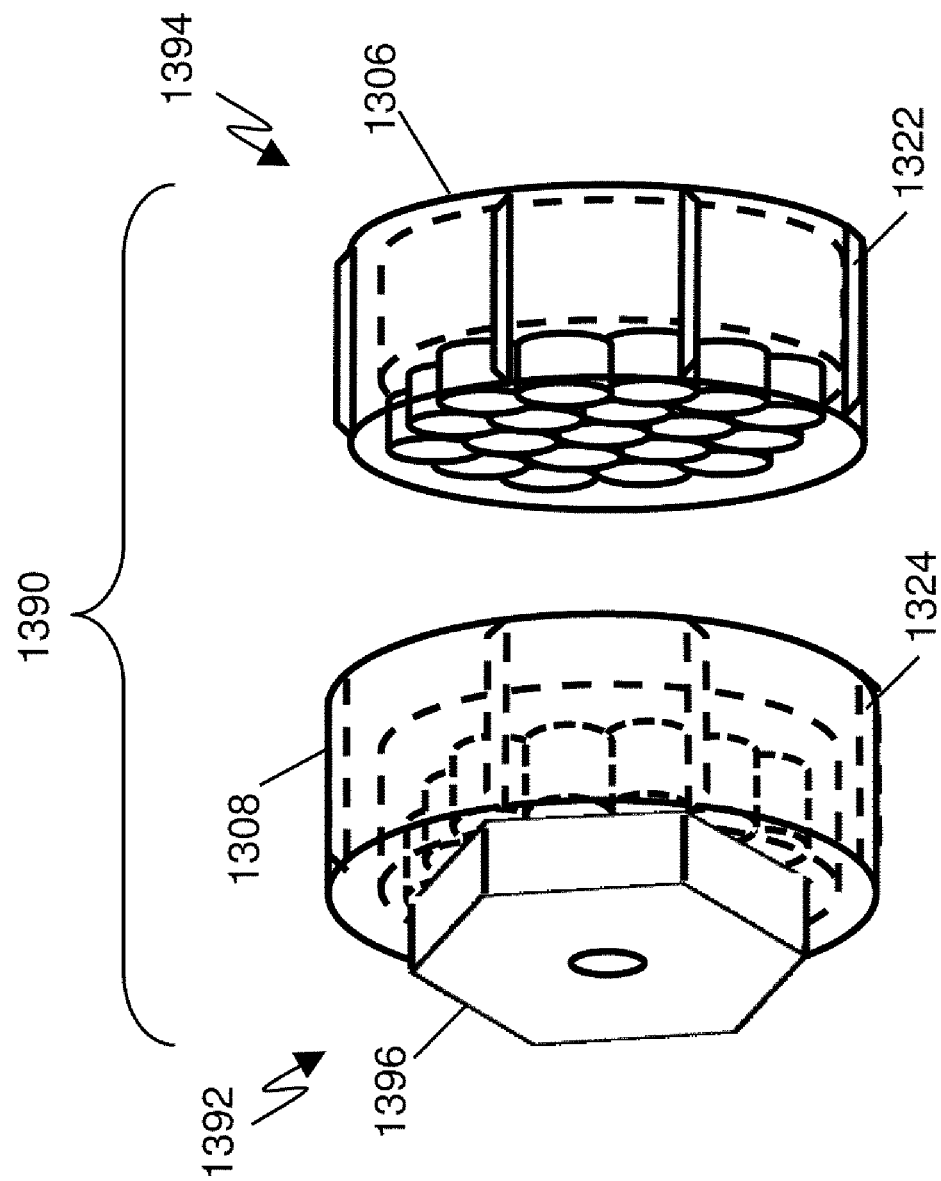

FIG. 13A-FIG. 13D depict various exemplary mechanisms that can be used with field emission structures and exemplary tools utilizing field emission structures in accordance with the present invention. FIG. 13A depicts two magnetic field emission structures 1102a and 1102b. One of the magnetic field emission structures 1102b includes a turning mechanism 1300 that includes a tool insertion slot 1302. Both magnetic field emission structures include alignment marks 1304 along an axis 1303. A latch mechanism such as the hinged latch clip 1305a and latch knob 1305b may also be included preventing movement (particularly turning) of the magnetic field emission structures once aligned. Under one arrangement, a pivot mechanism (not shown) could be used to connect the two structures 1102a, 1102b at a pivot point such as at pivot location marks 1304 thereby allowing the two structures to be moved into or out of alignment via a circular motion about the pivot point (e.g., about the axis 1303).

FIG. 13B depicts a first circular magnetic field emission structure housing 1306 and a second circular magnetic field emission structure housing 1308 configured such that the first housing 1306 can be inserted into the second housing 1308. The second housing 1308 is attached to an alternative turning mechanism 1310 that is connected to a swivel mechanism 1312 that would normally be attached to some other object. Also shown is a lever 1313 that can be used to provide turning leverage.

FIG. 13C depicts an exemplary tool assembly 1314 including a drill head assembly 1316. The drill head assembly 1316 comprises a first housing 1306 and a drill bit 1318. The tool assembly 1314 also includes a drill head turning assembly 1320 comprising a second housing 1308. The first housing 1306 includes raised guides 1322 that are configured to slide into guide slots 1324 of the second housing 1308. The second housing 1308 includes a first rotating shaft 1326 used to turn the drill head assembly 1316. The second housing 1308 also includes a second rotating shaft 1328 used to align the first housing 1306 and the second housing 1308.

FIG. 13D depicts an exemplary clasp mechanism 1390 including a first part 1392 and a second part 1394. The first part 1392 includes a first housing 1308 supporting a first magnetic field emission structure. The second part 1394 includes a second housing 1306 used to support a second magnetic field emission structure. The second housing 1306 includes raised guides 1322 that are configured to slide into guide slots 1324 of the first housing 1308. The first housing 1308 is also associated with a magnetic field emission structure slip ring mechanism 1396 that can be turned to rotate the magnetic field emission structure of the first part 1392 so as to align or misalign the two magnetic field emission structures of the clasp mechanism 1390. Generally, all sorts of clasp mechanisms can be constructed in accordance with the present invention whereby a slip ring mechanism can be turned to cause the clasp mechanism to release. Such clasp mechanisms can be used as receptacle plugs, plumbing connectors, connectors involving piping for air, water, steam, or any compressible or incompressible fluid. The technology is also applicable to Bayonette Neil-Concelman (BNC) electronic connectors, Universal Serial Bus (USB) connectors, and most any other type of connector used for any purpose.

The gripping force described above can also be described as a mating force. As such, in certain electronics applications this ability to provide a precision mating force between two electronic parts or as part of a connection may correspond to a desired characteristic, for example, a desired impedance. Furthermore, the invention is applicable to inductive power coupling where a first magnetic field emission structure that is driven with AC will achieve inductive power coupling when aligned with a second magnetic field emission structure made of a series of solenoids whose coils are connected together with polarities according to the same code used to produce the first magnetic field emission structure. When not aligned, the fields will close on themselves since they are so close to each other in the driven magnetic field emission structure and thereby conserve power. Ordinary inductively coupled systems' pole pieces are rather large and cannot conserve their fields in this way since the air gap is so large.

FIG. 14A-FIG. 14E illustrate exemplary ring magnet structures based on linear codes. Referring to FIG. 14A, ring magnet structure 1402 comprises seven magnets arranged in a circular ring with the magnet axes perpendicular to the plane of the ring and the interface surface is parallel to the plane of the ring. The exemplary magnet polarity pattern or code shown in FIG. 14A is the Barker 7 code. One may observe the "+, +, +, −, −, +, −" pattern beginning with magnet 1404 and moving clockwise as indicated by arrow 1406. A further interesting feature of this configuration is that the pattern may be considered to then wrap on itself and effectively repeat indefinitely as one continues around the circle multiple times. Thus, one could use cyclic linear codes arranged in a circle to achieve cyclic code performance for rotational motion around the ring axis. The Barker 7 base pattern shown would be paired with a complementary ring magnet structure placed on top of the magnet structure face shown. As the complementary ring magnet structure is rotated, the force pattern can be seen to be equivalent to that of FIGS. 6A and 6B because the complementary magnet structure is always overlapping a head to tail Barker 7 cyclic code pattern.

FIG. 14A also illustrates exemplary optional mechanical restraints that may be used with ring magnet structures. In one embodiment, a central spindle 1424, alternatively referred to as a shaft or pin may be installed with the first magnet structure and a mating bearing or socket may be provided with the complementary magnet structure to constrain the motion to rotation only without lateral motion. The pin may be short so that the restraint is operative only when the magnet structures are in proximity and the pin is coupled to the socket. Alternatively, a shell 1426 or housing may be provided with the first magnet structure that mates with a circular plug surrounding the ring with the complementary magnet structure. See FIG. 13D for additional shell structures. The pin 1424 and/or shell 1426 may also be used to provide greater lateral load bearing capability for the assembly.

FIG. 14B shows a magnet structure based on the ring code 1402 of FIG. 14A with an additional magnet in the center. Magnet structure 1408 has an even number of magnets. At least two features of interest are modified by the addition of the magnet 1410 in the center. For rotation about the ring axis, one may note that the center magnet pair (in the base and in the complementary structure) remain aligned for all rotations. Thus, the center magnet pair add a constant attraction or repelling force. Thus, the graph of FIG. 6B could be shifted from a repelling force of −1 and attracting force of 7 to a repelling force of zero and an attracting force of 8. In other words, yielding a neutral force when not aligned. Note also that the central magnet pair may be any value, for example −3, yielding an equal magnitude repelling and attracting force of −4 and +4, respectively.

In a further alternative, a center magnet 1410 may be paired in the complementary structure with a non-magnetized ferromagnetic material, such as a magnetic iron or steel piece. The center magnet would then provide attraction, no matter which polarity is chosen for the center magnet.

A second feature of the center magnet of FIG. 14B is that for a value of −1 as shown, the total number of magnets in the positive direction is equal to the total number of magnets in the negative direction. Thus, in the far field, the magnetic field approaches zero, minimizing disturbances to such things as magnetic compasses and the like. More generally the total strength of magnets in one direction may be cancelled by the total strength of magnets in the opposite direction, regardless of the number of magnets. (For example, the center magnet may have any desired strength.)

FIG. 14C illustrates two concentric rings, each based on a linear cyclic code, resulting in magnet structure 1412. An inner ring 1402 is as shown in FIG. 14A, beginning with magnet 1404. An outer ring is also a Barker 7 code beginning with magnet 1414. Beginning the outer ring on the opposite side as the inner ring keeps the plusses and minuses somewhat laterally balanced.

FIG. 14D illustrates the two concentric rings of FIG. 14C wherein the outer ring magnets are the opposite polarity of adjacent inner ring magnets resulting in magnet structure 1416. The inner ring Barker 7 begins with magnet 1404. The outer ring Barker 7 is a negative Barker 7 beginning with magnet 1418. Each outer ring magnet is the opposite of the immediate clockwise inner ring adjacent magnet. Since the far field magnetic field is cancelled in adjacent pairs, the field decays as rapidly as possible from the equal and opposite magnet configuration. More generally, linear codes may be constructed of opposite polarity pairs to minimize far field magnetic effects.

FIG. 14E illustrates a Barker 7 inner ring and Barker 13 outer ring. The Barker 7 begins with magnet 1404 and the Barker 13 begins with magnet 1422. The result is composite ring magnet structure 1420.

Although Barker codes are shown in FIGS. 14A-14E, other codes may be uses as alternative codes or in combination with Barker codes, particularly in adjacent rings. Maximal Length PN codes or Kasami codes, for example, may form rings using a large number of magnets. One or two rings are shown, but any number of rings may be used. Although the ring structure and ring codes shown are particularly useful for rotational systems that are mechanically constrained to prevent lateral movement as may be provided by a central shaft or external sleeve, the rings may also be used where lateral position movement is permitted. It may be appreciated that a single ring, in particular, has only one or two points of intersection with another single ring when not aligned. Thus, non-aligned forces would be limited by this geometry in addition to code performance.

In one embodiment, the structures of FIG. 14A-14E may be used for a releasable magnetic attachment. The number and strength of component magnets may be selected as needed or desired to establish the magnetic attachment strength for a given application. The attachment strength is the total magnetic attraction when in the attachment configuration, i.e., when the component magnets of the magnet structure and complementary magnet structure are aligned and most or all magnet pairs are attracting. The number of magnets and code as well as additional magnets (such as magnet 1410 in FIG. 14B) may be selected to set the release strength and release characteristic function (for example, the side lobe portion of FIG. 4B). The release strength is typically a normal force that allows convenient removal of the magnetic structure. The release configuration is a position, typically in the side lobe portion of a characteristic function (e.g., FIG. 4B) that allows for release. The release strength may be a reduced attraction force, a repelling force, or zero. The release strength is typically less than the attachment strength, preferably less than half the attachment strength, and often substantially equal to a single component magnet of the magnet structure. Typically, a release configuration is characterized by having sufficient numbers magnets in the magnet structure opposing the polarity of the magnets in the complementary magnet structure so that the total attraction force is reduced to allow separation of the two magnet structures.

FIG. 15A-FIG. 15E depict the components and assembly of an exemplary covered structural assembly. FIG. 15A depicts a first elongated structural member 1502 having magnetic field emission structures 1504 on each of two ends and also having an alignment marking 1506 ("AA"), which could also be "aa". FIG. 15B also depicts a second elongated structural member 1508 having magnetic field emission structures 1510 on both ends of one side. The magnetic field emission structures 1504 and 1510 are configured such that they can be aligned to attach the first and second structural members 1502 and 1508. FIG. 15C further depicts a structural assembly 1512 including two of the first elongated structural members 1502 attached to two of the second elongated structural members 1508 whereby four magnetic field emission structure pairs 1504/1510 are aligned. FIG. 15D includes a cover panel 1514 having four magnetic field emission structures 1102*a* that are configured to align with four magnetic field emission structures 1102*b* to attach the cover panel 1514 to the structural assembly 1512 to produce a covered structural assembly 1516 shown in FIG. 15E.

Generally, the ability to easily turn correlated magnetic structures such that they disengage is a function of the torque easily created by a person's hand by the moment arm of the structure. The larger it is, the larger the moment arm, which acts as a lever. When two separate structures are physically connected via a structural member, as with the cover panel 1514, the ability to use torque is defeated because the moment arms are reversed. This reversal is magnified with each additional separate structure connected via structural members in an array. The force is proportional to the distance between respective structures, where torque is proportional to force times radius. As such, in one embodiment, the magnetic field emission structures of the covered structural assembly 1516 include a turning mechanism enabling one of the paired field emission structures to be rotated to be aligned or misaligned in order to assemble or disassemble the covered structural assembly. In another embodiment, the magnetic field emission structures do not include a turning mechanism and thus require full force for decoupling.

FIG. 16A and FIG. 16B illustrate relative force and distance characteristics of large magnets as compared with small magnets. FIG. 16A depicts an oblique projection of a first pair of magnetic field emission structures 1602*a* and 1602*b*. FIG. 16B depicts a second pair of magnetic field emission structures 1604*a* and 1604*b* each having internal magnets indicated by dashed lines.

As shown, the first pair of magnetic field emission structures 1602*a* and 1602*b* have a relatively small number of relatively large (and stronger) magnets when compared to the second pair of magnetic field emission structures 1604*a* and 1604*b* that have a relatively large number of relatively small (and weaker) magnets. For this figure, the peak spatial force for each of the two pairs of magnetic field emission structures 1602*a*/1602*b* and 1604*a*/1604*b* are the same. However, the distances D1 and D2 at which the magnetic fields of each of the pairs of magnetic field emission structures substantially interact depends on the strength of the magnets and the area over which they are distributed. As such, the much larger surface of the second magnetic field emission structure 1604*a*/1602*b* having much smaller magnets will not substantially attract until much closer than that of first magnetic field emission structure 1602*a*/1602*b*. In addition, it can be appreciated that, for a substantially random coded magnet structure, adjacent magnets will likely be of opposite polarity. Thus, when the distance D1 or D2 becomes significant relative to the magnet width or lateral spacing, the magnet begins to interact with magnets of the opposite polarity, further reducing the attracting force of the structure. This magnetic strength per unit area attribute as well as a magnetic spatial frequency (i.e., the number of magnetic reversals per unit area) can be used to design structures to meet safety requirements. For example, two magnetic field emission structures 1604*a*/1604*b* can be designed to not have unsafe attraction at a spacing equal to the width of a finger to prevent damage from clamping a finger between the magnets.

FIG. 16C depicts an exemplary magnetic field emission structure 1606 made up of a sparse array of large magnetic sources 1608 combined with a large number of smaller magnetic sources 1610 whereby alignment with a mirror image magnetic field emission structure would be provided by the large sources and a repel force would be provided by the smaller sources. Generally, as was the case with FIG. 16A, the larger (i.e., stronger) magnets achieve a significant attraction force (or repelling force) at a greater separation distance than smaller magnets. Because of this characteristic, combinational structures having magnetic sources of different strengths can be constructed that effectively have two (or more) spatial force functions corresponding to the different levels of magnetic strengths employed. As the magnetic field emission structures are brought closer together, the spatial force function of the strongest magnets is first to engage and the spatial force functions of the weaker magnets will engage when the magnetic field emission structures are moved close enough together at which the spatial force functions of the different sized magnets will combine. Referring back to FIG. 16B, the sparse array of stronger magnets 1608 is coded such that it can correlate with a mirror image sparse array of comparable magnets. However, the number and polarity of the smaller (i.e., weaker) magnets 1610 can be tailored such that when the two magnetic field emission structures are substantially close together, the magnetic force of the smaller magnets can overtake that of the larger magnets 1608 such that an equilibrium will be achieved at some distance between the two magnetic field emission structures. As such, alignment can be provided by the stronger magnets 1608 but contact of the two magnetic field emission structures can be prevented by the weaker magnets 1610. Similarly, the smaller, weaker magnets can be used to add extra attraction strength between the two magnetic field emission structures.

One skilled in the art may recognize based on the teachings herein that many different combinations of magnets having different strengths can be oriented in various ways to achieve desired spatial forces as a function of orientation and separation distance between two magnetic field emission structures. For example, a similar aligned attract-repel equilibrium might be achieved by grouping the sparse array of larger magnets 1608 tightly together in the center of magnetic field emission structure 1606. Moreover, combinations of correlated and non-correlated magnets can be used together, for example, the weaker magnets 1610 of FIG. 16B may all be uncorrelated magnets. Furthermore, one skilled in the art will recognize that such equilibrium enables frictionless traction (or hold) forces to be maintained and that such techniques could be employed for many of the exemplary drawings provided herein.

FIG. 17A-FIG. 17C illustrate several exemplary cylinder and sphere arrangements, some arrangements including coupling with linear track structures. FIG. 17A depicts two concentric cylinders for concentric rotational alignment. The two cylinders each have a field emission structure and the complementary field emission structure disposed around the cylinder surface and directed across an interface gap between the two cylinders. The cylinders will see a relative torque related to the slope of the force graph (for example FIG. 6B). Thus, one cylinder may be used to couple to and drive the other. Any number of code repeat segments may be provided. In particular, the code may be chosen to have only one non-repeated segment (sequence of magnets) and thus only one lock point. In a second embodiment, one of the cylinders may have permanent magnets forming the field emission structure and the second cylinder may utilize electromagnets. The electromagnets may be driven to position or move the code pattern around the cylinder and thus drive the first cylinder synchronous with the electromagnet code position. Again, the electromagnets may have any number of code segments around the cylinder down to including one segment, which is typically difficult to achieve with common synchronous or stepping type motors.

In a further alternative, cylinder 1706 may couple to a flat track 1708. Neglecting cylinder 1704 for the moment, cylinder 1706 may have a field emission structure on the outside and 1708 may have a complementary structure. Cylinder 1706 may then grip track 1708 and roll along track 1708 as a guide, or may drive or be driven by track 1708. Again the track or cylinder may utilize electromagnets to move the pattern to effect a moving drive. Since the hold-down force equals the traction force, these gears can be loosely connected and still give positive, non-slipping rotational accuracy. Correlated surfaces can be perfectly smooth and still provide positive, non-slip traction. As such, they can be made of any substance including hard plastic, glass, stainless steel or tungsten carbide. In contrast to legacy friction-based wheels the traction force provided by correlated surfaces is independent of the friction forces between the traction wheel and the traction surface and can be employed with low friction surfaces. Devices moving about based on magnetic traction can be operated independently of gravity for example in weightless conditions including space, underwater, vertical surfaces and even upside down.

FIG. 17B depicts an arrangement where a first magnetic field emission structure 1722 wraps around two cylinders 1702*a* and 1702*b* such that a much larger portion 1724 of the first magnetic field emission structure 1722 is in contact with a second magnetic field emission structure 1728 by comparison with the contact of 1702 with 1708 of FIG. 17A. As such, the larger portion 1724 directly corresponds to a larger gripping force.

If the surface in contact with the cylinder is in the form of a belt, then the traction force can be made very strong and still be non-slipping and independent of belt tension. It can replace, for example, toothed, flexible belts that are used when absolutely no slippage is permitted. In a more complex application the moving belt can also be the correlating surface for self-mobile devices that employ correlating wheels. If the conveyer belt is mounted on a movable vehicle in the manner of tank treads then it can provide formidable traction to a correlating surface or to any of the other rotating surfaces described here.

FIG. 17C illustrates two spheres, an outer sphere 1712 containing an inner sphere 1714. The outer sphere has a field emission structure 1716 and the inner sphere has a complementary field emission structure. Thus, the two spheres may be coupled and synchronized. One may utilize electromagnets to drive the other.

FIGS. 18A through 18H provide a few more examples of how magnetic field sources can be arranged to achieve desirable spatial force function characteristics. FIG. 18A depicts an exemplary magnetic field emission structure 1800 made up of rings about a circle. As shown, each ring comprises one magnet having an identified polarity. Similar structures could be produced using multiple magnets in each ring, where each of the magnets in a given ring is the same polarity as the other magnets in the ring, or each ring could comprise correlated magnets. Generally, circular rings, whether single layer or multiple layer, and whether with or without spaces between the rings, can be used for electrical, fluid, and gas connectors, and other purposes where they could be configured to have a basic property such that the larger the ring, the harder it would be to twist the connector apart. As shown in FIG. 18B, one skilled in the art would recognize that a hinge 1802 could be constructed using alternating magnetic field emission structures attached two objects where the magnetic field emission structures would be interleaved so that they would align (i.e., effectively lock) but they would still pivot about an axis extending though their innermost circles. FIG. 18C depicts an exemplary magnetic field emission structure 1804 having sources resembling spokes of a wheel. FIG. 18D depicts an exemplary magnetic field emission structure 1806 resembling a rotary encoder where instead of on and off encoding, the sources are encoded such that their polarities vary. The use of a magnetic field emission structure in accordance with the present invention instead of on and off encoding should eliminate alignment problems of conventional rotary encoders.

FIG. 18E depicts an exemplary magnetic field emission structure having sources arranged as curved spokes 1808. FIG. 18F depicts an exemplary magnetic field emission structure made up of hexagon-shaped sources 1810. FIG. 18G depicts an exemplary magnetic field emission structure made up of triangular sources 1812. FIG. 18H depicts an exemplary magnetic field emission structure made up of arrayed diamond-shaped sources 1814. Generally, the sources making up a magnetic field emission structure can have any shape and multiple shapes can be used within a given magnetic field emission structure. Under one arrangement, one or more magnetic field emission structures correspond to a Fractal code.

Figure 19C:
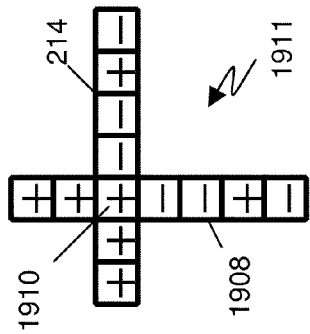
FIG. 19A through FIG. 19G depict exemplary embodiments of two dimensional coded magnet structures.
Figure 19B:
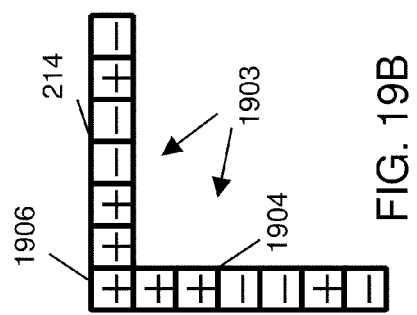
Figure 19E:
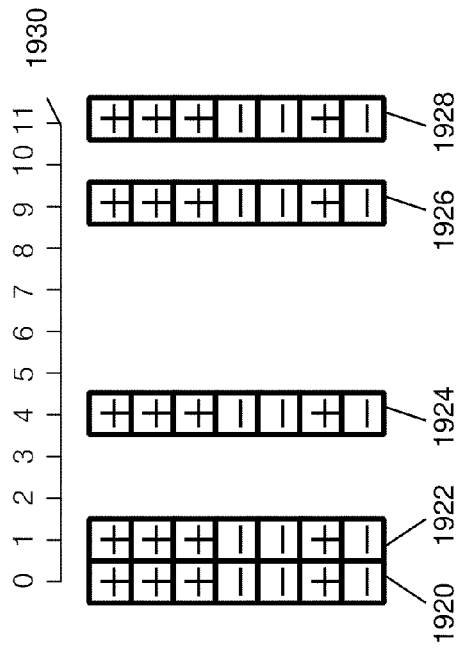
Figure 19A:
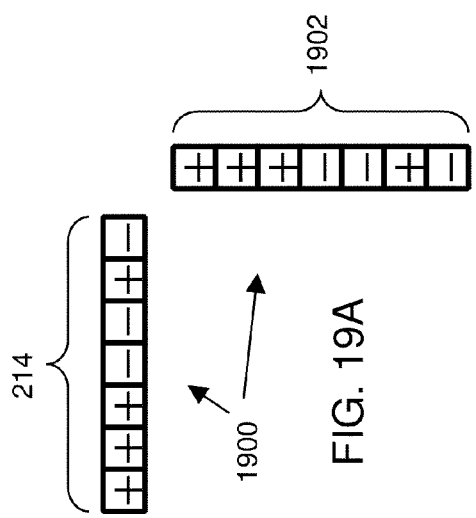

FIG. 19A through FIG. 19G depict exemplary embodiments of two dimensional coded magnet structures. Referring to FIG. 19A, the exemplary magnet structure 1900 comprises two Barker coded magnet substructures 214 and 1902. Substructure 214 comprises magnets with polarities determined by a Barker 7 length code arranged horizontally (as viewed on the page). Substructure 1902 comprises magnets with polarities also determined by a Barker 7 length code, but arranged vertically (as viewed on the page) and separated from substructure 214. In use, structure 1900 is combined with a complementary structure of identical shape and complementary magnet polarity. It can be appreciated that the complementary structure would have an attracting (or repelling, depending on design) force of 14 magnet pairs when aligned. Upon shifting the complementary structure to the right one magnet width substructure 214 and the complementary portion would look like FIG. 3F and have a force of zero. Substructure 902 would be shifted off to the side with no magnets overlapping producing a force of zero. Thus, the total from both substructures 214 and 902 would be zero. As the complementary structure is continued to be shifted to the right, substructure 214 would generate alternately zero and −1. The resulting graph would look like FIG. 4B except that the peak would be 14 instead of 7. It can be further appreciated that similar results would be obtained for vertical shifts due to the symmetry of the structure 1900. Diagonal movements where the complementary structure for 1902 overlaps 214 can only intersect one magnet at a time. Thus, the peak two dimensional nonaligned force is 1 or −1. Adding rotational freedom can possibly line up 1902 with 214 for a force of 7, so the code of FIG. 19A performs best where rotation is limited.

FIG. 19B depicts a two dimensional coded magnet structure comprising two codes with a common end point component. Referring to FIG. 19B, the structure 1903 comprises structure 214 based on a Barker 7 code running horizontally and structure 1904 comprising six magnets that together with magnet 1906 form a Barker 7 code running vertically. Magnet 1906 being common to both Barker sequences. Performance can be appreciated to be similar to FIG. 19A except the peak is 13.

FIG. 19C depicts a two dimensional coded magnet structure comprising two one dimensional magnet structures with a common interior point component. The structure of FIG. 19C comprises structure 214 based on a Barker 7 code running horizontally and structure 1908 comprising six magnets that together with magnet 1910 form a Barker 7 code running vertically. Magnet 1910 being common to both Barker sequences. Performance can be appreciated to be similar to FIG. 19A except the peak is 13. In the case of FIG. 19C diagonal shifts can overlap two magnet pairs.

Figure 19D:
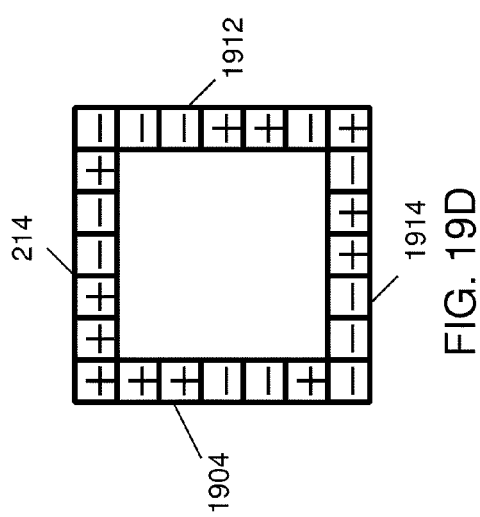

FIG. 19D depicts an exemplary two dimensional coded magnet structure based on a one dimensional code. Referring to FIG. 214, a square is formed with structure 214 on one side, structure 1904 on another side. The remaining sides 1912 and 1914 are completed using negative Barker 7 codes with common corner components. When paired with an attraction complementary structure, the maximum attraction is 24 when aligned and 2 when not aligned for lateral translations in any direction including diagonal. Further, the maximum repelling force is −7 when shifted laterally by the width of the square. Because the maximum magnitude non-aligned force is opposite to the maximum attraction, many applications can easily tolerate the relatively high value (compared with most non-aligned values of 0, ±1, or ±2) without confusion. For example, an object being placed in position using the magnet structure would not stick to the −7 location. The object would only stick to the +1, +2 or +24 positions, very weakly to the +1 or +2 positions and very strongly to the +24 position, which could easily be distinguished by the installer.

FIG. 19E illustrates a two dimensional code derived by using multiple magnet substructures based on a single dimension code placed at positions spaced according to a Golomb Ruler code. Referring to FIG. 19E, five magnet substructures 1920-1928 with polarities determined according to a Barker 7 code are spaced according to an order 5 Golomb ruler code at positions 0, 1, 4, 9, and 11 on scale 1930. The total force in full alignment is 35 magnet pairs. The maximum non-aligned force is seven when one of the Barker substructures lines up with another Barker 7 substructure due to a horizontal shift of the complementary code. A vertical shift can result in −5 magnet pairs. Diagonal shifts are a maximum of −1.

The exemplary structures of FIG. 19A-FIG. 19E are shown using Barker 7 codes, the structures may instead use any one dimension code, for example, but not limited to random, pseudo random, LFSR, Kasami, Gold, or others and may mix codes for different legs. The codes may be run in either direction and may be used in the negative version (multiplied by −1.) Further, several structures are shown with legs at an angle of 90 degrees. Other angles may be used if desired, for example, but not limited to 60 degrees, 45 degrees, 30 degrees or other angles. Other configurations may be easily formed by one of ordinary skill in the art by replication, extension, substitution and other teachings herein.

Figures 19F, 19G:
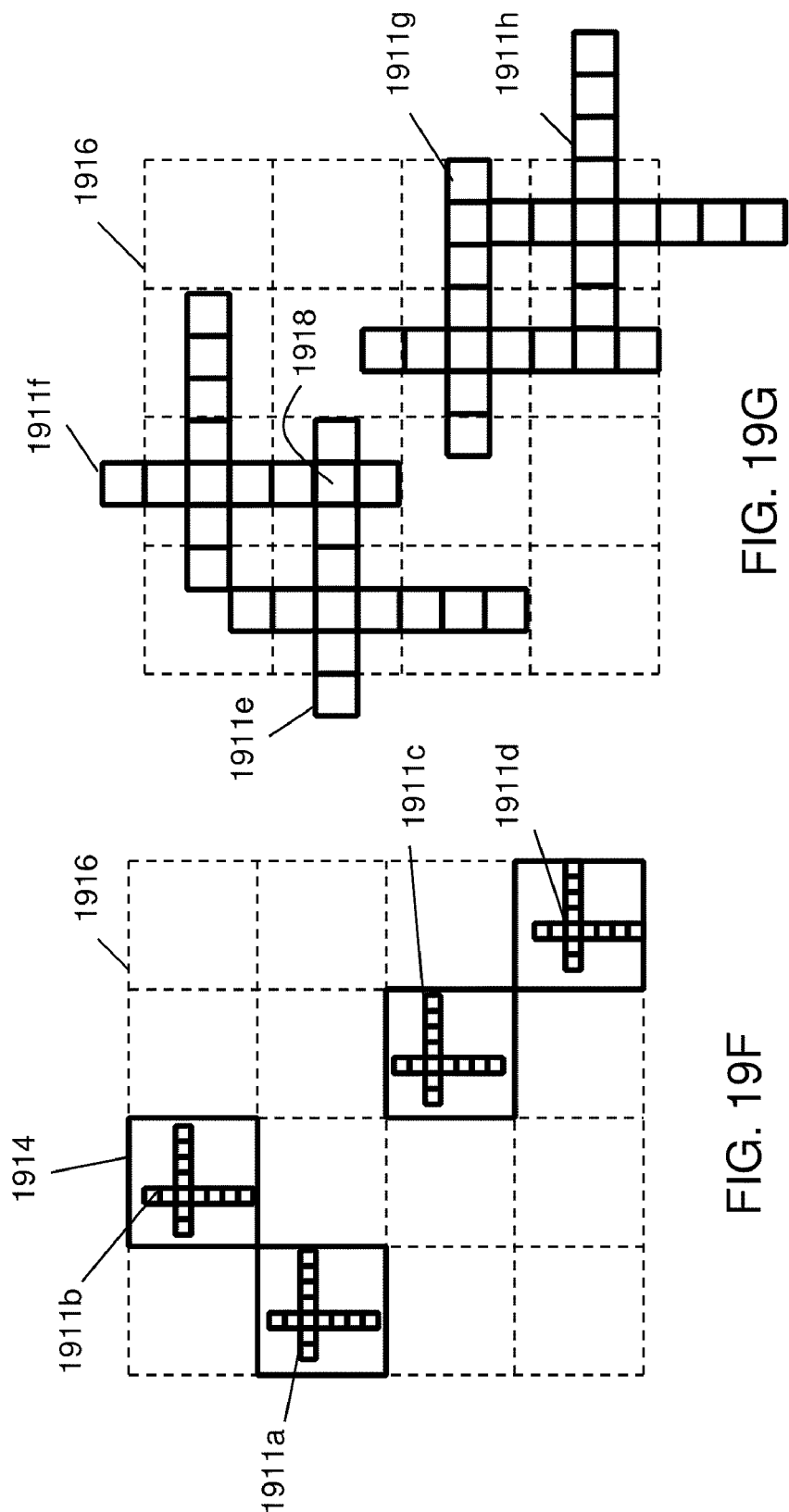

FIG. 19F and FIG. 19G illustrate two dimensional magnet structures based on the two dimensional structures of FIG. 19A through FIG. 19E combined with Costas arrays. Referring to FIG. 19F, the structure of FIG. 19F is derived from the structure 1911 of FIG. 19C replicated 1911a-1911d and placed at code locations 1914 based on a coordinate grid 1916 in accordance with exemplary Costas array of FIG. 8A. The structure of FIG. 19G is derived using FIG. 19C and FIG. 8A as described for FIG. 19F except that the scale (relative size) is changed. The structure 1911 of FIG. 19C is enlarged to generate 1911e-1911h, which have been enlarged sufficiently to overlap at component 1918. Thus, the relative scale can be adjusted to trade the benefits of density (resulting in more force per area) with the potential for increased misaligned force.

Summary of Coded Magnet Patterns

Magnet patterns have been shown for basic linear and two dimensional arrays. Linear codes may be applied to generate linear magnet arrays arranged in straight lines, curves, circles, or zigzags. The magnetic axes may be axial or radial to the curved lines or surfaces. Two dimensional codes may be applied to generate two dimensional magnet arrays conforming to flat or curved surfaces, such as planes, spheres, cylinders, cones, and other shapes. In addition, compound shapes may be formed, such as stepped flats and more.

Magnet applications typically involve mechanical constraints such as rails, bearings, sleeves, pins, etc that force the assembly to operate along the dimensions of the code. Several known types of codes can be applied to linear, rotational, and two-dimensional configurations. Some configurations with lateral and rotational and vertical and tilt degrees of freedom may be satisfied with known codes tested and selected for the additional degrees of freedom. Computer search can also be used to find special codes.

Thus, the application of codes to generate arrangements of magnets with new interaction force profiles and new magnetic properties enables new devices with new capabilities, examples of which will now be disclosed.

Stepping Motors With Coded Pole Patterns

FIG. 20A and FIG. 20B illustrate a model of the torque generated by the stepping motor of FIG. 1A at full step aligned positions. FIG. 20A shows the rotor poles in row A and the stator poles in row B. A scale 2002 is shown for movement of the rotor magnets through one rotation, seven positions. Stator magnets are indicated by a scale 0-15. The number of stator poles is actually seven (see ref 2004). The additional positions show the repeating cyclic rotational pattern. Positions 8-14 (see 2006) represent the same poles as positions 1-7. With the rotor in position 1 as shown the torque may be approximated by observing that opposing magnet pairs in the rotor and stator, being aligned and centered, generate no torque, only attraction or repelling forces. Diagonally opposing adjacent poles may generate torque. Diagonally adjacent poles are assigned an attracting or repelling value of +1 or −1 respectively depending on whether they are in the same or opposing directions. Because of the distance, the remaining poles may be ignored. Thus, the torque on the rotor may be determined by summing the forces of the adjacent poles of the stator on each pole of the rotor.

$$T = \sum_N S_{LF}(A_n B_n - A_n B_{n+1})$$

Where,
T is the rotor torque,
N is the number of poles (magnets) in the rotor,
$S_{LF}$ is the magnet strength for full step movement,
$A_n$ is the rotor magnet polarity for position n, and
$B_n$ is the stator magnet polarity for position n.

FIG. 20B is a table showing the seven torque pair sums 2010 for each of the seven aligned rotor positions 2002 in one rotation (rotor magnets aligned directly opposite stator magnets). Column 2002 is the rotor position. Column 2008 is the torque on each rotor magnet. Column 2010 is the sum for that position. Referring to table FIG. 20B, position 1 shows a torque balance with two positions each generating opposite torque and three positions generating no torque. Position 1 is the aligned position with the pole pattern for the rotor matching the stator. Position 2 is one pole position advanced to the right. In position 2, four pole positions have a + polarity of two magnet pairs each for a total of 8 magnet pairs. Three positions have a torque of zero. Thus, there is a strong torque of 8 magnet pairs to return the rotor to the aligned position 1. Positions 3-6 show balanced torque and position 7, which is the same as one position to the left (position 0) shows a negative torque. Also returning the rotor to the aligned position 1. Thus the rotor has one stable locked position, position 1 where the adjacent positions 2 and 7 return the rotor to position 1. the other positions have neutral torque and provide no stability. The rotor may move without resisting torque among the remaining positions 3-6. When the rotor moves from position 3 toward position 2, the rotor is quickly "captured" and moved to position 1.

Figures 21A, 21B:
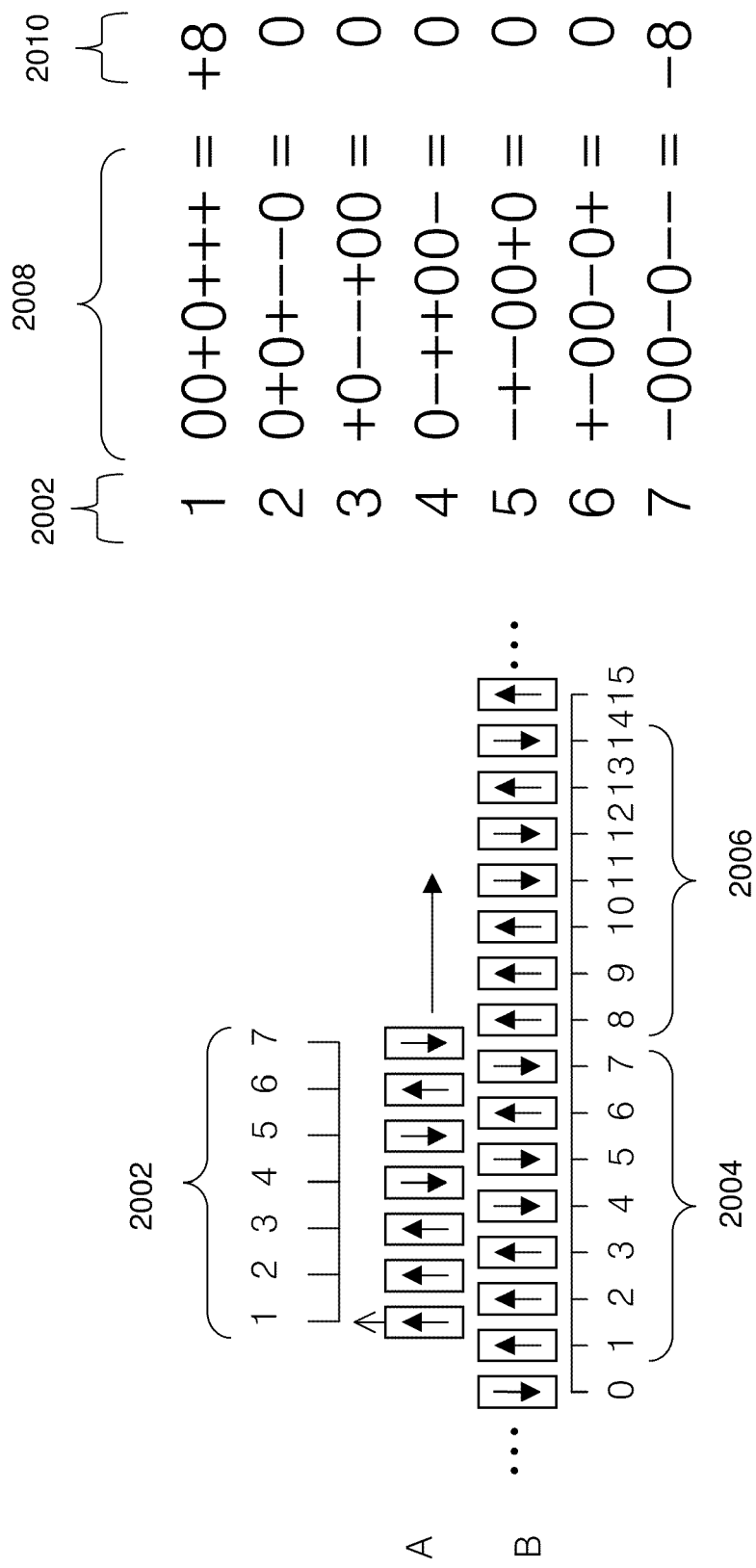
FIG. 21A and FIG. 21B illustrate a model of the torque generated by the stepping motor of FIG. 1 at half step positions.

FIG. 21A and FIG. 21B illustrate a model of the torque generated by the stepping motor of FIG. 1A at half step positions. FIG. 21A shows the rotor positioned at a half step to the right of the position shown in FIG. 20A. The rotor makes full step increments beginning with a half step offset. A similar calculation of torque to FIG. 20B is provided. This time the adjacent magnets provide torque. No magnets are aligned. The torque at half step may be different from the torque at full step so the strength constant $S_{LH}$ is provided to account for the difference.

$$T = \sum_N S_{LH}(A_n B_n - A_n B_{n+1})$$

Where,

T is the rotor torque,

N is the number of poles (magnets) in the rotor, $S_{LH}$ is the magnet strength for half step movement, $A_n$ is the rotor magnet polarity for position n plus a half step, and $B_n$ is the stator magnet polarity for position n.

FIG. 21B shows the torque summations 2010 for the seven magnet pole pairs 2008 for each of the seven rotor positions 2002. Positions 1 and 7 show a torque of 8 in a direction to return the rotor to the aligned position, which is a half step before position 1 (or a half step after position 7) on the half step diagram. The remaining positions 2-6 show balanced torque. Thus, aligned position 1 of FIG. 20A is the only stable locked in position where a disturbance is met with a torque to return to the position.

Figure 22:
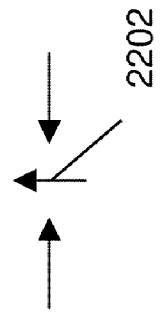
FIG. 22 illustrates the torque patterns for stepping motors as in FIG. 1 constructed using various alternative codes.

FIG. 22 is a table illustrating the torque patterns for stepping motors as in FIG. 1 constructed using various alternative codes. FIG. 22 shows the torques computed relative to the stable aligned position 2202 indicated by the arrows at the bottom. Note that for each of the codes the stable position is flanked by high torque positions that return the rotor to the stable position. Alternatively, the polarities of the stator may be reversed to generate an unstable equilibrium position flanked by positions that repel from the unstable position. The table includes a Barker, length 7, Barker length 13, PN length 15, and Golomb code.

The Golomb ruler code may be specified as a five magnet, twelve position, or eleven length code.

Composite Patterns

In one embodiment, the stator may be driven by a composite pattern comprising the sum of one or more shifted code patterns.

Figure 23:
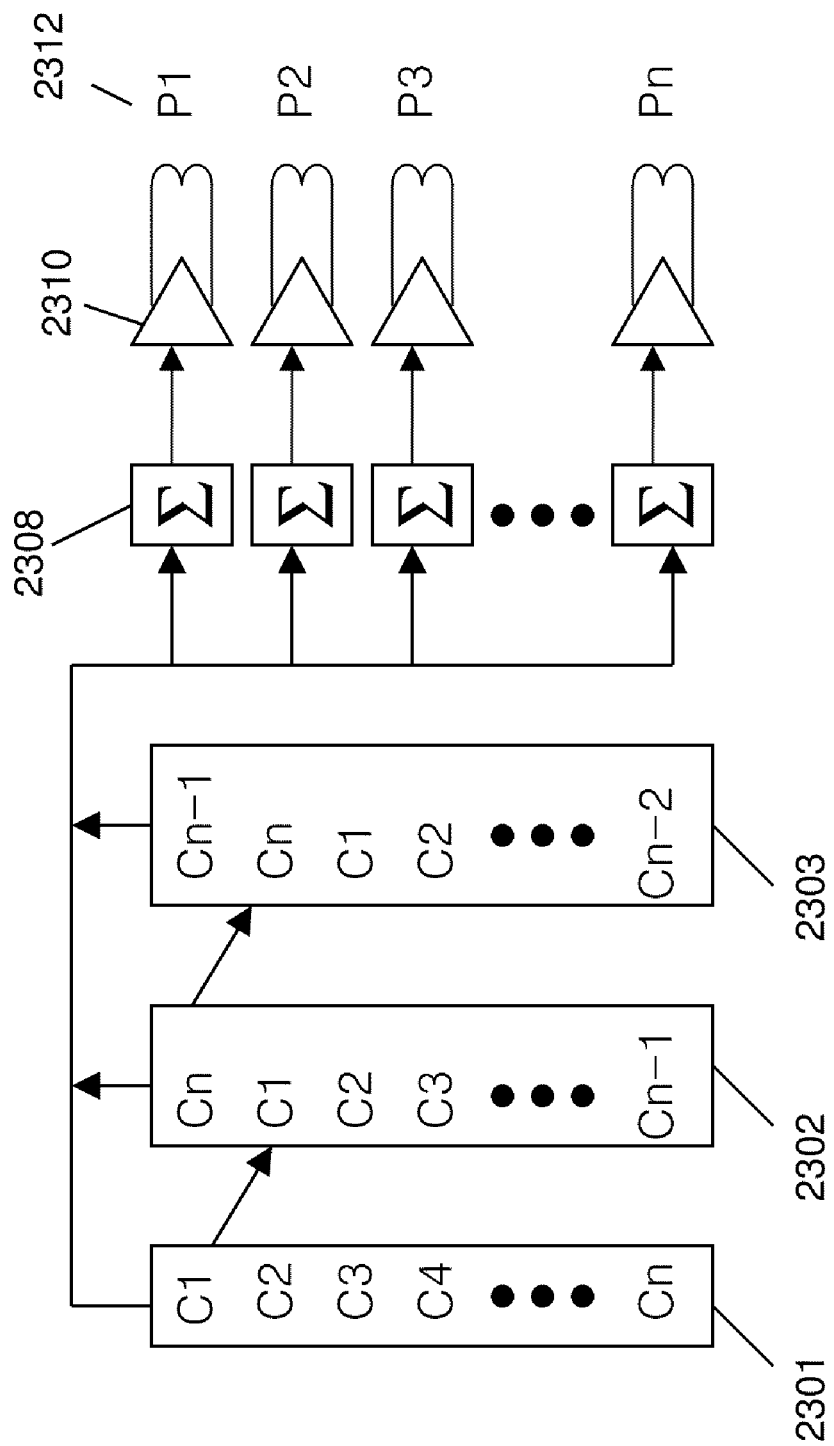
FIG. 23 illustrates an exemplary composite pattern drive architecture.

FIG. 23 illustrates an exemplary single or composite pattern drive architecture. Referring to FIG. 23, a code pattern is loaded into register 2301 and a rotated copy is transferred to register 2302 and a further rotated copy is transferred to register 2303. The three registers are bitwise fed to the summation networks 2308 which feed drivers 2310 which drive each pole 2312 of the stator, i.e., bit 1 of each register is fed to summation network 1 to be summed and the sum drives pole 1 of the stator and so on for the remaining poles. Any number of registers may be used and each may have a different gain or be shifted by any desired amount. Several examples follow.

Figure 24:
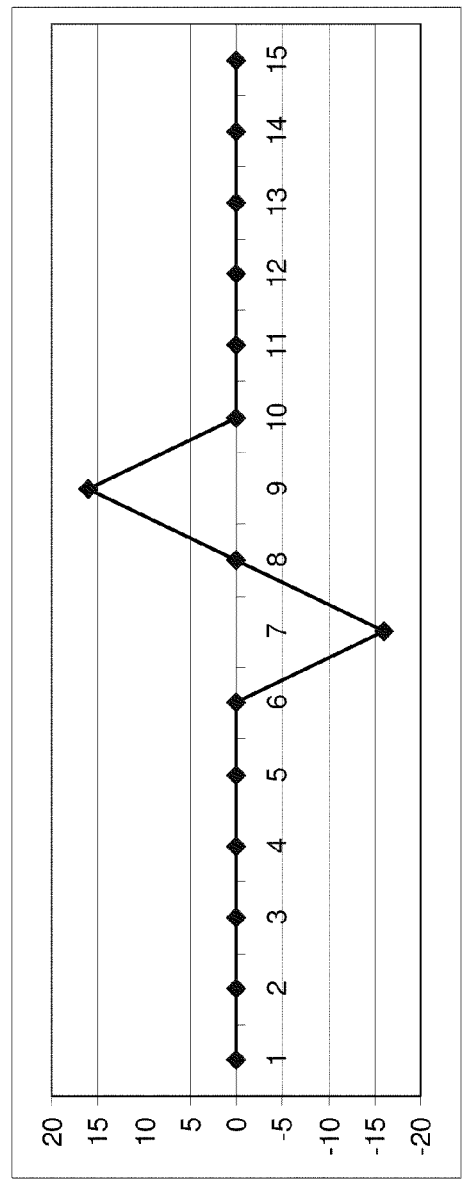
FIG. 24 illustrates an exemplary torque vs. position pattern for a single pattern.

FIG. 24 illustrates an exemplary torque vs. position pattern for a single pattern. Thus, FIG. 7 is for a 15 length Barker or PN code using a single register.

Figure 25:
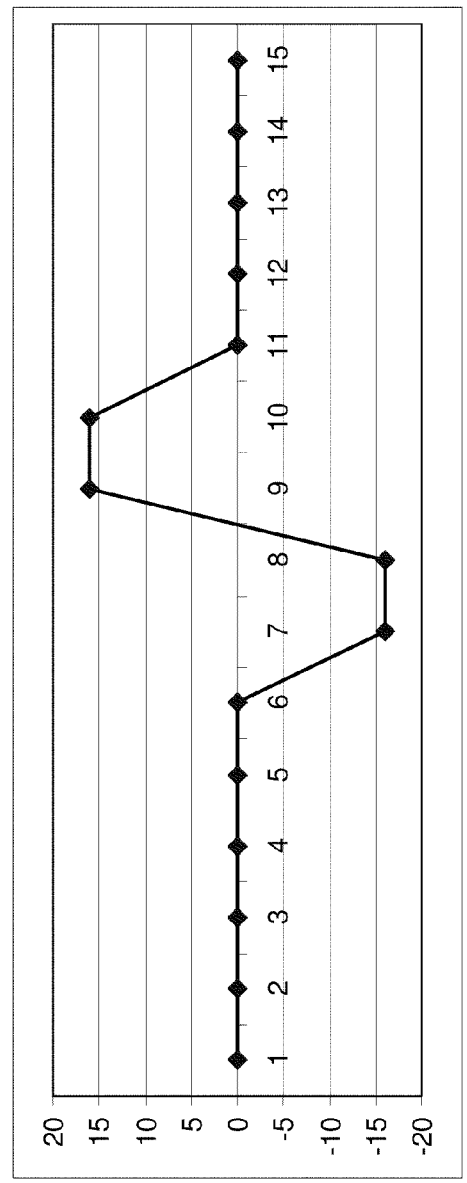
FIG. 25 illustrates an exemplary torque vs. position pattern for a composite pattern comprising the sum of two single patterns.
Figure 26:
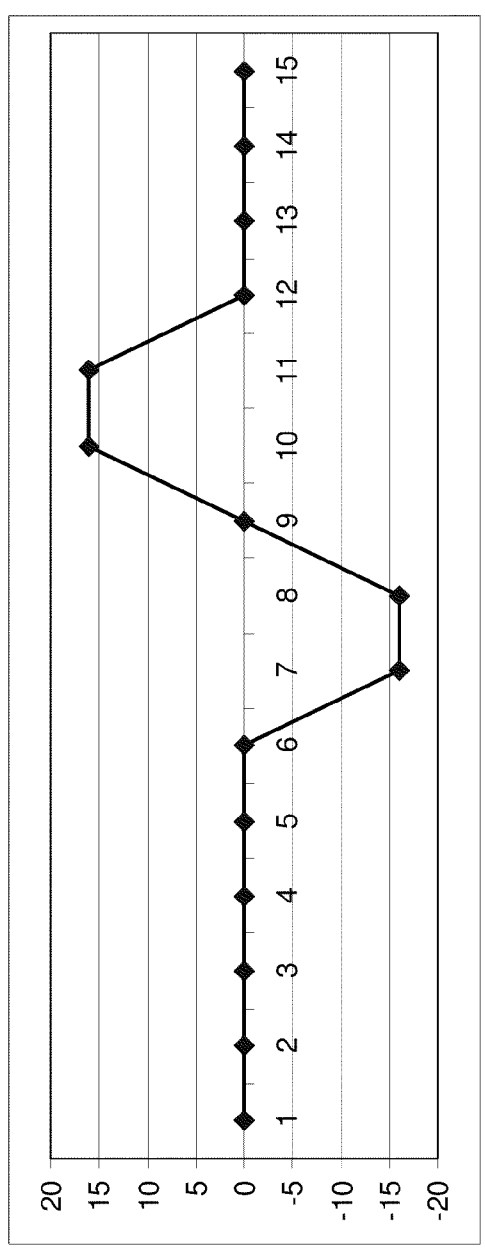
FIG. 26-FIG. 33 illustrate exemplary torque vs. position pattern for composite patterns comprising various sums of single patterns.
Figure 27:
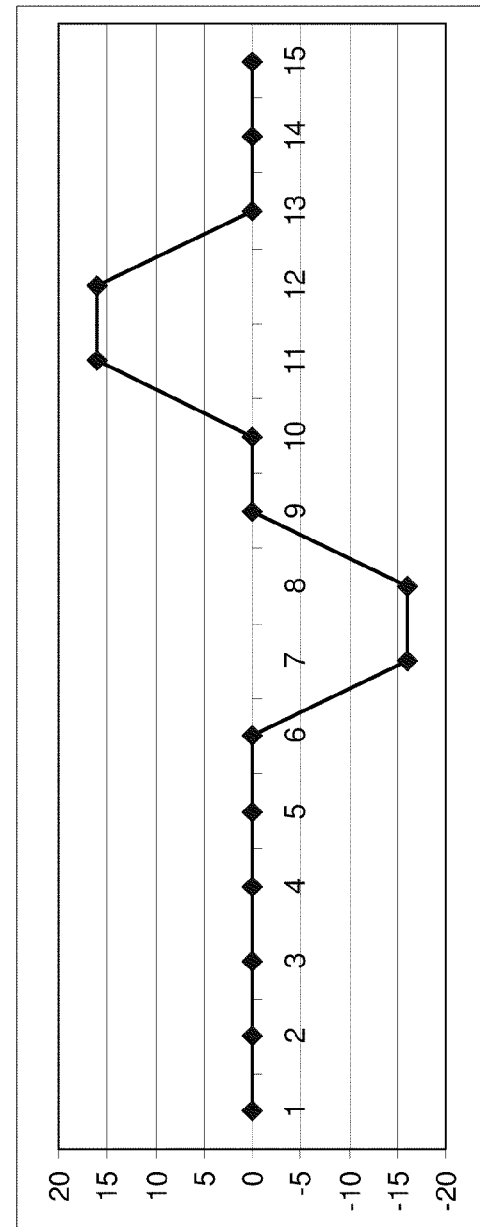
Figure 28:
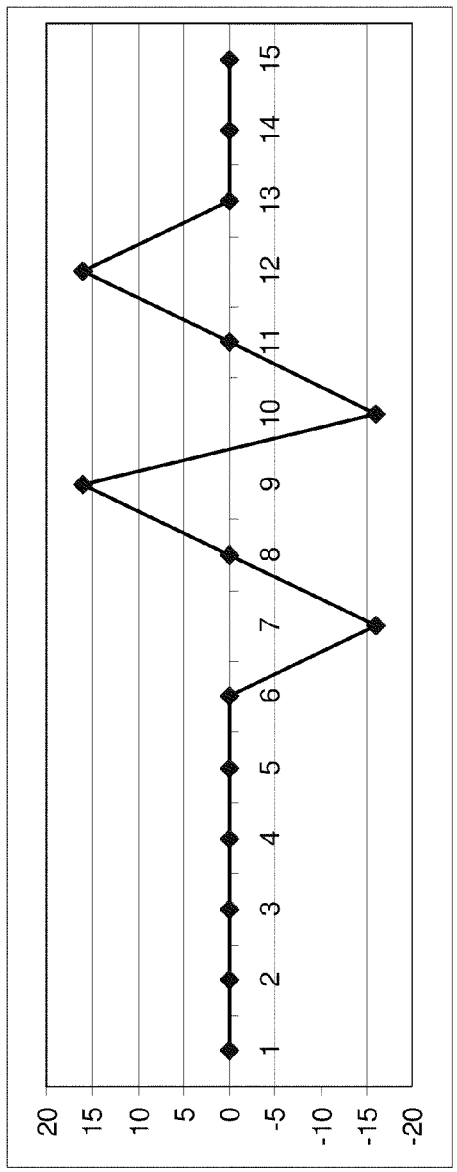
Figure 29:
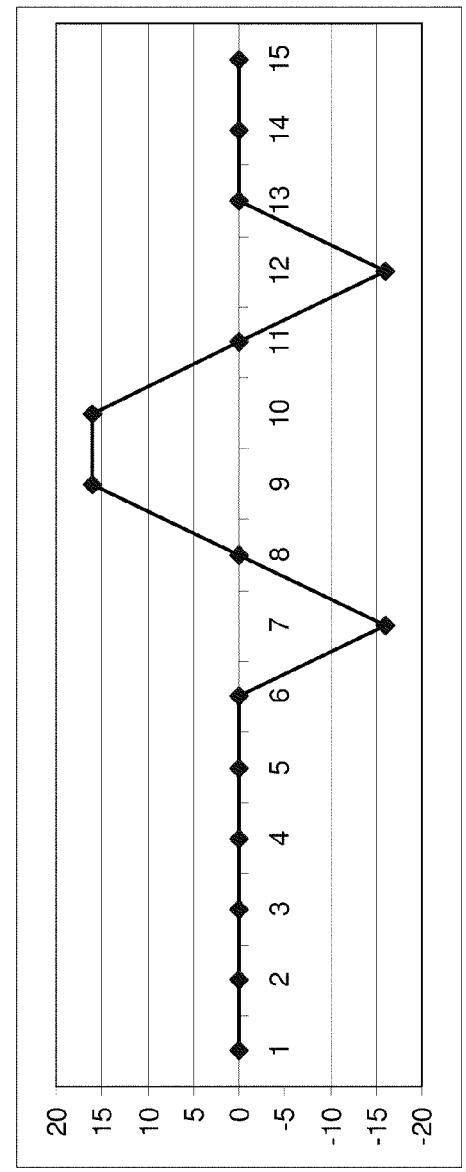
Figure 30:
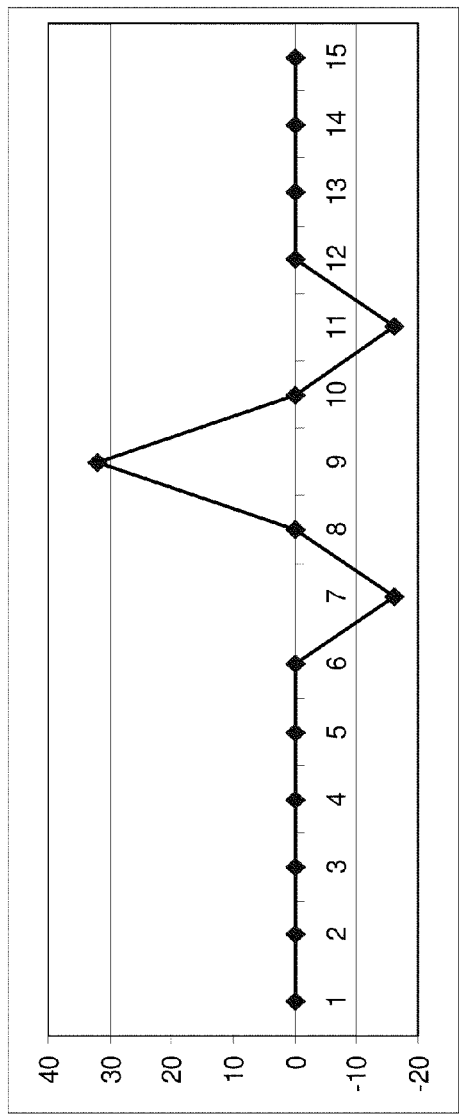

FIG. 25 illustrates an exemplary torque vs. position pattern for a composite pattern comprising the sum of two single patterns. The two patterns are two PN codes offset by a shift of one pole position.

Figure 31:
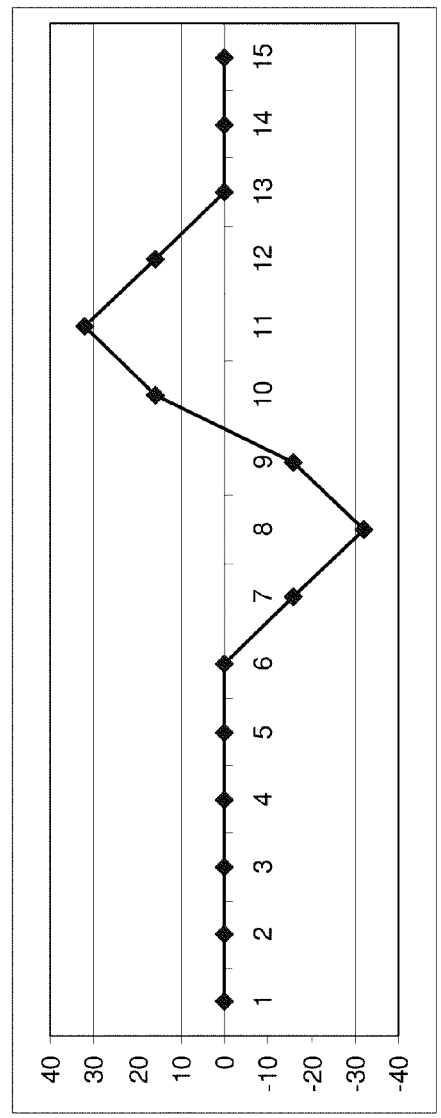
Figure 32:
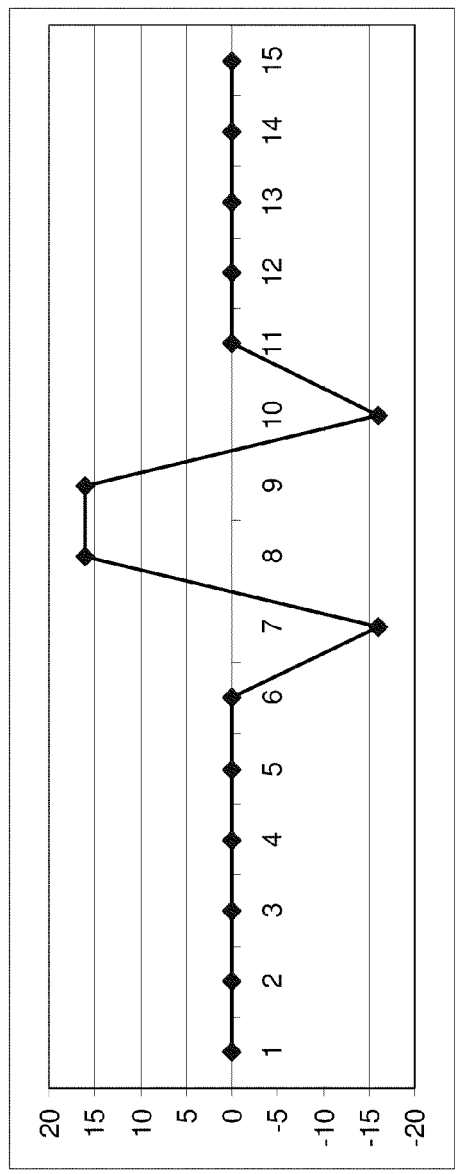
Figure 33:
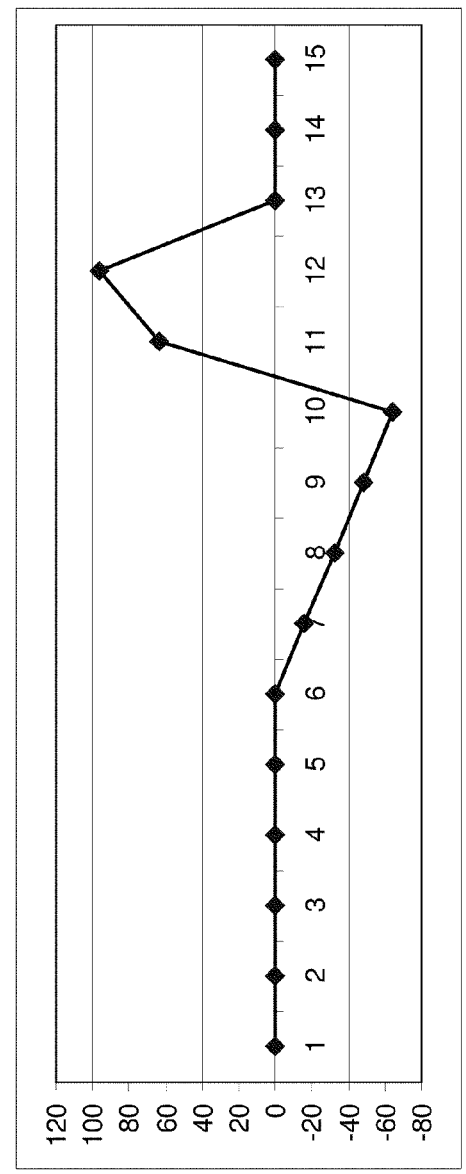

FIG. 26-FIG. 33 illustrate exemplary torque vs. position pattern for composite patterns comprising various sums of single patterns. FIGS. 26-34 show the 15 length PN pattern shifted and summed according to a four digit key 2401 for each graph. The key 2401 is shown to the left of each graph. The key is four integers representing four shift positions and the associated gain. For example, the key for FIG. 31 is 1221 indicating a gain of 1 for the first position, 2 for a shift of 1, 2 for a shift of 2, and 1 for a shift of 3. The summation result is applied to the rotor to find the torque as a function of rotation angle at the integer positions shown. It can be appreciated that numerous composite functions can be generated by summing multiple code patterns.

Figure 34A:
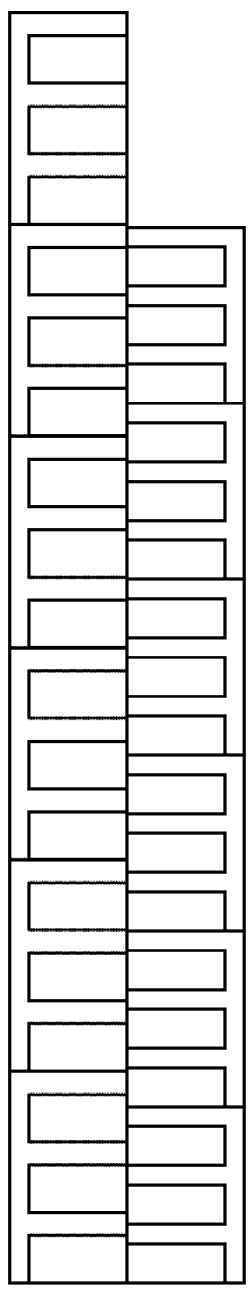
FIG. 34A and FIG. 34B illustrate an exemplary vernier design and illustrates an exemplary compound pole pattern and illustrates an exemplary compound pole pattern applied to a vernier design.
Figure 34B:
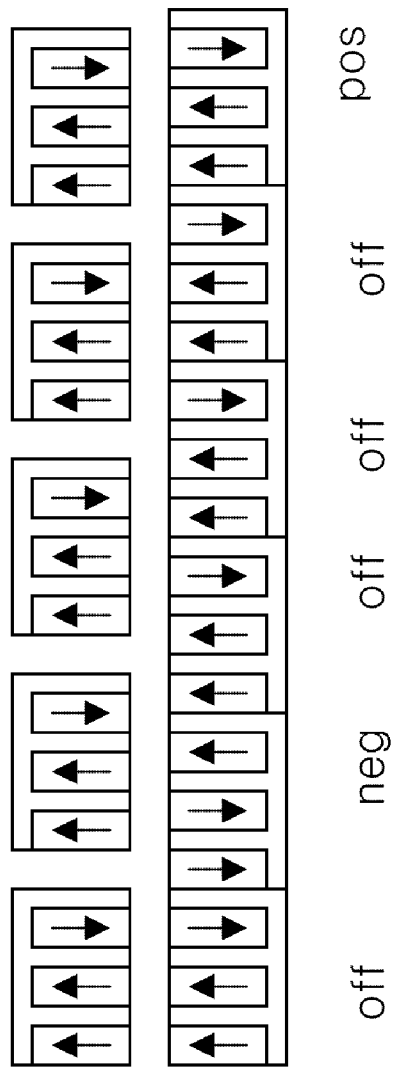

FIG. 34A and FIG. 34B illustrate an exemplary vernier design and illustrates an exemplary compound pole pattern and illustrates an exemplary compound pole pattern applied to a vernier design. FIG. 34A illustrates a vernier pole design with the rotor having a different spacing from the stator. FIG. 34B illustrates a compound pole design with three magnets per major pole and one magnet per minor pole. The major poles may be driven according to a first code and the magnets may be driven by a second code. Thus each magnet is driven by the product of the code for the major pole and the minor pole. Each code may have a polarity and an amplitude for each code position. In one embodiment, a PN code or Barker code uses magnets of a single strength and the code specifies the polarity only.

Figure 35:
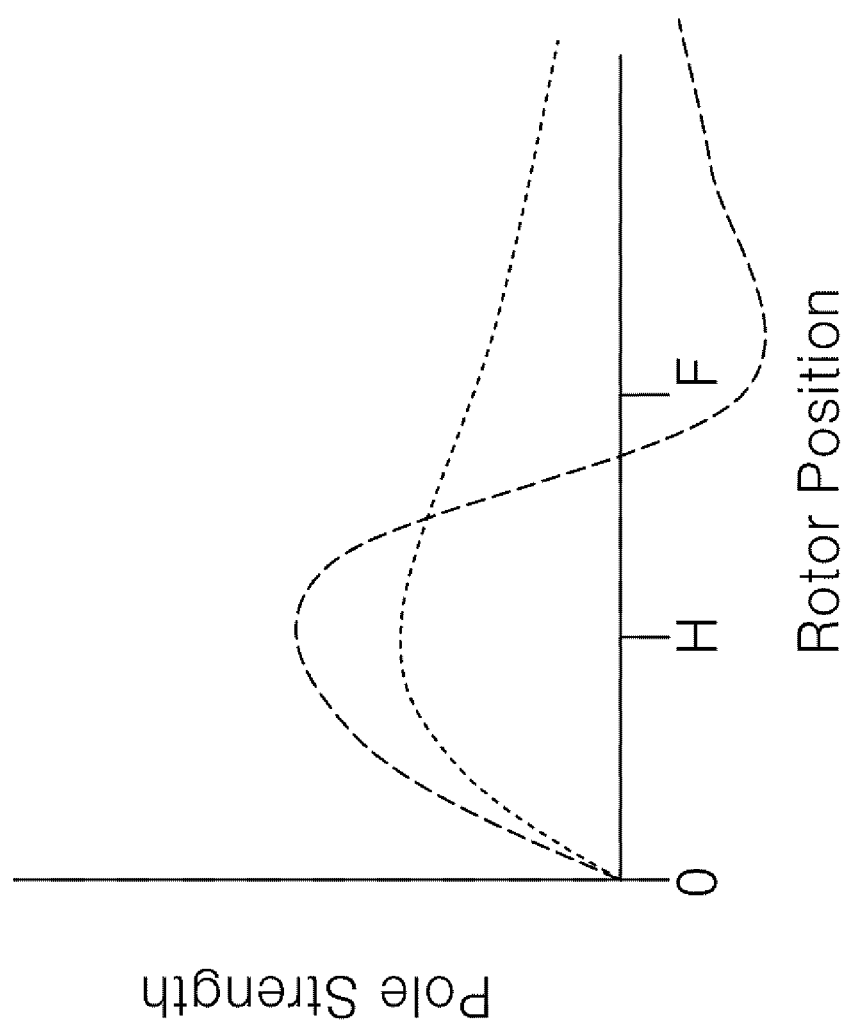
FIG. 35 illustrates various actual torque vs. rotation curves available with different pole piece designs.

FIG. 35 illustrates various actual torque vs. rotation curves available with different pole piece designs. The simplified analysis used for FIGS. 20A, 20B, 21A and 21B gives a first order estimate of the torque profile (torque vs rotation angle). In practice, the pole design may influence the profile as well. Pole width and spacing may vary the torque profile from a lower and broader pattern to a sharper and stronger pattern. FIG. 35 depicts two exemplary estimated curves relative to a half pole and full pole rotation of the rotor.

Using The Stepping Motor In New Applications

In use, the stepping motor may be used to generate a torque profile that allows free rotation of the rotor for any angle until the rotor is near the alignment position. When the rotor is near alignment, the rotor falls as if into a notch and locks into synchronization with the stator.

In a further application, the stepping motor has only one synchronized position and thus, to the extent the rotor can be assumed to be synchronized, the rotor position will be absolutely known. Conventional stepping motors have multiple ambiguous positions around the circumference of the rotor. In one alternative embodiment, however the coded stepping motor may employ more than one code modulo around the rotor and thus have more than one lock in point around the rotor.

In one method of capturing the rotor, the stator drive may sweep a full circle to ensure capture of the rotor. From that point on, the rotor may be assumed to be captured and synchronized with the stator.

In a further variation, an arbitrary torque profile may be generated by summing a number of code patterns to generate a composite pattern. In particular, the torque profile patterns as shown in FIGS. 24-33 may be generated. Similar profiles may be generated using codes of different lengths.

The motor may be used for a number of specialized applications requiring unique drive characteristics. These specialized drive requirements may arise in manufacturing machines, coin operated vending machines, automotive devices, appliances and other devices and machines.

In one example, a clock may be driven by a stepping motor with coded poles. The clock represents a further variation in the invention. It may be necessary to implement a number of code positions that are different from the positions available from a code set. For example PN codes come in $2^n-1$ lengths. Thus for the clock, a 63 length code may be the closest available. In one embodiment, the designer may choose to utilize 60 bits of the 63 bit length code for the 60 positions representing the 60 seconds or 60 minutes of the clock. The application can likely tolerate the slight error introduced by truncating the code. Similarly, in another application 70 positions may be implemented by padding the code with zeroes or utilizing 7 bits of the code to fill in the space.

In a further exemplary alternative, for the clock, a 63 pole motor may be implemented, but the drive may be modified by using a variant of FIG. 24 drive using a weighted sum of two copies of the code shifted by one position from one another to interpolate between the 63 pole positions to yield 60 steps, i.e., each step would advance by 63/60 th or 1.05 pole positions. Thus the drive would be:

$$n = \text{trunc}(1.05S)$$

$$w = 1.05S - n$$

$$d_k = (1-w)PN63(k+n) + wPN63(n+1)$$

where,
S is the step from zero to 59, affording 60 steps,
n is the integer number of shifts of the code needed,
trunc( ) is an integer truncation rounding function returning the integer part,
w is the fraction part of the truncation to be used as a weighting factor,
$d_k$ is the drive for pole k, k=0 to 62, for 63 poles, and
PN63( ) is the selected 63 length code function; the sums (k+n) and (n+1) are modulo 63.

In a further variation, nonlinear interpolation effects due to pole shape and other factors may be compensated by adjusting the weight factor, w.

Thus, the drive moves the rotor 1.05 pole positions per step.

In a similar manner, dials, meters, gauges, valves and other actuators may be driven using the above principles.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A stepping motor comprising:
    a rotor having a predetermined number of rotor poles,
    said rotor having a rotational axis;
    a first stator having a number of stator poles corresponding to said predetermined number of rotor poles;
    said stator poles disposed to magnetically interact with said rotor poles to generate a torque on said rotor tending to rotate said rotor around said rotational axis in accordance with an electrical drive applied to said stator poles;
    wherein said rotor poles are configured in accordance with a magnetic pattern based on a code; wherein said code has an autocorrelation function having a single maximum peak magnitude value per code modulo and a plurality of off maximum peak magnitude values;
    wherein a greatest peak magnitude value of said plurality of off maximum peak magnitude values is less than one half of the single maximum peak magnitude value.

2. A stepping motor comprising:
    a rotor having a predetermined number of rotor poles,
    said rotor having a rotational axis;
    a first stator having a number of stator poles corresponding to said predetermined number of rotor poles;
    said stator poles disposed to magnetically interact with said rotor poles to generate a torque on said rotor tending to rotate said rotor around said rotational axis in accordance with an electrical drive applied to said stator poles;
    wherein said rotor poles are configured in accordance with a magnetic pattern based on a code; wherein said code has an autocorrelation function having a single maximum peak per code modulo and a plurality of off maximum peak values wherein said off maximum peak values are less than one half of the maximum peak;
    wherein the code is a Barker code.

3. A stepping motor comprising:
    a rotor having a predetermined number of rotor poles, said rotor having a rotational axis;
    a first stator having a number of stator poles corresponding to said predetermined number of rotor poles;
    said stator poles disposed to magnetically interact with said rotor poles to generate a torque on said rotor tending to rotate said rotor around said rotational axis in accordance with an electrical drive applied to said stator poles;
    wherein said rotor poles are configured in accordance with a magnetic pattern based on a code; wherein said code has an autocorrelation function having a single maximum peak per code modulo and a plurality of off maximum peak values wherein said off maximum peak values are less than one half of the maximum peak;
    wherein the code is a PN sequence code.

4. A stepping motor comprising:
a rotor having a predetermined number of rotor poles, said rotor having a rotational axis;
a first stator having a number of stator poles corresponding to said predetermined number of rotor poles;
said stator poles disposed to magnetically interact with said rotor poles to generate a torque on said rotor tending to rotate said rotor around said rotational axis in accordance with an electrical drive applied to said stator poles;
wherein said rotor poles are configured in accordance with a magnetic pattern based on a code; wherein said code has an autocorrelation function having a single maximum peak per code modulo and a plurality of off maximum peak values wherein said off maximum peak values are less than one half of the maximum peak;
wherein the code is a Golomb ruler code.

5. The stepping motor in accordance with claim 1, wherein the code has a length greater than four.

6. The stepping motor in accordance with claim 1, further including a drive system; wherein said drive system is configured to drive said first stator in accordance with said code.

7. The stepping motor in accordance with claim 1, further including a drive system; wherein said drive system is configured to drive said rotor in accordance with at least two copies of said code said at least two copies of said code shifted relative to one another.

8. The stepping motor in accordance with claim 1, wherein said magnetic pattern is repeated around said rotor one or more times.

9. The stepping motor in accordance with claim 1, wherein said rotor comprises a disk or a cylinder.

10. The stepping motor in accordance with claim 1, further including at least one additional stator coupled to said rotor, said at least one additional stator shifted in phase by a partial pole position relative to a phase of said first stator.

11. A method for operating a stepping motor, said stepping motor having a predetermined number of poles in a first stator and corresponding number of poles in a rotor magnetically coupled to said first stator, said method comprising the steps of:
producing a magnetic field pattern in said rotor in accordance with a code;
producing a magnetic field pattern in said first stator in accordance with said code; and
sequentially shifting said magnetic field pattern in at least one of said rotor or said first stator to effect rotation of said rotor;
wherein said rotor poles are configured in accordance with a magnetic pattern based on a code; wherein said code has an autocorrelation function having a single maximum peak magnitude value per code modulo and a plurality of off maximum peak magnitude values;
wherein a greatest peak magnitude value of said plurality of off maximum peak magnitude values is less than one half of the single maximum peak magnitude value.

12. A method for operating a stepping motor, said stepping motor having a predetermined number of poles in a first stator and corresponding number of poles in a rotor magnetically coupled to said first stator, said method comprising the steps of:
producing a magnetic field pattern in said rotor in accordance with a code;
producing a magnetic field pattern in said first stator in accordance with said code; and
sequentially shifting said magnetic field pattern in at least one of said rotor or said first stator to effect rotation of said rotor;
wherein said code has an autocorrelation function having a single maximum peak per code modulo and a plurality of off maximum peak values wherein the off maximum peak values are less than one half of the maximum peak;
wherein the code is a Barker code.

13. A method for operating a stepping motor, said stepping motor having a predetermined number of poles in a first stator and corresponding number of poles in a rotor magnetically coupled to said first stator, said method comprising the steps of:
producing a magnetic field pattern in said rotor in accordance with a code;
producing a magnetic field pattern in said first stator in accordance with said code; and
sequentially shifting said magnetic field pattern in at least one of said rotor or said first stator to effect rotation of said rotor;
wherein said code has an autocorrelation function having a single maximum peak per code modulo and a plurality of off maximum peak values wherein the off maximum peak values are less than one half of the maximum peak;
wherein the code is a PN sequence code.

14. A method for operating a stepping motor, said stepping motor having a predetermined number of poles in a first stator and corresponding number of poles in a rotor magnetically coupled to said first stator, said method comprising the steps of:
producing a magnetic field pattern in said rotor in accordance with a code;
producing a magnetic field pattern in said first stator in accordance with said code; and
sequentially shifting said magnetic field pattern in at least one of said rotor or said first stator to effect rotation of said rotor;
wherein said code has an autocorrelation function having a single maximum peak per code modulo and a plurality of off maximum peak values wherein the off maximum peak values are less than one half of the maximum peak;
wherein the code is a Golomb ruler code.

15. The method in accordance with claim 11, wherein the code has a length greater than four.

16. The method in accordance with claim 11, further including driving said first stator in accordance with said code.

17. The method in accordance with claim 11, further including: driving said first stator in accordance with at least two copies of said code shifted relative to one another.

18. The method in accordance with claim 11, further including repeating said magnetic pattern one or more times around said rotor.

19. The method in accordance with claim 11, wherein said rotor comprises a disk or a cylinder.

20. The method in accordance with claim 11, further including coupling at least one additional stator to said rotor, said at least one additional stator shifted in phase by a partial pole position relative to a phase of said first stator.

21. The method in accordance with claim 11, further including: truncating or padding the code to alter the code length to match a predetermined number of poles in said stator.

22. The method in accordance with claim 11, further including: driving said first stator with a drive based on a weighted sum of two or more copies of the code shifted with respect to one another to achieve rotor position interpolation between discrete pole positions.

* * * * *